US012712842B2

(12) United States Patent
Zhu et al.

(10) Patent No.: US 12,712,842 B2
(45) **Date of Patent: *Aug. 18, 2026**

(54) DOMAIN NAME SYSTEM SERVER DETERMINING METHOD, AND REQUEST PROCESSING METHOD, APPARATUS, AND SYSTEM

(71) Applicant: HUAWEI TECHNOLOGIES CO., LTD., Shenzhen (CN)

(72) Inventors: Fangyuan Zhu, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,580

(22) Filed: Jan. 16, 2024

(65) Prior Publication Data

US 2024/0154934 A1 May 9, 2024

Related U.S. Application Data

(63) Continuation of application No. 17/687,139, filed on Mar. 4, 2022, now Pat. No. 11,916,869, which is a (Continued)

(30) Foreign Application Priority Data

Sep. 6, 2019 (CN) ......................... 201910843948.6

(51) Int. Cl.

| | |
|---|---|
| ***H04L 61/4511*** | (2022.01) |
| ***H04W 8/26*** | (2009.01) |
| ***H04W 76/10*** | (2018.01) |

(52) U.S. Cl.

CPC ........... *H04L 61/4511* (2022.05); *H04W 8/26* (2013.01); *H04W 76/10* (2018.02)

(58) Field of Classification Search

CPC ...... H04L 61/4511; H04W 8/26; H04W 76/10

See application file for complete search history.

(56) References Cited

U.S. PATENT DOCUMENTS 8,499,034 B2 7/2013 Karasaridis
10,164,869 B1 * 12/2018 Bittfield .............. H04L 61/4511
(Continued)

FOREIGN PATENT DOCUMENTS

CN 102130820 A 7/2011
CN 102572014 A 7/2012
(Continued)

OTHER PUBLICATIONS

3GPP TR 23.748 V0.4.0 (Jul. 2020), "3rd Generation Partnership Project; Technical Specification Group Services and System Aspects; Study on Enhancement of Support for Edge Computing in 5G Core network (5GC) (Release 17)," Jun. 2020, 189 pages.
(Continued)

*Primary Examiner* — Hua Fan

(74) *Attorney, Agent, or Firm* — Fish & Richardson P.C.

(57) ABSTRACT

Embodiments of this application disclose a domain name system server determining method, and a request processing method, apparatus, and system, One example method includes: determining, by a session management function network element and based on a first location of user equipment, a data network access identifier (DNAI) indicating a deployment location of a first application; determining, by the session management function network element, an address of a first local domain name system server based on the DNAI; sending, by the session management function network element, the address of the first local domain name system server to a first device; and receiving, by the first device, the address of the first local domain name system server.

20 Claims, 21 Drawing Sheets

Related U.S. Application Data continuation of application No. PCT/CN2020/113140, filed on Sep. 3, 2020.

(56) References Cited

U.S. PATENT DOCUMENTS

| | | | |
|---|---|---|---|
| 2010/0030914 A1 | 2/2010 | Sparks et al. | |
| 2011/0295940 A1 | 12/2011 | Saleem et al. | |
| 2012/0290693 A1 | 11/2012 | Karasaridis et al. | |
| 2014/0089523 A1 | 3/2014 | Roy et al. | |
| 2014/0105000 A1 | 4/2014 | Muccione et al. | |
| 2019/0274185 A1* | 9/2019 | Stojanovski | H04L 47/2441 |

FOREIGN PATENT DOCUMENTS

| | | | |
|---|---|---|---|
| CN | 102611763 | A | 7/2012 |
| CN | 104702617 | A | 6/2015 |
| CN | 109729181 | A | 5/2019 |
| CN | 110198363 | A | 9/2019 |
| EP | 1509025 | B1 | 11/2007 |
| EP | 3886404 | A1 | 9/2021 |
| WO | 2017211320 | A1 | 12/2017 |
| WO | 2017214991 | A1 | 12/2017 |
| WO | 2018199649 | A1 | 11/2018 |

OTHER PUBLICATIONS

3GPP TS 23.501 V16.1.0 (Jun. 2019), "3rd Generation Partnership Project; Technical Specification Group Services and System Aspects; System Architecture for the 5G System; Stage 2 (Release 16)," Jun. 2019, 367 pages.

Chinatelecom, "pCR 23.748—Solution to KI#1, Edge Application Server Discovery with LONS Address Information," SA WG2 Meeting #S2-136AH, S2-2000597, Incheon, South Korea, Jan. 13-17, 2020, 3 pages.

Ericsson, China Unicom, "Solution to Key Issue #1," 3GPP SA WG2 Meeting #127, S2-183129, Sanya, China, Apr. 16-20, 2018, 4 pages.

Extended European Search Report issued in European Application No. 20861513.8 on Sep. 1, 2022, 11 pages.

Huawei, HiSilicon, "UE IP Address Allocation by AAA/DHCP," 3GPP TSG-SA WG2 Meeting #132, S2-1904286, Xi'an, China, Apr. 8-12, 2019, 4 pages.

Jeong et al., "IPV6 Router Advertisement Option for DNS Configuration," Network Working Group, Request for Comments 5006, Sep. 2007, 12 pages.

Jeong et al., "IPv6 Router Advertisement Options for DNS Configuration," Internet Engineering Task Force (IETF), Request for Comments: 8106, Mar. 2017, 19 pages.

Office Action issued in Chinese Application No. 201910843948.6 on Jul. 14, 2021, 17 pages (with English translation).

Office Action issued in Indian Application No. 202247012446 on Jul. 19, 2022, 8 pages.

PCT International Search Report and Written Opinion issued in International Application No. PCT/CN2020/113140 on Dec. 2, 2020, 15 pages (with English translation).

Office Action in Indian Appln. No. 202247012446, mailed on Mar. 11, 2024, 3 pages (with English translation).

* cited by examiner

DOMAIN NAME SYSTEM SERVER DETERMINING METHOD, AND REQUEST PROCESSING METHOD, APPARATUS, AND SYSTEM

CROSS-REFERENCE TO RELATED APPLICATIONS

This application is a continuation of U.S. patent application Ser. No. 17/687,139, filed on Mar. 4, 2022, which is a continuation of International Application No. PCT/CN2020/113140, filed on Sep. 3, 2020, which claims priority to Chinese Patent Application No. 201910843948.6, filed on Sep. 6, 2019. All of the afore-mentioned patent applications are hereby incorporated by reference in their entireties.

TECHNICAL FIELD

This application relates to the field of communications technologies, and in particular, to a domain name system server determining method, and a request processing method, apparatus, and system.

BACKGROUND

As a quantity of users of terminal devices increases, service functions supported by various terminal devices continuously increase. In an Internet access process, the terminal device needs to query a real Internet protocol (IP) address of a domain name of a uniform resource locator (URL), to send a data packet. This operation can only be completed by querying a domain name system (DNS) server. The DNS server is a distributed host information database, and provides a function of mapping and conversion between a domain name and an IP address. A domain name may be resolved into a corresponding IP address by using the DNS server. The terminal device can access a domain name by using a domain name resolution service provided by the DNS server.

A current domain name access process is as follows: For example, the terminal device accesses a domain name A. When the terminal device accesses the domain name A, the terminal device queries whether an IP address corresponding to the domain name A exists in a cache of the terminal device. If the IP address corresponding to the domain name A exists, the terminal device may directly obtain the IP address, and access the domain name through the IP address. If the IP address corresponding to the domain name A does not exist, the terminal device may send a domain name resolution request to the DNS server, and the domain name resolution request carries the domain name A. The DNS server returns the IP address corresponding to the domain name A, and the terminal device may access the domain name A through the IP address.

In a $5^{th}$ generation mobile communications system (5G), to support selective routing of service traffic to a data network, a session management function (SMF) network element may control a data path of a protocol data unit (PDU) session. The PDU session corresponds to a plurality of anchor user plane function (UPF) network elements at the same time. In other words, there is a plurality of anchor UPF network elements (anchors for short) for a same PDU session. Each anchor UPF network element of the PDU session may provide a different access mode to a same data network.

In a scenario in which there is a plurality of anchor UPF network elements for a same PDU session, one DNS server may be deployed at a location close to each anchor UPF network element of the PDU session. In this way, a plurality of DNS servers may be deployed at different locations in a network. Domain name resolution capabilities of different DNS servers may be the same or different. For example, a DNS server 1 is deployed at a location close to an anchor 1, and the terminal device may access the DNS server 1 by using the anchor 1, to obtain an IP address corresponding to a domain name 1. A DNS server 2 is deployed at a location close to an anchor 2, and the terminal device may access the DNS server 2 by using the anchor 2, to obtain an IP address corresponding to a domain name 2. The domain name 1 and the domain name 2 may be the same or different. In this scenario, the terminal device cannot determine a DNS server to which a domain name query is initiated. As a result, the domain name query fails.

SUMMARY

Embodiments of this application provide a domain name system server determining method, and a request processing method, apparatus, and system, so that a session management function network element determines an address of a first domain name system server, and user equipment can query the first domain name system server for a domain name.

To resolve the foregoing technical problem, the embodiments of this application provide the following technical solutions.

According to a first aspect, an embodiment of this application provides a domain name system server determining method, including: A session management function network element determines an address of a first domain name system server based on a first location of user equipment, where the first domain name system server is a local domain name system server that resolves a domain name of a first application into a corresponding first Internet protocol address, and the first Internet protocol address is associated with the first location; and the session management function network element sends the address of the first domain name system server to a first device. Specifically, the first device may include a user plane function network element or user equipment. After receiving the address of the first domain name system server sent by the session management function network element, the user plane function network element sends a domain name system query request message to the first domain name system server. Alternatively, after receiving the address of the first domain name system server sent by the session management function network element, the user plane function network element sends a domain name system query request message to the first domain name system server. In this embodiment of this application, the session management function network element may determine the address of the first domain name system server based on the first location of the user equipment, and the user plane function network element or the user equipment may obtain the address of the first domain name system server from the session management function network element. Then, the user plane function network element or the user equipment may send the domain name system query request message to the first domain name system server. This resolves a problem that the user equipment cannot determine a domain name system server to query a domain name. In this way, the user equipment can successfully query the domain name.

In a possible implementation, that a session management function network element determines an address of a first domain name system server based on a first location of user equipment includes: The session management function network element determines a deployment location of the first application based on the first location of the user equipment, and the session management function network element determines the address of the first domain name system server based on the deployment location of the first application. The session management function network element obtains the first location of the user equipment, and then obtains, based on the first application used by the user equipment, the deployment location that is of the first application and that corresponds to the first location. For example, the deployment location of the first application may be represented by a data network access identifier (DNAI). The session management function network element may determine the deployment location of the first application based on the first location of the user equipment, and further determine the address of the first domain name system server based on the deployment location of the first application.

In a possible implementation, the method further includes: The session management function network element allocates a first Internet protocol prefix to the user equipment, where the first Internet protocol prefix is included in a first domain name system query request message sent by the user equipment; and the session management function network element sends the first Internet protocol prefix to the user equipment. The session management function network element may further determine the first Internet protocol prefix used by the user equipment. A source Internet protocol prefix carried when the user equipment sends the first domain name system query request message is the first Internet protocol prefix. For example, in a BP scenario, the first domain name system query request message sent by the user equipment needs to carry the first Internet protocol prefix, so that when a BP node receives the first domain name system query request message, the BP node can determine a user plane forwarding path based on the first Internet protocol prefix. The BP node sends the first domain name system query request message to the first domain name system server based on the user plane forwarding path. The session management function network element may further send the first Internet protocol prefix to the user equipment. For example, the session management function network element may send the first Internet protocol prefix to the user equipment through the UPF network element and an access network (AN).

In a possible implementation, the first device is a user plane function network element. That the session management function network element sends the address of the first domain name system server to a first device includes: The session management function network element sends a session request to the user plane function network element. The session request includes the address of the first domain name system server and indication information. The indication information is used to indicate the user plane function network element to set, to the address of the first domain name system server, a destination address of the received first domain name system query request message sent by the user equipment. The session request sent by the session management function network element may further carry the indication information, and the indication information is used to indicate the user plane function network element to set, to the address of the first domain name system server, the destination address of the received first domain name system query request message sent by the user equipment. For example, the destination address of the first domain name system query request message is modified to the address of the first domain name system server. To be specific, when the user equipment sends the first domain name system query request message to the user plane function network element, the user plane function network element modifies the destination address of the first domain name system query request message based on the indication information. For example, the destination address of the first domain name system query request message is an address of a third domain name system server, but the user plane function network element may set the destination address of the first domain name system query request message to the address of the first domain name system server based on the indication information.

In a possible implementation, the first device is user equipment. That the session management function network element sends the address of the first domain name system server to a first device includes: The session management function network element sends first route advertisement information to the user equipment. The first route advertisement information includes the address of the first domain name system server. In this solution, the session management function network element may send the address of the first domain name system server and the first Internet protocol prefix to the user equipment by using a same message. For example, the session management function network element sends the address of the first domain name system server and the first Internet protocol prefix to the user equipment by using a same route advertisement message.

In a possible implementation, the first device is user equipment. The method further includes: When the session management function network element learns that the user equipment moves from the first location to a second location, the session management function network element determines an address of a second domain name system server based on the second location, where the second domain name system server is a local domain name system server that resolves the domain name of the first application into a corresponding second Internet protocol address, and the second Internet protocol address is associated with the second location; and the session management function network element allocates a second Internet protocol prefix to the user equipment, and then sends second route advertisement information to the user equipment, where the second route advertisement information carries the second Internet protocol prefix and the address of the second domain name system server, and the second Internet protocol prefix is included in a second domain name system query request message sent by the user equipment to the second domain name system server. In this solution, when the user equipment moves from the first location to the second location, the session management function network element may further determine the second Internet protocol prefix used by the user equipment. A source Internet protocol prefix carried when the user equipment sends the second domain name system query request message is the second Internet protocol prefix. The session management function network element may further send the second Internet protocol prefix to the user equipment. For example, the session management function network element may send the second Internet protocol prefix to the user equipment through the UPF network element and the AN. For example, the session management function network element sends the second route advertisement information to the user equipment. The second route advertisement information carries the second Internet protocol prefix and the address of the second domain name system server, so that the user equipment can obtain the second Internet protocol prefix by resolving the second route advertisement information. When the user equipment sends the second domain name system query request message to the second domain name system server, the user equipment may add the second Internet protocol prefix to the second domain name system query request message.

In a possible implementation, the first device is user equipment. The method further includes: The session management function network element sends a first domain name query list supported by the first domain name system server to the user equipment. The first domain name query list is used by the user equipment to send the first domain name system query request message to the first domain name system server when the domain name of the first application is in the first domain name query list. In this solution, the session management function network element may configure a domain name query list supported by each domain name system server. The domain name query list records all domain name suffixes supported by the domain name system server. The domain name query list may also be referred to as a domain name suffix list. For example, the session management function network element may configure the first domain name query list supported by the first domain name system server. The session management function network element may further send the domain name query list supported by each domain name system server to the user equipment. When the user equipment needs to query the domain name of the first application, the user equipment may query the first domain name query list, to determine whether the domain name of the first application is in the first domain name query list. When the domain name of the first application is in the first domain name query list, the user equipment sends the first domain name system query request message to the first domain name system server. In this way, the user equipment may learn that different domain name suffixes correspond to different DNS servers, and when performing a DNS query, the user equipment may query a domain name based on a corresponding DNS server.

According to a second aspect, an embodiment of this application further provides a request processing method, including: A user plane function network element receives an address of a first domain name system server sent by a session management function network element, where the address of the first domain name system server is determined by the session management function network element based on a first location of user equipment, the first domain name system server is a local domain name system server that resolves a domain name of a first application into a corresponding first Internet protocol address, and the first Internet protocol address is associated with the first location; the user plane function network element receives a domain name system query request message sent by the user equipment; and the user plane function network element sends the domain name system query request message to the first domain name system server. In this embodiment of this application, the session management function network element may determine the address of the first domain name system server based on the first location of the user equipment, and the user plane function network element may obtain the address of the first domain name system server from the session management function network element. Then, the user plane function network element may send the domain name system query request message to the first domain name system server. This resolves a problem that the user equipment cannot determine a domain name system server to query the domain name. In this way, the user equipment can successfully query the domain name.

In a possible implementation, the method further includes: The user plane function network element receives indication information sent by the session management function network element. The indication information is used to indicate the user plane function network element to set, to the address of the first domain name system server, a destination address of the received domain name system query request message sent by the user equipment. In this solution, the session management function network element and the user plane function network element may communicate with each other through an N4 interface, and the session management function network element may further send the indication information to the user plane function network element. The indication information is used to indicate the user plane function network element to set, to the address of the first domain name system server, the destination address of the received domain name system query request message sent by the user equipment. To be specific, when the user equipment sends the domain name system query request message to the user plane function network element, the user plane function network element modifies the destination address of the first domain name system query request message based on the indication information. For example, the destination address of the first domain name system query request message is an address of a third domain name system server, but the user plane function network element may set the destination address of the first domain name system query request message to the address of the first domain name system server based on the indication information. For example, the session management function network element sends a session request to the user plane function network element, and the session request includes the address of the first domain name system server, so that the user plane function network element may resolve the session request to obtain the address of the first domain name system server. The session request may carry both the address of the first domain name system server and the indication information. The user plane function network element may set the destination address of the first domain name system query request message to the address of the first domain name system server based on the indication information, so that the user equipment can access the local domain name system server nearby. In addition, it can be ensured that the first domain name system server routes a response message corresponding to the first domain name system query request message to the user equipment through an optimal path.

According to a third aspect, an embodiment of this application further provides a request processing method. The method includes: User equipment receives an address of a first domain name system server sent by a session management function network element, where the address of the first domain name system server is determined by the session management function network element based on a first location of the user equipment, the first domain name system server is a local domain name system server that resolves a domain name of a first application into a corresponding first Internet protocol address, and the first Internet protocol address is associated with the first location; and the user equipment sends a first domain name system query request message to the first domain name system server. In this embodiment of this application, the session management function network element may determine the address of the first domain name system server based on the first location of the user equipment, and the user equipment may obtain the address of the first domain name system server from the session management function network element. Then, the user equipment may send the domain name system query request message to the first domain name system server based on the address of the first domain name system server. This resolves a problem that the user equipment cannot determine a domain name system server to query a domain name. In this way, the user equipment can successfully query the domain name.

In a possible implementation, that user equipment receives an address of a first domain name system server sent by a session management function network element includes: The user equipment receives first route advertisement information sent by the session management function network element, where the first route advertisement information includes the address of the first domain name system server. The session management function network element and the user equipment may communicate with each other through a user plane function network element, and the session management function network element and the user plane function network element may communicate with each other through an N4 interface. For example, the session management function network element sends the first route advertisement information to the user equipment. The first route advertisement information includes the address of the first domain name system server. The user equipment may receive the first route advertisement information through the N4 interface, so that the user equipment may resolve the first route advertisement information to obtain the address of the first domain name system server.

In a possible implementation, the first route advertisement information further includes a first Internet protocol prefix, and the first Internet protocol prefix is included in the first domain name system query request message sent by the user equipment to the first domain name system server. The session management function network element may further determine the first Internet protocol prefix used by the user equipment. A source Internet protocol prefix carried when the user equipment sends the first domain name system query request message is the first Internet protocol prefix. For example, in a BP scenario, the first domain name system query request message sent by the user equipment needs to carry the first Internet protocol prefix, so that when receiving the first domain name system query request message, a user plane function network element having a BP function can determine a forwarding path of the first domain name system query request message based on the first Internet protocol prefix.

In a possible implementation, the method further includes: The user equipment receives second route advertisement information sent by the session management function network element, where the second route advertisement information includes an address of a second domain name system server, the second domain name system server is a local domain name system server determined by the session management function network element for the user equipment based on a second location when the user equipment moves from the first location to the second location, and a second Internet protocol address is associated with the second location; and the user equipment sends a second domain name system query request message to the second domain name system server. Because the user equipment is movable, the user equipment may move from the first location to the second location. When the user equipment moves from the first location to the second location, the session management function network element determines the address of the second domain name system server based on the second location at which the user equipment is located after the user equipment moves. The second domain name system server is the local domain name system server that resolves the domain name of the first application into the corresponding second Internet protocol address, and the second Internet protocol address is associated with the second location. The session management function network element determines an address of a new domain name system server (namely, the second domain name system server) based on a subsequent location (namely, the second location) of the user equipment, so that the session management function network element may determine the latest local domain name system server for the user equipment, to ensure that the user equipment can correctly query the domain name.

In a possible implementation, the second route advertisement information further includes a second Internet protocol prefix, and the second Internet protocol prefix is included in the second domain name system query request message sent by the user equipment to the second domain name system server. When the user equipment moves from the first location to the second location, the session management function network element may further determine the second Internet protocol prefix used by the user equipment. A source Internet protocol prefix carried when the user equipment sends the second domain name system query request message is the second Internet protocol prefix. For example, in the BP scenario, the second domain name system query request message sent by the user equipment needs to carry the second Internet protocol prefix, so that when receiving the second domain name system query request message, the user plane function network element having the BP function can determine a forwarding path of the second domain name system query request message based on the second Internet protocol prefix.

In a possible implementation, the method further includes: The user equipment obtains a second domain name query list supported by the second domain name system server from the session management function network element, and the user equipment sends the second domain name system query request message to the second domain name system server when the domain name of the first application is in the second domain name query list. The session management function network element may configure a domain name query list supported by each domain name system server. The domain name query list records all domain name suffixes supported by the domain name system server. The domain name query list may also be referred to as a domain name suffix list. For example, the session management function network element may configure the second domain name query list supported by the second domain name system server. The session management function network element may further send the domain name query list supported by each domain name system server to the user equipment. For example, the session management function network element may further send the second domain name query list supported by the second domain name system server to the user equipment. When the user equipment needs to query the domain name of the first application, the user equipment may query the second domain name query list, to determine whether the domain name of the first application is in the second domain name query list. When the domain name of the first application is in the second domain name query list, the user equipment sends the second domain name system query request message to the second domain name system server. In this way, the user equipment may learn that different domain name suffixes correspond to different DNS servers, and when performing a DNS query, the user equipment may query a domain name based on a corresponding DNS server.

In a possible implementation, the method further includes: The user equipment obtains a first domain name query list supported by the first domain name system server from the session management function network element, and the user equipment sends the first domain name system query request message to the first domain name system server when the domain name of the first application is in the first domain name query list. The session management function network element may configure a domain name query list supported by each domain name system server. The domain name query list records all domain name suffixes supported by the domain name system server. The domain name query list may also be referred to as a domain name suffix list. For example, the session management function network element may configure the first domain name query list supported by the first domain name system server. The session management function network element may further send the domain name query list supported by each domain name system server to the user equipment. For example, the session management function network element may further send the first domain name query list supported by the first domain name system server to the user equipment. When the user equipment needs to query the domain name of the first application, the user equipment may query the first domain name query list, to determine whether the domain name of the first application is in the first domain name query list. When the domain name of the first application is in the first domain name query list, the user equipment sends the first domain name system query request message to the first domain name system server. In this way, the user equipment may learn that different domain name suffixes correspond to different DNS servers, and when performing the DNS query, the user equipment may query the domain name based on the corresponding DNS server.

According to a fourth aspect, an embodiment of this application further provides a session management function network element, including: a processing module, configured to determine an address of a first domain name system server based on a first location of user equipment, where the first domain name system server is a local domain name system server that resolves a domain name of a first application into a corresponding first Internet protocol address, and the first Internet protocol address is associated with the first location; and a sending module, configured to send the address of the first domain name system server to a first device.

In a possible implementation, the processing module is specifically configured to: determine a deployment location of the first application based on the first location of the user equipment, and determine the address of the first domain name system server based on the deployment location of the first application.

In a possible implementation, the processing module is further configured to allocate a first Internet protocol prefix to the user equipment, where the first Internet protocol prefix is included in a first domain name system query request message sent by the user equipment; and the sending module is further configured to send the first Internet protocol prefix to the user equipment.

In a possible implementation, the first device is a user plane function network element. The sending module is further configured to send a session request to the user plane function network element. The session request includes the address of the first domain name system server and indication information. The indication information is used to indicate the user plane function network element to set, to the address of the first domain name system server, a destination address of the received first domain name system query request message sent by the user equipment.

In a possible implementation, the first device is user equipment. The sending module is further configured to send first route advertisement information to the user equipment. The first route advertisement information includes the address of the first domain name system server.

In a possible implementation, the first device is user equipment. The processing module is further configured to: when the session management function network element learns that the user equipment moves from the first location to a second location, determine an address of a second domain name system server based on the second location. The second domain name system server is a local domain name system server that resolves the domain name of the first application into a corresponding second Internet protocol address, and the second Internet protocol address is associated with the second location. The processing module is further configured to allocate a second Internet protocol prefix to the user equipment. The sending module is further configured to send second route advertisement information to the user equipment. The second route advertisement information carries the second Internet protocol prefix and the address of the second domain name system server, and the second Internet protocol prefix is included in a second domain name system query request message sent by the user equipment to the second domain name system server.

In a possible implementation, the first device is user equipment. The sending module is further configured to send a first domain name query list supported by the first domain name system server to the user equipment. The first domain name query list is used by the user equipment to send the first domain name system query request message to the first domain name system server when the domain name of the first application is in the first domain name query list.

In the fourth aspect of this application, the modules constituting the session management function network element may further perform the steps described in the first aspect and the possible implementations. For details, refer to the description in the first aspect and the possible implementations.

According to a fifth aspect, an embodiment of this application further provides a user plane function network element, including a processing module configured to receive, by using a receiving module, an address of a first domain name system server sent by a session management function network element. The address of the first domain name system server is determined by the session management function network element based on a first location of user equipment. The first domain name system server is a local domain name system server that resolves a domain name of a first application into a corresponding first Internet protocol address, and the first Internet protocol address is associated with the first location. The processing module is further configured to receive, by using the receiving module, a domain name system query request message sent by the user equipment. The processing module is further configured to send the domain name system query request message to the first domain name system server by using a sending module.

In a possible implementation, the processing module is further configured to receive, by using the receiving module, indication information sent by the session management function network element. The indication information is used to indicate the user plane function network element to set, to the address of the first domain name system server, a destination address of the received domain name system query request message sent by the user equipment.

In the fifth aspect of this application, the modules constituting the user plane function network element may further perform the steps described in the second aspect and the possible implementations. For details, refer to the description in the second aspect and the possible implementations.

According to a sixth aspect, an embodiment of this application provides an apparatus. The apparatus includes a communications apparatus, and the communications apparatus includes a processing module configured to receive, by using a receiving module, an address of a first domain name system server sent by a session management function network element. The address of the first domain name system server is determined by the session management function network element based on a first location of the communications apparatus. The first domain name system server is a local domain name system server that resolves a domain name of a first application into a corresponding first Internet protocol address, and the first Internet protocol address is associated with the first location. The processing module is further configured to send a first domain name system query request message to the first domain name system server by using a sending module.

In a possible implementation, the processing module is further configured to receive, by using the receiving module, first route advertisement information sent by the session management function network element. The first route advertisement information includes the address of the first domain name system server.

In a possible implementation, the first route advertisement information further includes a first Internet protocol prefix, and the first Internet protocol prefix is included in the first domain name system query request message sent by the communications apparatus to the first domain name system server.

In a possible implementation, the processing module is further configured to receive, by using the receiving module, second route advertisement information sent by the session management function network element. The second route advertisement information includes an address of a second domain name system server. The second domain name system server is a local domain name system server determined by the session management function network element for the communications apparatus based on a second location when the communications apparatus moves from the first location to the second location. A second Internet protocol address is associated with the second location. The processing module is further configured to send a second domain name system query request message to the second domain name system server by using the sending module.

In a possible implementation, the second route advertisement information further includes a second Internet protocol prefix, and the second Internet protocol prefix is included in the second domain name system query request message sent by the communications apparatus to the second domain name system server.

In a possible implementation, the processing module is further configured to: obtain, by using the receiving module, a second domain name query list supported by the second domain name system server from the session management function network element; and send the second domain name system query request message to the second domain name system server when the domain name of the first application is in the second domain name query list.

In a possible implementation, the processing module is further configured to: obtain, by using the receiving module, a first domain name query list supported by the first domain name system server from the session management function network element; and send the first domain name system query request message to the first domain name system server when the domain name of the first application is in the first domain name query list.

In a possible implementation, the communications apparatus is specifically user equipment.

In the sixth aspect of this application, the modules constituting the communications apparatus may further perform the steps described in the third aspect and the possible implementations. For details, refer to the description in the third aspect and the possible implementations.

According to a seventh aspect, an embodiment of this application further provides a request processing system, including a session management function network element, a user plane function network element, a communications apparatus, and a first domain name system server. The session management function network element is configured to determine an address of the first domain name system server based on a first location of the communications apparatus. The first domain name system server is a local domain name system server that resolves a domain name of a first application into a corresponding first Internet protocol address, and the first Internet protocol address is associated with the first location. The user plane function network element is configured to receive the address of the first domain name system server sent by the session management function network element. The communications apparatus is configured to send a domain name system query request message to the user plane function network element. The user plane function network element is configured to: receive the domain name system query request message sent by the communications apparatus, and send the domain name system query request message to the first domain name system server. The first domain name system server is configured to receive the domain name system query request message sent by the user plane function network element.

According to an eighth aspect, an embodiment of this application further provides a request processing system, including a session management function network element, a communications apparatus, and a first domain name system server. The session management function network element is configured to determine an address of the first domain name system server based on a first location of the communications apparatus. The first domain name system server is a local domain name system server that resolves a domain name of a first application into a corresponding first Internet protocol address, and the first Internet protocol address is associated with the first location. The communications apparatus is configured to: receive the address of the first domain name system server sent by the session management function network element, and send a first domain name system query request message to the first domain name system server. The first domain name system server is configured to receive the first domain name system query request message sent by the communications apparatus.

According to a ninth aspect, an embodiment of this application provides a computer-readable storage medium. The computer-readable storage medium stores instructions. When the instructions are run on a computer, the computer is enabled to perform the method according to the first aspect.

According to a tenth aspect, an embodiment of this application provides a computer program product including instructions. When the computer program product runs on a computer, the computer is enabled to perform the method according to the first aspect.

According to an eleventh aspect, an embodiment of this application provides an apparatus. The apparatus may include entities such as a session management function network element, a user plane function network element, and user equipment. The apparatus includes a processor and a memory. The memory is configured to store instructions, and the processor is configured to execute the instructions in the memory, so that the apparatus is enabled to perform the method according to any one of the first aspect, the second aspect, or the third aspect.

According to a twelfth aspect, this application provides a chip system. The chip system includes a processor, configured to support a session management function network element, a user plane function network element, and user equipment in implementing functions in the foregoing aspects, for example, sending or processing data and/or information in the foregoing methods. In a possible design, the chip system further includes a memory. The memory is configured to store program instructions and data that are necessary for the session management function network element, the user plane function network element, and the user equipment. The chip system may include a chip, or may include a chip and another discrete component.

BRIEF DESCRIPTION OF DRAWINGS

FIG. 7*b*-1 and FIG. 7*b*-2 are a schematic flowchart of interaction between an SMF, a BP, a UPF, and a DNS server according to an embodiment of this application;

FIG. 12*b*-1 and FIG. 12*b*-2 are another schematic flowchart of interaction between an SMF, a BP, a UPF, and a DNS server according to an embodiment of this application;

DESCRIPTION OF EMBODIMENTS

Figure 1:
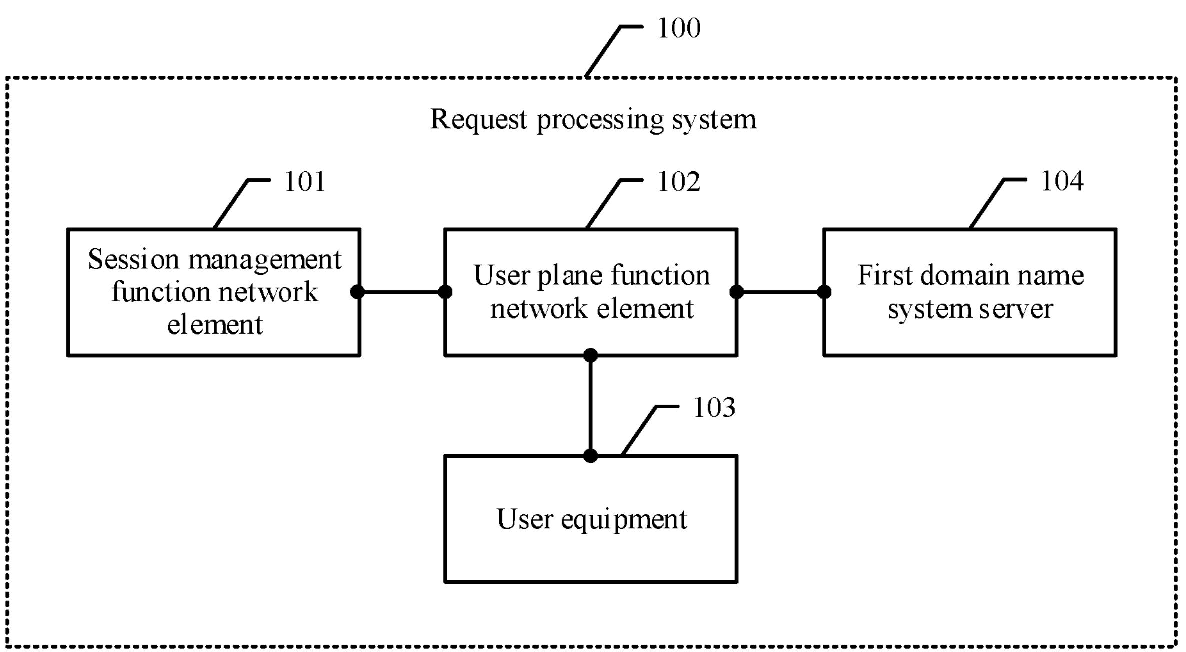
FIG. 1 is a schematic diagram of a composition structure of a request processing system according to an embodiment of this application.

Embodiments of this application provide a domain name system server determining method, and a request processing method, apparatus, and system, so that a session management function network element determines an address of a first domain name system server, and user equipment can query the first domain name system server for a domain name.

The following describes the embodiments of this application with reference to accompanying drawings.

In the specification, claims, and the accompanying drawings of this application, the terms “first”, “second”, and the like are intended to distinguish similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms “include”, “have”, and any other variations thereof are intended to cover the non-exclusive inclusion, so that a process, method, system, product, or device that includes a series of units is not limited to those units, but may include other units not expressly listed or inherent to such a process, method, product, or device.

The technical solutions in the embodiments of this application may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single-carrier frequency division multiple access (SC-FDMA) system, and another system. Terms “system” and “network” may be interchanged with each other. The CDMA system may implement wireless technologies such as universal terrestrial radio access (UTRA) and CDMA2000. The UTRA may include a wideband CDMA (WCDMA) technology and another variant technology of CDMA. CDMA2000 may cover the interim standard (IS) 2000 (IS-2000), the IS-95 standard, and the IS-856 standard. The TDMA system may implement wireless technologies such as a global system for mobile communications (GSM). The OFDMA system may implement wireless technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA. The UTRA corresponds to a UMTS, and the E-UTRA corresponds to an evolved version of the UMTS. A new version of the UMTS that uses the E-UTRA is used in long term evolution (LTE) and various versions evolved based on LTE in 3GPP. A 5th generation (“5G” for short) communications system or new radio (“NR” for short) is a next generation communications system under study. In addition, the communications system is further applicable to a future-oriented communications technology, and is applicable to the technical solutions provided in the embodiments of this application. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of a network architecture and emergence of a new service scenario, the technical solutions provided in the embodiments of this application are also applicable to similar technical problems.

In the embodiments of this application, a domain name system server determining method provided in the embodiments of this application is first described from a side of a session management function network element. In the method, the session management function network element determines an address of a first domain name system server based on a first location of an apparatus. For example, the apparatus may be a communications apparatus. For example, the communications apparatus may be user equipment, a chip, or another entity. The session management function network element determines the address of the first domain name system server based on a first location of the communications apparatus. Specifically, the communications apparatus is user equipment. In other words, the session management function network element determines the address of the first domain name system server based on a first location of the user equipment. In a subsequent embodiment, description is provided by using a first location of a yoghurt device as an example. The first domain name system server is a local domain name system server that resolves a domain name of a first application into a corresponding first Internet protocol address, and the first Internet protocol address is associated with the first location. The session management function network element sends the address of the first domain name system server to a first device. In the embodiments of this application, the first device has a plurality of implementations. For example, the first device may be a user plane function network element or user equipment. Descriptions are separately provided in subsequent embodiments. Specifically, when the first device may be a user plane function network element, refer to the descriptions of the following embodiments in FIG. 1 and FIG. 2; and when the first device is user equipment, refer to the descriptions of the following embodiments in FIG. 3 and FIG. 4.

When the first device is a user plane function network element, FIG. 1 is a schematic diagram of a composition structure of a request processing system according to an embodiment of this application. This embodiment of this application provides a request processing system 100, including a session management function (SMF) network element 101, a user plane function (UPF) network element 102, user equipment 103, and a first domain name system (DNS) server 104.

The session management function network element 101 is configured to: determine an address of the first domain name system server based on a first location of the user equipment, where the first domain name system server is a local domain name system server that resolves a domain name of a first application into a corresponding first Internet protocol (IP) address, and the first Internet protocol address is associated with the first location; and send the address of the first domain name system server to the user plane function network element 102.

The user plane function network element 102 is configured to receive the address of the first domain name system server sent by the session management function network element.

The user equipment 103 is configured to send a domain name system query request message to the user plane function network element 102.

The user plane function network element 102 is configured: to receive the domain name system query request message sent by the user equipment, and send the domain name system query request message to the first domain name system server.

The first domain name system server 104 is configured to receive the domain name system query request message sent by the user plane function network element.

The session management function network element 101 has a session management function. For example, the session management function network element 101 is responsible for UPF network element selection, UPF network element reselection, and IP address allocation, and is responsible for bearer establishment, modification, and release, and quality of service (QoS) control.

In addition, the session management function network element 101 further has a DNS server selection function. The session management function network element 101 first obtains a current location of the user equipment, where the current location is the first location. The session management function network element 101 selects the address of the first domain name system server based on the first location of the user equipment, and sends the address of the first domain name system server to the user plane function network element 102. Specifically, the first domain name system server is the local domain name system server corresponding to the first location. For example, two domain name system servers are deployed on a network: a local domain name system server and a remote domain name system server.

The local domain name system server (which may also be referred to as the first domain name system server) is a domain name system server relatively close to the user equipment or a domain name system server located in a local data center. The remote domain name system server (referred to as a third domain name system server) is a domain name system server relatively far from the user equipment or a domain name system server located in a remote data center. Application domain names that can be resolved by the local domain name system server and the remote domain name system server may be the same or different. The local data center and the remote data center may be deployed by a third-party application provider or an operator. This is not limited in this embodiment of this application.

In addition, in this embodiment of this application, "local" and "remote" are relative to the current location of the user equipment. All network elements or servers that are relatively close to the current location of the user equipment are referred to as local network elements or local servers, and all network elements or servers that are relatively far from the current location of the user equipment are referred to as remote network elements or remote servers. In an initial session establishment process, to ensure service continuity of an IP anchor, a deployment location of a user plane function network element selected by the session management function network element is relatively far from the user equipment, and the session management function network element may provide the user equipment with an address of the third domain name system server. In this case, when the user equipment initiates a domain name query, the address of the third domain name system server may be carried. Therefore, a destination address carried in the domain name system query request message sent by the user equipment 103 to the user plane function network element 102 is the address of the third domain name system server.

Because the first domain name system server is determined by the session management function network element 101 based on the first location, the first domain name system server may resolve the domain name of the first application into the corresponding first Internet protocol (IP) address. The first application is an application used or accessed by the user equipment. The first IP address is an IP address of an application server corresponding to the first application at the first location, that is, the first IP address is associated with the first location. The first location of the user equipment may be a location identified by a tracking area identity (TA).

In this embodiment of this application, the user plane function network element 102 may support all or some of the following functions: interconnecting a protocol data unit (PDU) session to a data network; packet routing and forwarding (for example, traffic can be uplink classified (ULCL) and then forwarded to the data network, or a branching point (BP) is supported to support a multi-homed PDU session); and data packet detection (for example, application detection based on a service data flow template and an additional optional packet flow description (PFD) received from an SMF). For example, in a ULCL scenario, a user plane function network element supporting a ULCL function may also be referred to as a ULCL node, and in a BP scenario, a user plane function network element supporting a BP function may also be referred to as a BP node.

In this embodiment of this application, the user plane function network element 102 may receive the address of the first domain name system server sent by the session management function network element 101, so that the user plane function network element 102 obtains the address of the first domain name system server. The user equipment 103 sends the domain name system query request message to the user plane function network element. In the initial session establishment process, the session management function network element 101 may provide the user equipment with the address of the third domain name system server, so that when the user equipment initiates the domain name query, the address of the third domain name system server may be carried. Therefore, the destination address carried in the domain name system query request message sent by the user equipment 103 to the user plane function network element 102 is the address of the third domain name system server. The user plane function network element 102 receives the domain name system query request message sent by the user equipment 103, and the user plane function network element 102 may determine that the destination address carried in the domain name system query request message is the address of the third domain name system server. Because the user plane function network element 102 obtains the address of the first domain name system server from the session management function network element 101, the user plane function network element 102 may not perform forwarding based on the destination address carried in the domain name system query request message, but send the domain name system query request message to the first domain name system server 104 based on an indication of the session management function network element 101, so that the first domain name system server 104 may receive the domain name system query request message sent by the user plane function network element 102. In this embodiment of this application, the first domain name system server 104 is used as the local domain name system server, and may provide the user equipment with a domain name system query service, to improve query efficiency of the domain name system server.

Figure 2:
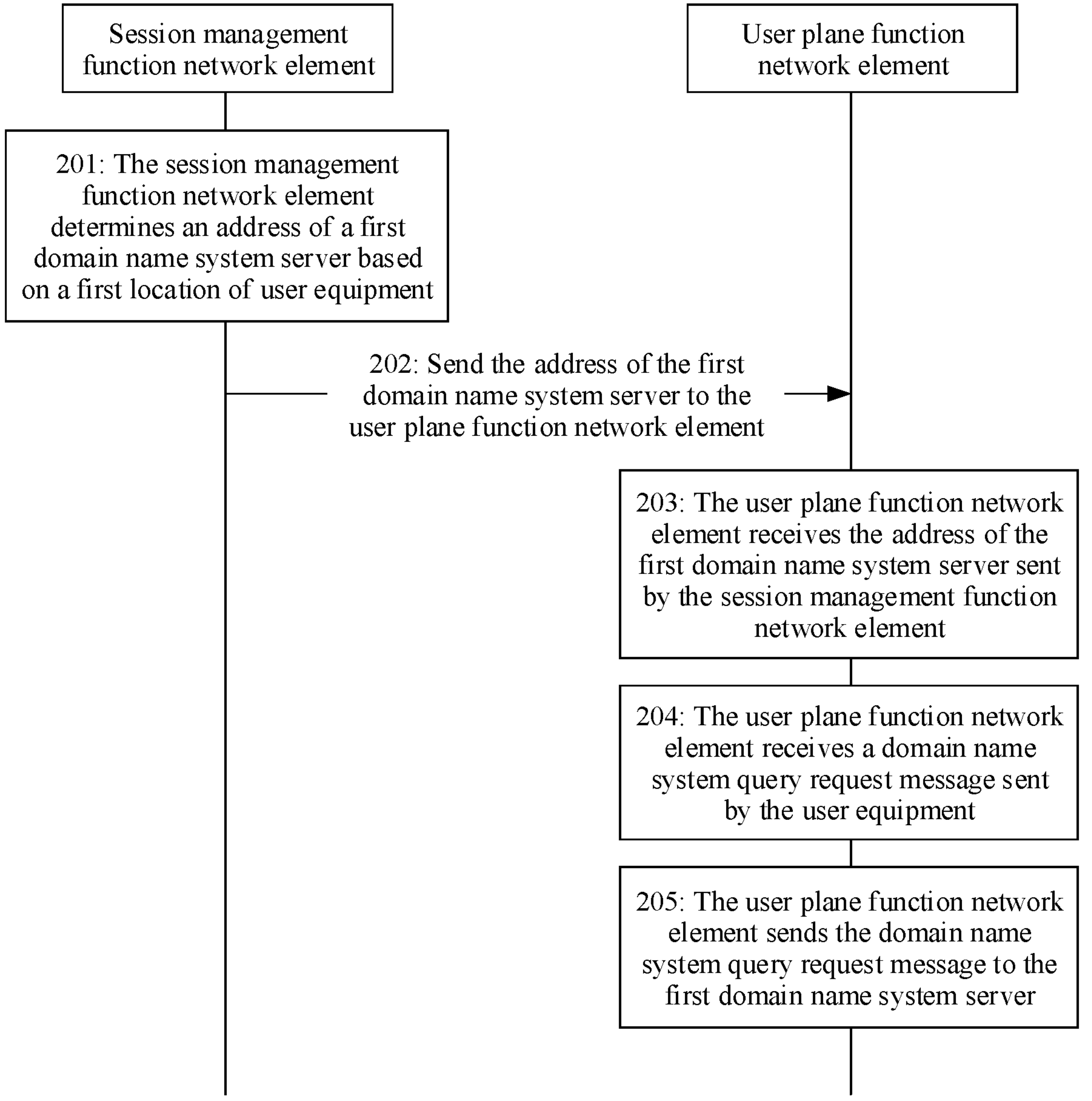
FIG. 2 is a schematic flowchart of interaction between a session management function network element and a user plane function network element according to an embodiment of this application.

Next, FIG. 2 is a schematic flowchart of interaction between a session management function network element and a user plane function network element according to an embodiment of this application. Based on the system architecture of the request processing system shown in FIG. 1, the interaction procedure mainly includes the following steps.

201: The session management function network element determines an address of a first domain name system server based on a first location of user equipment, where the first domain name system server is a local domain name system server that resolves a domain name of a first application into a corresponding first Internet protocol address, and the first Internet protocol address is associated with the first location.

In this embodiment of this application, the session management function network element has a domain name system server selection function. The session management function network element first obtains a current location of the user equipment, where the current location is the first location. The session management function network element selects the address of the first domain name system server based on the first location of the user equipment, and sends the address of the first domain name system server to the user plane function network element. For example, two domain name system servers are deployed on a network: a local domain name system server and a remote domain name system server. The local domain name system server (which may also be referred to as the first domain name system server) is a domain name system server relatively close to the user equipment or a domain name system server located in a local data center. The remote domain name system server (referred to as a third domain name system server) is a domain name system server relatively far from the user equipment or a domain name system server located in a remote data center. Domain names that can be resolved by the local domain name system server and the remote domain name system server may be the same or different. The local data center and the remote data center may be deployed by a third-party application provider or an operator. This is not limited in this embodiment of this application. In an initial session establishment process, the session management function network element provides the user equipment with an address of the third domain name system server, and a destination address carried when the user equipment initiates a domain name query is the address of the third domain name system server.

In this embodiment of this application, the session management function network element determines the first domain name system server based on the first location of the user equipment. Therefore, the first domain name system server may resolve the domain name of the first application into the corresponding first IP address. The first application is an application used or accessed by the user equipment. The first IP address is an IP address of an application server corresponding to the first application at the first location, that is, the first IP address is associated with the first location. The first location of the user equipment may be a location identified by a TA.

In some embodiments of this application, step 201 in which the session management function network element determines the address of the first domain name system server based on the first location of the user equipment includes:

- the session management function network element determines a deployment location of the first application based on the first location of the user equipment; and
- the session management function network element determines the address of the first domain name system server based on the deployment location of the first application.

The session management function network element obtains the first location of the user equipment, and then obtains, based on the first application used by the user equipment, the deployment location that is of the first application and that corresponds to the first location. For example, the deployment location of the first application may be represented by a data network access identifier (DNAI). For example, if the user equipment is currently located at a location 1 (for example, a TA-1), the session management function network element determines that a deployment location that is of the first application and that corresponds to the location 1 is a DNAI-1. The user equipment may access a DNS server 1 through a user plane function network element connected to the DNAI-1 or a user plane function network element supporting the DNAI-1. In addition, the user equipment may obtain the IP address corresponding to the domain name of the first application through the DNS server 1. If the user equipment moves to a location 2 (for example, a TA-2), the session management function network element determines that a deployment location that is of the first application and that corresponds to the location 2 is a DNAI-2. The user equipment may access a DNS server 2 through a user plane function network element connected to the DNAI-2 or a user plane function network element supporting the DNAI-2. In addition, the user equipment may obtain the IP address corresponding to the domain name of the first application through the DNS server 2. In the foregoing example, the session management function network element may determine the deployment location of the first application based on the first location of the user equipment, and further determine the address of the first domain name system server based on the deployment location of the first application.

202: The session management function network element sends the address of the first domain name system server to the user plane function network element.

In this embodiment of this application, after the session management function network element determines the address of the first domain name system server, the session management function network element may send the address of the first domain name system server to the user plane function network element. The user plane function network element is a user plane function network element determined by the session management function network element in the initial session establishment process, or a user plane function network element determined by the session management function network element after the initial session establishment is completed. This is not limited herein.

In this embodiment of this application, the user plane function network element has a function of a traffic steering node. For example, the user plane function network element may be a BP node in a BP scenario, or the user plane function network element may be a ULCL node in a ULCL scenario. This is not limited herein. In this embodiment of this application, the session management function network element may determine the address of the first domain name system server based on the first location of the user equipment, and send the address of the first domain name system server to the user plane function network element, so that the user plane function network element can send a domain name system query request message to the first domain name system server. The domain name system query request message may be referred to as a domain name system query request for short. Because the first domain name system server is the local domain name system server determined based on the first location of the user equipment, query efficiency of the domain name system server can be improved.

In some embodiments of this application, in addition to step 201 and step 202 performed by the session management function network element, the domain name system server determining method provided in this embodiment of this application may further include the following steps:

- the session management function network element allocates a first Internet protocol prefix to the user equipment, where the first Internet protocol prefix is included in a first domain name system query request message sent by the user equipment; and
- the session management function network element sends the first Internet protocol prefix to the user equipment.

The session management function network element may further determine the first Internet protocol prefix used by the user equipment. A source Internet protocol prefix carried when the user equipment sends the first domain name system query request message is the first Internet protocol prefix. For example, in the BP scenario, the first domain name system query request message sent by the user equipment needs to carry the first Internet protocol prefix, so that when the BP node receives the first domain name system query request message, the BP node can determine a user plane forwarding path based on the first Internet protocol prefix. The BP node sends the first domain name system query request message to the first domain name system server based on the user plane forwarding path.

After the session management function network element allocates the first Internet protocol prefix to the user equipment, the session management function network element may further send the first Internet protocol prefix to the user equipment. For example, the session management function network element may send the first Internet protocol prefix to the user equipment through the UPF network element and an access network (AN). The AN may be specifically a radio access network (RAN). For example, the session management function network element sends a route advertisement (RA) message to the user equipment. The route advertisement information may also be referred to as a route announcement message. The route advertisement information carries the first Internet protocol prefix, so that the user equipment can obtain the first Internet protocol prefix by resolving the route advertisement information. In addition, the user equipment may further learn, based on routing information included in the route advertisement information, that the first Internet protocol prefix may be carried when the user equipment sends the first domain name system query request message.

In some embodiments of this application, that the session management function network element sends the address of the first domain name system server to the user plane function network element includes:

the session management function network element sends a session request to the user plane function network element, where the session request includes the address of the first domain name system server and indication information, and the indication information is used to indicate the user plane function network element to set, to the address of the first domain name system server, a destination address of the received first domain name system query request message sent by the user equipment.

The session management function network element and the user plane function network element may communicate with each other through an N4 interface. For example, the session management function network element sends the session request to the user plane function network element, and the session request includes the address of the first domain name system server, so that the user plane function network element may resolve the session request to obtain the address of the first domain name system server.

In addition, the session request sent by the session management function network element may further carry the indication information, and the indication information is used to indicate the user plane function network element to set, to the address of the first domain name system server, the destination address of the received first domain name system query request message sent by the user equipment. For example, the destination address of the first domain name system query request message is modified to the address of the first domain name system server. To be specific, when the user equipment sends the first domain name system query request message to the user plane function network element, the user plane function network element modifies the destination address of the first domain name system query request message based on the indication information. For example, the destination address of the first domain name system query request message is the address of the third domain name system server, but the user plane function network element may set the destination address of the first domain name system query request message to the address of the first domain name system server based on the indication information.

203: The user plane function network element receives the address of the first domain name system server sent by the session management function network element, where the address of the first domain name system server is determined by the session management function network element based on the first location of the user equipment, the first domain name system server is the local domain name system server that resolves the domain name of the first application into the corresponding first Internet protocol address, and the first Internet protocol address is associated with the first location.

In this embodiment of this application, after the session management function network element determines the address of the first domain name system server, the session management function network element may send the address of the first domain name system server to the user plane function network element. For example, the session management function network element may send the address of the first domain name system server to the user plane function network element through the N4 interface.

The user plane function network element is a user plane function network element inserted by the session management function network element in the initial session establishment process, or the user plane function network element is a user plane function network element determined by the session management function network element after the initial session establishment is completed. This is not limited herein. In addition, the user plane function network element has the traffic steering function. For example, the user plane function network element may be the BP node in the BP scenario, or the user plane function network element may be the ULCL node in the ULCL scenario. This is not limited herein.

In this embodiment of this application, the first domain name system server is the local domain name system server. For example, two domain name system servers are deployed on the network: the local domain name system server and the remote domain name system server. The local domain name system server (which may also be referred to as the first domain name system server) is a domain name system server relatively close to the user equipment or a domain name system server located in the local data center. The remote domain name system server (referred to as the third domain name system server) is a domain name system server relatively far from the user equipment or a domain name system server located in the remote data center. The application domain names that can be resolved by the local domain name system server and the remote domain name system server may be the same or different. The local data center and the remote data center may be deployed by the third-party application provider or the operator. This is not limited in this embodiment of this application. In the initial session establishment process, the session management function network element may provide the user equipment with the address of the third domain name system server, so that the address of the third domain name system server is carried when the user equipment initiates a domain name query request.

Because the first domain name system server is determined based on the first location, the first domain name system server may resolve the domain name of the first application into the corresponding first IP address. The first application is an application used or accessed by the user equipment. The first IP address is the IP address of the application server corresponding to the first application at the first location, that is, the first IP address is associated with the first location. The first location of the user equipment may be the location identified by the TA.

204: The user plane function network element receives the domain name system query request message sent by the user equipment.

In this embodiment of this application, when the user equipment needs to query the domain name of the first application, the user equipment sends the domain name system query request message to the user plane function network element, and the domain name system query request message carries the domain name of the first application. The domain name of the first application may be a fully qualified domain name (FQDN). The domain name of the first application may alternatively be a domain name in another form. This is not limited in this embodiment of this application. The destination address carried in the domain name system query request message is the address of the third domain name system server. It can be learned from the description of step 203 that the address of the third domain name system server is an address of the remote domain name system server that is provided by the session management function network element for the user equipment in the initial session establishment process. Therefore, the destination address carried in the domain name system query request message sent by the user equipment to the user plane function network element is the address of the third domain name system server.

205: The user plane function network element sends the domain name system query request message to the first domain name system server.

In this embodiment of this application, the session management function network element may determine the address of the first domain name system server based on the first location of the user equipment, and send the address of the first domain name system server to the user plane function network element, so that the user plane function network element can obtain the address of the first domain name system server. When the user plane function network element receives the domain name system query request message sent by the user equipment, although the destination address carried in the domain name system query request message is the address of the third domain name system server, the user plane function network element does not send the domain name system query request message to the third domain name system server. In other words, the user plane function network element does not perform routing based on the destination address carried in the domain name system query request message sent by the user equipment. The user plane function network element needs to send the domain name system query request message to the first domain name system server based on an indication of the session management function network element. The first domain name system server is the local domain name system server determined by the session management function network element, and the user equipment may access the local domain name system server nearby to complete the domain name system query. In this way, query efficiency of the domain name system server can be improved.

In addition, in this embodiment of this application, there is a plurality of specific implementation methods in which the user plane function network element sends the domain name system query request message to the first domain name system server. This is not limited herein. For example, if the user plane function network element is an anchor user plane function network element, the user plane function network element may directly send the domain name system query request message to the first domain name system server through an N6 interface based on the address of the first domain name system server. If the user plane function network element is a user plane function network element supporting traffic steering, the user plane function network element supporting traffic steering first determines a user plane forwarding path corresponding to the domain name system query request message. The user plane function network element supporting traffic steering sends the received domain name system query request message to a next-hop user plane function network element based on the user plane forwarding path, and the next-hop user plane function network element forwards the domain name system query request message to the first domain name system server through the N6 interface. If the user plane function network element is a user plane function network element supporting traffic steering, further, the user plane function network element may be a BP node in a BP scenario, or the user plane function network element may be a ULCL node in a ULCL scenario. This is not limited herein.

In some embodiments of this application, in addition to step 203 to step 205 performed by the user plane function network element, the request processing method performed by the user plane function network element may further include the following step:

The user plane function network element receives the indication information sent by the session management function network element, where the indication information is used to indicate the user plane function network element to set, to the address of the first domain name system server, the destination address of the received domain name system query request message sent by the user equipment.

The session management function network element and the user plane function network element may communicate with each other through the N4 interface, and the session management function network element may further send the indication information to the user plane function network element. The indication information is used to indicate the user plane function network element to set, to the address of the first domain name system server, the destination address of the received domain name system query request message sent by the user equipment. To be specific, when the user equipment sends the domain name system query request message to the user plane function network element, the user plane function network element modifies the destination address of the first domain name system query request message based on the indication information. For example, the destination address of the first domain name system query request message is the address of the third domain name system server, but the user plane function network element may set the destination address of the first domain name system query request message to the address of the first domain name system server based on the indication information. For example, the session management function network element sends the session request to the user plane function network element, and the session request includes the address of the first domain name system server, so that the user plane function network element may resolve the session request to obtain the address of the first domain name system server. The session request may carry both the address of the first domain name system server and the indication information. The user plane function network element may set the destination address of the first domain name system query request message to the address of the first domain name system server based on the indication information, so that the user equipment can access the local domain name system server nearby. In addition, it can be ensured that the first domain name system server routes a response message corresponding to the first domain name system query request message to the user equipment through an optimal path.

It can be learned from the example descriptions of this application in the foregoing embodiments that, in this embodiment of this application, the session management function network element determines the address of the first domain name system server based on the first location of the user equipment. The first domain name system server is the local domain name system server that resolves the domain name of the first application into the corresponding first Internet protocol address, and the first Internet protocol address is associated with the first location. The session management function network element sends the address of the first domain name system server to the user plane function network element. After receiving the address of the first domain name system server sent by the session management function network element, the user plane function network element sends the domain name system query request message to the first domain name system server. In this embodiment of this application, the session management function network element may determine the address of the first domain name system server based on the first location of the user equipment, and the user plane function network element may obtain the address of the first domain name system server from the session management function network element. Then, the user plane function network element may send the domain name system query request message to the first domain name system server based on the address of the first domain name system server. This resolves a problem that the user equipment cannot determine a domain name system server to query a domain name. In this way, the user equipment can successfully query the domain name.

Figure 3:
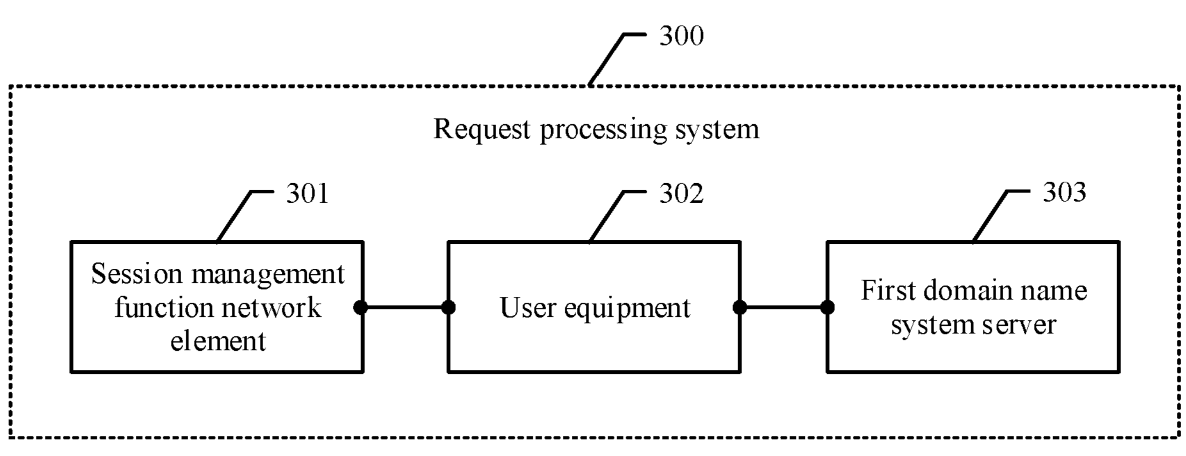
FIG. 3 is a schematic diagram of a composition structure of another request processing system according to an embodiment of this application.

When the first device is user equipment, FIG. 3 is a schematic diagram of a composition structure of a request processing system according to an embodiment of this application. This embodiment of this application provides a request processing system 300, including a session management function network element 301, user equipment 302, and a first domain name system server 303.

The session management function network element 301 is configured to determine an address of the first domain name system server based on a first location of the user equipment, where the first domain name system server is a local domain name system server that resolves a domain name of a first application into a corresponding first Internet protocol address, and the first Internet protocol address is associated with the first location.

The user equipment 302 is configured to: receive the address of the first domain name system server sent by the session management function network element, and send a first domain name system query request message to the first domain name system server.

The first domain name system server 303 is configured to receive the first domain name system query request message sent by user equipment.

The session management function network element 301 has a session management function. For example, the session management function network element 301 is responsible for UPF network element selection, UPF network element reselection, and IP address allocation, and is responsible for bearer establishment, modification, and release, and quality of service control.

In addition, the session management function network element 301 further has a DNS server selection function. The session management function network element 301 first obtains a current location of the user equipment, where the current location is the first location. The session management function network element 301 selects the address of the first domain name system server for the user equipment 302 based on the first location of the user equipment. Specifically, the first domain name system server is the local domain name system server. For example, two domain name system servers are deployed on a network: a local domain name system server and a remote domain name system server. The local domain name system server (which may also be referred to as the first domain name system server) is a domain name system server relatively close to the user equipment or a domain name system server located in a local data center. The remote domain name system server (referred to as a third domain name system server) is a domain name system server relatively far from the user equipment or a domain name system server located in a remote data center. Application domain names that can be resolved by the local domain name system server and the remote domain name system server may be the same or different. The local data center and the remote data center may be deployed by a third-party application provider or an operator. This is not limited in this embodiment of this application.

Because the first domain name system server is determined based on the first location, the first domain name system server may resolve the domain name of the first application into the corresponding first Internet protocol address. The first application is an application used or accessed by the user equipment. The first IP address is an IP address of an application server corresponding to the first application at the first location, that is, the first IP address is associated with the first location. The first location of the user equipment 302 may be a location identified by a TA.

In this embodiment of this application, the user equipment 302 and the session management function network element 301 may communicate with each other by using a user plane message or control plane information (for example, a NAS message). For example, the user equipment 302 may receive the address of the first domain name system server sent by the session management function network element 301, so that the user equipment 302 obtains the address of the first domain name system server.

The user equipment 302 sends the domain name system query request message to the user plane function network element, and the domain name system query request message carries the domain name of the first application. The domain name of the first application may be a fully qualified domain name (FQDN). The domain name of the first application may alternatively be a domain name in another form. This is not limited in this embodiment of this application. Because the user equipment 302 obtains the address of the first domain name system server from the session management function network element 301, a destination address carried in the domain name system query request message sent by the user equipment 302 is the address of the first domain name system server. The user plane function network element may perform forwarding based on the destination address carried in the domain name system query request message, so that the first domain name system server 303 may receive the domain name system query request message sent by the user plane function network element. In this embodiment of this application, the first domain name system server 303 is used as the local domain name system server, and may provide the user equipment with a domain name system query service, to improve query efficiency of the domain name system server.

Figure 4:
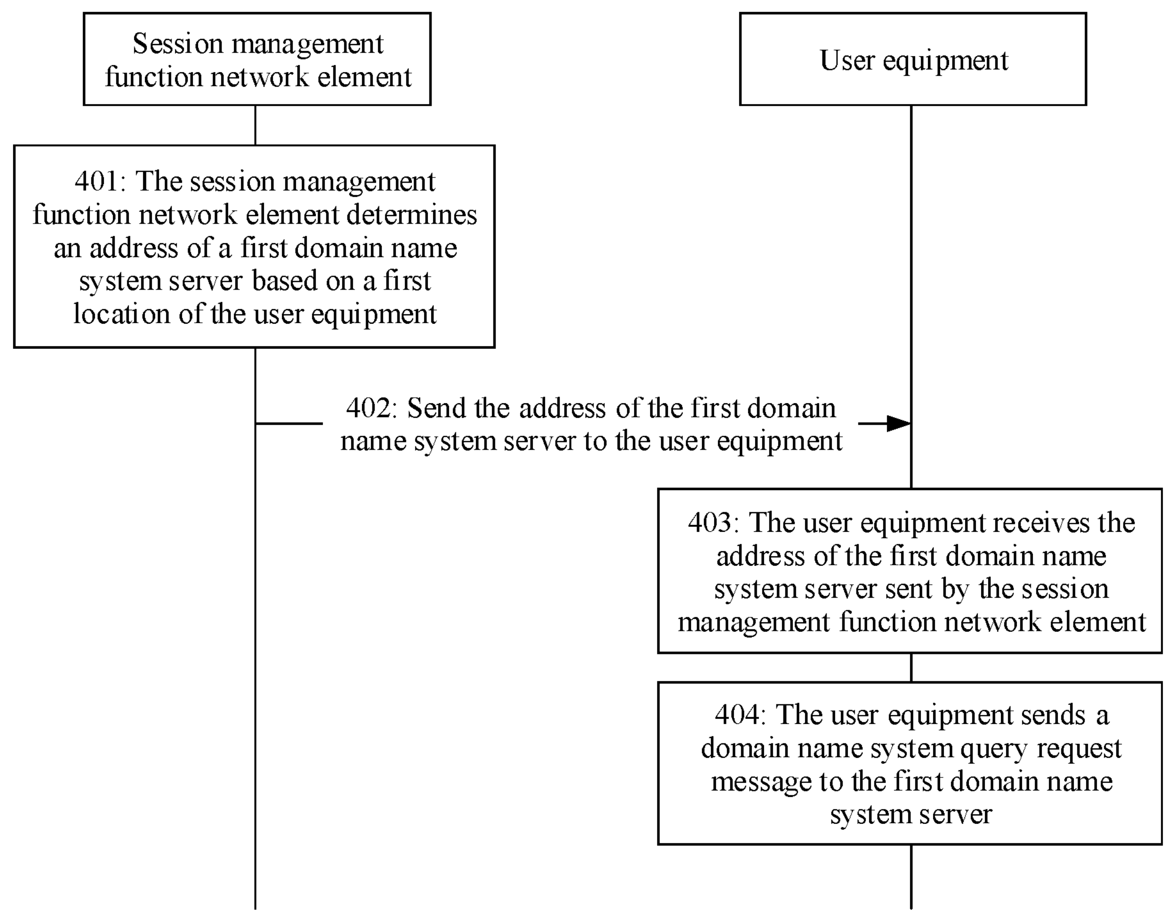
FIG. 4 is a schematic flowchart of interaction between a session management function network element and user equipment according to an embodiment of this application.

Next, FIG. 4 is a schematic flowchart of interaction between a session management function network element and user equipment according to an embodiment of this application. Based on the system architecture of the request processing system shown in FIG. 3, the interaction procedure mainly includes the following steps:

401: The session management function network element determines an address of a first domain name system server based on a first location of the user equipment, where the first domain name system server is a local domain name system server that resolves a domain name of a first application into a corresponding first Internet protocol address, and the first Internet protocol address is associated with the first location.

In this embodiment of this application, the session management function network element has a domain name system server selection function. The session management function network element first obtains a current location of the user equipment, where the current location is the first location. The session management function network element selects the address of the first domain name system server for the user plane function network element based on the first location of the user equipment. Specifically, the first domain name system server is the local domain name system server. For example, two domain name system servers are deployed on a network: a local domain name system server and a remote domain name system server. The local domain name system server (which may also be referred to as the first domain name system server) is a domain name system server relatively close to the user equipment or a domain name system server located in a local data center. The remote domain name system server (referred to as a third domain name system server) is a domain name system server relatively far from the user equipment or a domain name system server located in a remote data center. Application domain names that can be resolved by the local domain name system server and the remote domain name system server may be the same or different. The local data center and the remote data center may be deployed by a third-party application provider or an operator. This is not limited in this embodiment of this application.

In this embodiment of this application, the session management function network element determines the first domain name system server based on the first location of the user equipment. Therefore, the first domain name system server may resolve the domain name of the first application into the corresponding first IP address. The first application is an application used or accessed by the user equipment. The first IP address is an IP address of an application server corresponding to the first application at the first location, that is, the first IP address is associated with the first location. The first location of the user equipment may be a location identified by a TA.

In some embodiments of this application, step 401 in which the session management function network element determines the address of the first domain name system server based on the first location of the user equipment includes:

- the session management function network element determines a deployment location of the first application based on the first location of the user equipment; and
- the session management function network element determines the address of the first domain name system server based on the deployment location of the first application.

The session management function network element obtains the first location of the user equipment, and then obtains, based on the first application used by the user equipment, the deployment location that is of the first application and that corresponds to the first location. For example, the deployment location of the first application may be represented by a DNAI. For example, if the user equipment is currently located at a location 1 (for example, a TA-1), the session management function network element determines that a deployment location that is of the first application and that corresponds to the location 1 is a DNAI-1. The user equipment may access a DNS server 1 through a user plane function network element connected to the DNAI-1 or a user plane function network element supporting the DNAI-1. In addition, the user equipment may obtain the IP address corresponding to the domain name of the first application through the DNS server 1. If the user equipment moves to a location 2 (for example, a TA-2), the session management function network element determines that a deployment location that is of the first application and that corresponds to the location 2 is a DNAI-2. The user equipment may access a DNS server 2 through a user plane function network element connected to the DNAI-2 or a user plane function network element supporting the DNAI-2. In addition, the user equipment may obtain the IP address corresponding to the domain name of the first application through the DNS server 2. In the foregoing example, the session management function network element may determine the deployment location of the first application based on the first location of the user equipment, and further determine the address of the first domain name system server based on the deployment location of the first application.

402: The session management function network element sends the address of the first domain name system server to the user equipment.

In this embodiment of this application, after the session management function network element determines the address of the first domain name system server, the session management function network element may send the address of the first domain name system server to the user equipment. The user equipment and the session management function network element may communicate with each other by using a user plane message or control plane information (for example, a NAS message). In this embodiment of this application, the session management function network element may determine the address of the first domain name system server based on the first location of the user equipment, and send the address of the first domain name system server to the user equipment, so that the user equipment can send a domain name system query request message to the first domain name system server, and the first domain name system server is the local domain name system server. Therefore, query efficiency of the domain name system server can be improved.

In some embodiments of this application, in addition to step 401 and step 402 performed by the session management function network element, the domain name system server determining method provided in this embodiment of this application may further include the following steps:

- the session management function network element allocates a first Internet protocol prefix to the user equipment, where the first Internet protocol prefix is included in a first domain name system query request message sent by the user equipment; and
- the session management function network element sends the first Internet protocol prefix to the user equipment.

The session management function network element may further determine the first Internet protocol prefix used by the user equipment. A source Internet protocol prefix carried when the user equipment sends the first domain name system query request message is the first Internet protocol prefix. For example, in a BP scenario, the first domain name system query request message sent by the user equipment needs to carry the first Internet protocol prefix, so that when a BP node receives the first domain name system query request message, the BP node can determine a user plane forwarding path based on the first Internet protocol prefix.

The BP node sends the first domain name system query request message to the first domain name system server based on the user plane forwarding path.

After the session management function network element allocates the first Internet protocol prefix to the user equipment, the session management function network element may further send the first Internet protocol prefix to the user equipment. For example, the session management function network element may send the first Internet protocol prefix to the user equipment through the UPF network element and an AN. For example, the session management function network element sends route advertisement information to the user equipment. The route advertisement information carries the first Internet protocol prefix, so that the user equipment can obtain the first Internet protocol prefix by resolving the RA. In addition, the user equipment may further learn, based on routing information included in the route advertisement information, that the first Internet protocol prefix may be carried when the user equipment sends the first domain name system query request message.

In some embodiments of this application, that the session management function network element sends the address of the first domain name system server to the user equipment includes:

the session management function network element sends first route advertisement information to the user equipment, where the first route advertisement information includes the address of the first domain name system server, where the session management function network element and the user plane function network element may communicate with each other through an N4 interface, for example, the session management function network element sends the first route advertisement information to the user equipment; and the first route advertisement information includes the address of the first domain name system server, so that the user equipment may resolve the first route advertisement information to obtain the address of the first domain name system server.

Optionally, the session management function network element may further send control plane information to the user equipment, and the control plane information includes the address of the first domain name system server. For example, the control plane information may be a non-access stratum (NAS) message.

In some embodiments of this application, the session management function network element may send the address of the first domain name system server and the first Internet protocol prefix to the user equipment by using a same message. For example, the session management function network element sends the address of the first domain name system server and the first Internet protocol prefix to the user equipment by using a same route advertisement message.

In some other embodiments of this application, the session management function network element may alternatively send the address of the first domain name system server and the first Internet protocol prefix to the user equipment by using different messages. For example, the session management function network element sends the address of the first domain name system server to the user equipment by using control plane information (for example, a NAS message), and sends the first Internet protocol prefix to the user equipment by using route advertisement information.

In some embodiments of this application, in addition to sending, by the session management function network element, the address of the first domain name system server to the user equipment, the domain name system server determining method provided in this embodiment of this application may further include the following steps:

when the session management function network element learns that the user equipment moves from the first location to a second location, the session management function network element determines an address of a second domain name system server based on the second location, where the second domain name system server is a local domain name system server that resolves the domain name of the first application into a corresponding second Internet protocol address, and the second Internet protocol address is associated with the second location; and the session management function network element allocates a second Internet protocol prefix to the user equipment, and then the session management function network element sends second route advertisement information to the user equipment, where the second route advertisement information carries the second Internet protocol prefix and the address of the second domain name system server, and the second Internet protocol prefix is included in a second domain name system query request message sent by the user equipment to the second domain name system server.

When the user equipment is at the first location, the session management function network element sends the address of the first domain name system server to the user equipment, and the first domain name system server is the local domain name system server corresponding to the first location. Because the user equipment is movable, the user equipment may move from the first location to the second location. When the user equipment moves from the first location to the second location, the session management function network element determines the address of the second domain name system server based on the second location at which the user equipment is located after the user equipment moves. The second domain name system server is the local domain name system server that resolves the domain name of the first application into the corresponding second Internet protocol address, and the second Internet protocol address is associated with the second location. The session management function network element determines an address of a new domain name system server (namely, the second domain name system server) based on a moved location (namely, the second location) of the user equipment, so that the session management function network element may determine the latest local domain name system server for the user equipment, to ensure that the user equipment can correctly query a domain name.

When the user equipment moves from the first location to the second location, the session management function network element may further determine the second Internet protocol prefix used by the user equipment. A source Internet protocol prefix carried when the user equipment sends the second domain name system query request message is the second Internet protocol prefix. For example, in the BP scenario, the second domain name system query request message sent by the user equipment needs to carry the second Internet protocol prefix, so that when a user plane function network element having a BP function receives the second domain name system query request message, an Internet protocol prefix used by the user equipment may be determined based on the second Internet protocol prefix, to further determine a user plane forwarding path of the second domain name system query request message.

After the session management function network element allocates the second Internet protocol prefix to the user equipment, the session management function network element may further send the second Internet protocol prefix to the user equipment. For example, the session management function network element may send the second Internet protocol prefix to the user equipment through the UPF network element and the AN. For example, the session management function network element sends the second route advertisement information to the user equipment. The second route advertisement information carries the second Internet protocol prefix and the address of the second domain name system server, so that the user equipment can obtain the second equipment sends the second domain name system query request message to the second domain name system server, the user equipment may add the second Internet protocol prefix to the second domain name system query request message.

Optionally, the session management function network element may further send control plane information to the user equipment, and the control plane information includes the address of the second domain name system server. For example, the control plane information may be a NAS message.

In some embodiments of this application, the session management function network element may send the address of the second domain name system server and the second Internet protocol prefix to the user equipment by using a same message. For example, the session management function network element sends the address of the second domain name system server and the second Internet protocol prefix to the user equipment by using a same piece of route advertisement information.

In some other embodiments of this application, the session management function network element may alternatively send the address of the second domain name system server and the second Internet protocol prefix to the user equipment by using different messages. For example, the session management function network element sends the address of the second domain name system server to the user equipment by using control plane information (for example, a NAS message), and sends the second Internet protocol prefix to the user equipment by using route advertisement information.

For example, if the user equipment initiates session establishment at an initial location and a BP node is inserted into the session management function network element, the user equipment obtains a local DNS server address from the session management function network element. Because the user equipment is movable, when the user equipment moves to a target location, a BP relocation process may occur. To be specific, the session management function network element needs to reselect a local UPF network element and a BP node. In this case, based on new location information, the session management function network element further needs to send a new local DNS server address to the user equipment, to ensure that the user equipment obtains the new local DNS server address corresponding to the current location.

In some embodiments of this application, in addition to sending, by the session management function network element, the address of the first domain name system server to the user equipment, the domain name system server determining method provided in this embodiment of this application may further include the following step:

the session management function network element sends a first domain name query list supported by the first domain name system server to the user equipment, where the first domain name query list is used by the user equipment to send the first domain name system query request message to the first domain name system server when the domain name of the first application is in the first domain name query list.

The session management function network element may configure a domain name query list supported by each domain name system server. The domain name query list records all domain name suffixes supported by the domain name system server. The domain name query list may also be referred to as a domain name suffix list. For example, the session management function network element may configure the first domain name query list supported by the first domain name system server, and the session management function network element may configure a second domain name query list supported by the second domain name system server. The session management function network element may further send the domain name query list supported by each domain name system server to the user equipment. For example, the session management function network element may further send the first domain name query list supported by the first domain name system server to the user equipment, and the session management function network element may further send the second domain name query list supported by the second domain name system server to the user equipment.

When the user equipment needs to query the domain name of the first application, the user equipment may query the first domain name query list, to determine whether the domain name of the first application is in the first domain name query list. When the domain name of the first application is in the first domain name query list, the user equipment sends the first domain name system query request message to the first domain name system server. In this way, the user equipment may learn that different domain name suffixes correspond to different DNS servers, and when performing a DNS query, the user equipment may query a domain name based on a corresponding DNS server.

403: The user equipment receives the address of the first domain name system server sent by the session management function network element, where the address of the first domain name system server is determined by the session management function network element based on the first location of the user equipment, the first domain name system server is the local domain name system server that resolves the domain name of the first application into the corresponding first Internet protocol address, and the first Internet protocol address is associated with the first location.

In this embodiment of this application, after the session management function network element determines the address of the first domain name system server, the session management function network element may send the address of the first domain name system server to the user equipment. For example, the session management function network element may send the address of the first domain name system server to the user equipment through the user plane function network element and the AN.

The user plane function network element is a user plane function network element inserted by the session management function network element in an initial session establishment process. The user plane function network element has a traffic steering function. For example, the user plane function network element may be a BP node in the BP scenario, or the user plane function network element may be a ULCL node in a ULCL scenario. This is not limited herein.

In this embodiment of this application, the first domain name system server is the local domain name system server.

For example, two domain name system servers are deployed on the network: the local domain name system server and the remote domain name system server. The local domain name system server (which may also be referred to as the first domain name system server) is a domain name system server relatively close to the user equipment or a domain name system server located in the local data center. The remote domain name system server (referred to as the third domain name system server) is a domain name system server relatively far from the user equipment or a domain name system server located in the remote data center. The application domain names that can be resolved by the local domain name system server and the remote domain name system server may be the same or different. The local data center and the remote data center may be deployed by the third-party application provider or the operator. This is not limited in this embodiment of this application.

Because the first domain name system server is determined based on the first location, the first domain name system server may resolve the domain name of the first application into the corresponding first IP address. The first application is an application used or accessed by the user equipment. The first IP address is the IP address of the application server corresponding to the first application at the first location, that is, the first IP address is associated with the first location. The first location of the user equipment may be the location identified by the TA.

In some embodiments of this application, step 403 in which the user equipment receives the address of the first domain name system server sent by the session management function network element includes:

- optionally, the user equipment receives the control plane information sent by the session management function network element, where the control plane information includes the address of the first domain name system server, and for example, the control plane information may be a NAS message; and
- optionally, the user equipment receives the first route advertisement information sent by the session management function network element, where the first route advertisement information includes the address of the first domain name system server.

The session management function network element and the user equipment may communicate with each other through the user plane function network element, and the session management function network element and the user plane function network element may communicate with each other through the N4 interface. For example, the session management function network element sends the first route advertisement information to the user equipment. The first route advertisement information includes the address of the first domain name system server. The user equipment may receive the first route advertisement information through the N4 interface, so that the user equipment may resolve the first route advertisement information to obtain the address of the first domain name system server.

In some embodiments of this application, the first route advertisement information further includes the first Internet protocol prefix, and the first Internet protocol prefix is included in the first domain name system query request message sent by the user equipment to the first domain name system server.

The session management function network element may further determine the first Internet protocol prefix used by the user equipment. The source Internet protocol prefix carried when the user equipment sends the first domain name system query request message is the first Internet protocol prefix. For example, in the BP scenario, the first domain name system query request message sent by the user equipment needs to carry the first Internet protocol prefix, so that when receiving the first domain name system query request message, the user plane function network element having the BP function can determine a forwarding path of the first domain name system query request message based on the first Internet protocol prefix.

After the session management function network element allocates the first Internet protocol prefix to the user equipment, the session management function network element may further send the first Internet protocol prefix to the user equipment. For example, the session management function network element may send the first Internet protocol prefix to the user equipment through the UPF network element and the AN. For example, the session management function network element sends the first route advertisement information to the user equipment. The first route advertisement information carries the first Internet protocol prefix, so that the user equipment can obtain the first Internet protocol prefix by resolving the first route advertisement information. When the user equipment sends the first domain name system query request message, the first Internet protocol prefix may be carried.

In some embodiments of this application, the session management function network element may send the address of the first domain name system server and the first Internet protocol prefix to the user equipment by using a same message. For example, the session management function network element sends the address of the first domain name system server and the first Internet protocol prefix to the user equipment by using a same piece of route advertisement information. In some embodiments of this application, the session management function network element may alternatively send the address of the first domain name system server and the first Internet protocol prefix to the user equipment by using different messages. For example, the session management function network element sends the address of the first domain name system server to the user equipment by using control plane information (for example, a NAS message), and sends the first Internet protocol prefix to the user equipment by using route advertisement information.

404: The user equipment sends the domain name system query request message to the first domain name system server.

In this embodiment of this application, the session management function network element may determine the address of the first domain name system server based on the first location of the user equipment, and send the address of the first domain name system server to the user equipment, so that the user equipment can obtain the address of the first domain name system server. When the first domain name system server receives the domain name system query request message sent by the user equipment, the domain name system query request message carries the domain name of the first application. The domain name of the first application may be an FQDN. The domain name of the first application may alternatively be a domain name in another form. This is not limited in this embodiment of this application. The destination address carried in the domain name system query request message is the address of the first domain name system server. The user equipment sends the domain name system query request message to the first domain name system server based on an indication of the session management function network element. The first domain name system server is the local domain name system server. In this way, the user equipment may access the local domain name system server nearby to perform the domain name system query, so that query efficiency of the domain name system server can be improved.

In some embodiments of this application, in addition to step 403 and step 404 performed by the user equipment, the request processing method performed by the user equipment may further include the following steps:

optionally, the user equipment receives the second route advertisement information sent by the session management function network element, where the second route advertisement information includes the address of the second domain name system server, the second domain name system server is the local domain name system server determined by the session management function network element for the user equipment based on the second location when the user equipment moves from the first location to the second location, and the second Internet protocol address is associated with the second location; and optionally, the user equipment receives the control plane information sent by the session management function network element, where the control plane information includes the address of the second domain name system server; and the user equipment sends the second domain name system query request message to the second domain name system server.

When the user equipment is at the first location, the session management function network element sends the address of the first domain name system server to the user equipment, and the first domain name system server is the local domain name system server corresponding to the first location. Because the user equipment is movable, the user equipment may move from the first location to the second location. When the user equipment moves from the first location to the second location, the session management function network element determines the address of the second domain name system server based on the second location at which the user equipment is located after the user equipment moves. The second domain name system server is the local domain name system server that resolves the domain name of the first application into the corresponding second Internet protocol address, and the second Internet protocol address is associated with the second location. The session management function network element determines the address of the new domain name system server (namely, the second domain name system server) based on the subsequent location (namely, the second location) of the user equipment, so that the session management function network element may determine the latest local domain name system server for the user equipment, to ensure that the user equipment can correctly query the domain name.

Further, in some embodiments of this application, the second route advertisement information further includes the second Internet protocol prefix, and the second Internet protocol prefix is included in the second domain name system query request message sent by the user equipment to the second domain name system server.

When the user equipment moves from the first location to the second location, the session management function network element may further determine the second Internet protocol prefix used by the user equipment. The source Internet protocol prefix carried when the user equipment sends the second domain name system query request message is the second Internet protocol prefix. For example, in the BP scenario, the second domain name system query request message sent by the user equipment needs to carry the second Internet protocol prefix, so that when receiving the second domain name system query request message, the user plane function network element having the BP function can determine the forwarding path of the second domain name system query request message based on the second Internet protocol prefix.

After the session management function network element allocates the second Internet protocol prefix to the user equipment, the session management function network element may further send the second Internet protocol prefix to the user equipment. For example, the session management function network element may send the second Internet protocol prefix to the user equipment through the UPF network element and the AN. For example, the session management function network element sends the second route advertisement information to the user equipment. The second route advertisement information carries the second Internet protocol prefix and the address of the second domain name system server, so that the user equipment can obtain the second equipment sends the second domain name system query request message, the second Internet protocol prefix may be carried.

In some embodiments of this application, the session management function network element may send the address of the second domain name system server and the second Internet protocol prefix to the user equipment by using a same message. For example, the session management function network element sends the address of the second domain name system server and the second Internet protocol prefix to the user equipment by using a same piece of route advertisement information. In some embodiments of this application, the session management function network element may alternatively send the address of the second domain name system server and the second Internet protocol prefix to the user equipment by using different messages. For example, the session management function network element sends the address of the second domain name system server to the user equipment by using control plane information (for example, a NAS message), and sends the second Internet protocol prefix to the user equipment by using route advertisement information.

In some embodiments of this application, in addition to step 403 and step 404 performed by the user equipment, the request processing method performed by the user equipment may further include the following steps:

the user equipment obtains the first domain name query list supported by the first domain name system server from the session management function network element, and the user equipment sends the first domain name system query request message to the first domain name system server when the domain name of the first application is in the first domain name query list.

The session management function network element may configure the domain name query list supported by each domain name system server. The domain name query list records all the domain name suffixes supported by the domain name system server. The domain name query list may also be referred to as a domain name suffix list. For example, the session management function network element may configure the first domain name query list supported by the first domain name system server. The session management function network element may further send the domain name query list supported by each domain name system server to the user equipment. For example, the session management function network element may further send the first domain name query list supported by the first domain name system server to the user equipment.

When the user equipment needs to query the domain name of the first application, the user equipment may query the first domain name query list, to determine whether the domain name of the first application is in the first domain name query list. When the domain name of the first application is in the first domain name query list, the user equipment sends the first domain name system query request message to the first domain name system server. In this way, the user equipment may learn that different domain name suffixes correspond to different DNS servers, and when performing the DNS query, the user equipment may query the domain name based on the corresponding DNS server.

In some embodiments of this application, in addition to step 403 and step 404 performed by the user equipment, the request processing method performed by the user equipment may further include the following steps:

the user equipment obtains the second domain name query list supported by the second domain name system server from the session management function network element, and the user equipment sends the second domain name system query request message to the second domain name system server when the domain name of the first application is in the second domain name query list.

The session management function network element may configure the domain name query list supported by each domain name system server. The domain name query list records all the domain name suffixes supported by the domain name system server. The domain name query list may also be referred to as a domain name suffix list. For example, the session management function network element may configure the second domain name query list supported by the second domain name system server. The session management function network element may further send the domain name query list supported by each domain name system server to the user equipment. For example, the session management function network element may further send the second domain name query list supported by the second domain name system server to the user equipment. When the user equipment needs to query the domain name of the first application, the user equipment may query the second domain name query list, to determine whether the domain name of the first application is in the second domain name query list. When the domain name of the first application is in the second domain name query list, the user equipment sends the second domain name system query request message to the second domain name system server. In this way, the user equipment may learn that different domain name suffixes correspond to different DNS servers, and when performing the DNS query, the user equipment may query the domain name based on the corresponding DNS server.

It can be learned from the example descriptions of this application in the foregoing embodiments that, in this embodiment of this application, the session management function network element determines the address of the first domain name system server based on the first location of the user equipment. The first domain name system server is the local domain name system server that resolves the domain name of the first application into the corresponding first Internet protocol address, and the first Internet protocol address is associated with the first location. The session management function network element sends the address of the first domain name system server to the user equipment. After receiving the address of the first domain name system server sent by the session management function network element, the user equipment sends the domain name system query request message to the first domain name system server. In this embodiment of this application, the session management function network element may determine the address of the first domain name system server based on the first location of the user equipment, and the user equipment may obtain the address of the first domain name system server from the session management function network element. Then, the user equipment may send the domain name system query request message to the first domain name system server based on the address of the first domain name system server. This resolves a problem that the user equipment cannot determine a domain name system server to query a domain name. In this way, the user equipment can successfully query the domain name.

To better understand and implement the foregoing solutions in the embodiments of this application, the following uses corresponding application scenarios as examples for specific description.

Figures 5, 6:
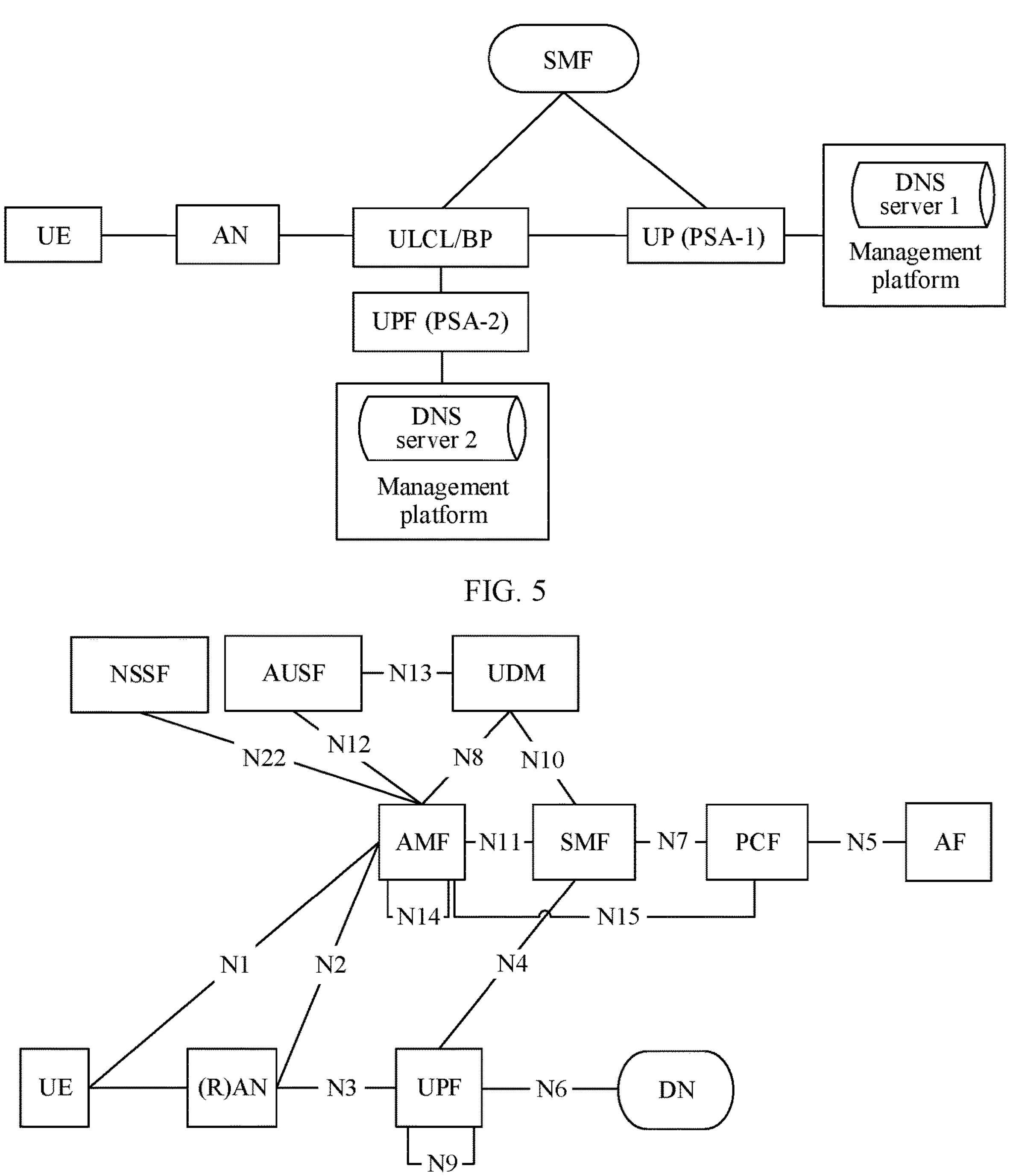
FIG. 5 is a schematic diagram of a system framework of a request processing system according to an embodiment of this application.
FIG. 6 is a schematic diagram of an architecture of a next-generation mobile network according to an embodiment of this application.

FIG. 5 is a schematic diagram of a system framework of a request processing system according to an embodiment of this application. The request processing system may include an SMF, UE, an AN, a ULCL, a UPF (PSA-1), a DNS server 1, a UPF (PSA-2), and a DNS server 2. Alternatively, the request processing system may include an SMF, UE, an AN, a BP, a UPF (PSA-1), a DNS server 1, a UPF (PSA-2), and a DNS server 2.

The ULCL and the BP refer to user plane function network elements having a traffic steering function. The UPF (PSA-1) refers to a PDU session anchor (PSA) 1 or an anchor UPF network element 1. The UPF (PSA-2) is a PDU session anchor 2 or an anchor UPF network element 2. The DNS server 1 and the DNS server 2 belong to different data centers or different mobile edge computing (MEC) management platforms. The UPF (PSA-1) may communicate with the DNS server 1, and the UPF (PSA-2) may communicate with the DNS server 2.

The DNS server 1 and the DNS server 2 are deployed at different locations on a network. For example, the DNS server 1 is located in a centralized data center or on a remote management platform and is relatively far from a current location of the UE. The DNS server 1 may be referred to as a remote DNS server. The DNS server 2 is located in a distributed data center or on a local management platform and is relatively close to the current location of the UE. The DNS server 2 may be referred to as a local DNS server. The DNS server 1 is mainly responsible for resolving a domain name of an application deployed on the remote management platform, and the DNS server 2 is mainly responsible for resolving a domain name of an application deployed on the local management platform. The DNS server 1 and the DNS server 2 may have a same domain name resolution capability or different domain name resolution capabilities. For example, the domain name that the DNS server 1 is responsible for resolving and the domain name that the DNS server 2 is responsible for resolving may be the same or different. In addition, IP addresses of the two DNS servers in FIG. 5 may be different or the same.

For a PDU session, if the SMF inserts a BP node or a ULCL node into the PDU session, and different DNS servers are deployed close to different PSAs, this embodiment of this application provides a specific solution in which the SMF determines a DNS server address to be returned to the UE. For details, refer to the following examples.

In a BP scenario, the UE obtains a plurality of IPv6 prefixes. For example, the UE obtains an "IPv6 prefix-1 @PSA-1" and an "IPv6 prefix-2 @PSA-2". The "IPv6 prefix-1 @PSA-1" indicates that the IPv6 prefix-1 corresponds to the PSA-1. To be specific, the PSA-1 supports the IPv6 prefix-1. If a data packet from the UE carries a source IPv6 prefix-1, the data packet is sent to the network through the PSA-1. The "IPv6 prefix-2 @PSA-2" indicates that the IPv6 prefix-2 corresponds to the PSA-2. To be specific, the PSA-2 supports the IPv6 prefix-2. If a data packet from the UE carries a source IPv6 prefix-2, the data packet is sent to the network through the PSA-2.

If a DNS server address obtained by the UE is an address of a server close to the PSA-2, namely, the DNS server 2, but the source IPv6 prefix-1 is carried when the UE performs a DNS query, the BP node may route a DNS query request to the PSA-1 based on the source IP prefix, and then the PSA-1 routes the request to the local DNS server (the DNS server 2) based on a destination IP address (namely, the address of the DNS server 2). As a result, the path is not optimal. For the BP scenario, this embodiment of this application provides a specific solution of which IP prefix needs to be used by the UE as a source IP prefix to perform the DNS query.

In some embodiments of this application, the embodiments of this application provide a solution in which the UE obtains only an address of a DNS server relatively close to the current location or obtains only an address of a DNS server relatively far from the current location. For example, the SMF sends a local DNS server address to the UE, and the UE always uses the local DNS server to initiate a query, to improve DNS query efficiency. Alternatively, the SMF sends a remote DNS server address to the UE, and the UE always uses the remote DNS server to initiate a query. However, in this solution, the BP node or the ULCL has a determining function, and determines to set, to the local DNS server address, the destination address in the DNS query request from the UE, so as to improve DNS query efficiency.

In some embodiments of this application, the embodiments of this application provide a solution in which the UE simultaneously obtains DNS server addresses corresponding to two deployment locations, that is, the UE simultaneously obtains an address of a DNS server relatively close to the current location and an address of a DNS server relatively far from the current location. The SMF provides addresses and functions of two different DNS servers to the UE. This can ensure that different DNS functions are distinguished on the UE side and that the UE uses a correct source IP prefix and DNS server address for the query.

FIG. 6 is a schematic diagram of an architecture of a next-generation mobile network according to an embodiment of this application. The embodiments of this application may be applied to the next-generation mobile network architecture. The following describes main network elements in the embodiments of this application.

A RAN is used to implement a radio-related function.

An access and mobility management function (AMF) is responsible for user mobility management, including mobility status management, temporary user identity allocation, and user authentication and authorization.

An SMF is responsible for UPF network element selection, UPF network element reselection, and IP address allocation, and is responsible for bearer establishment, modification, and release, and QoS control.

A policy control function (PCF) includes functions of policy control decision and flow-based charging control, including a user subscription data management function, a policy control function, a charging policy control function, QoS control, and the like.

A unified data management (UDM) network element is responsible for managing subscription data, and notifying a corresponding network element when the subscription data is modified.

A unified data repository (UDR) function stores and retrieves subscription data, policy data, common architecture data, and the like, and is used by UDM, PCF, and a NEF to obtain related data. The UDR needs to provide different data access authentication mechanisms for different types of data, such as the subscription data and the policy data, to ensure data access security. For an invalid service-oriented operation or data access request, the UDR needs to be able to return a failure response with an appropriate cause value.

An application server (application function, AF) provides an application-layer service for UE. When providing the service for the UE, the AF has requirements on a quality of service QoS policy and a charging policy, and needs to notify a network. In addition, the AF also needs application-related information fed back by a core network.

A network exposure function (NEF) mainly supports a network exposure function, and exposes a network capability and a service to the outside. A 3GPP network function (NF) releases a function and an event to another NF through the NEF. The capability and the event opened by the NF can be securely opened to a third-party application. The NEF uses a standardized interface (Nudr) of a unified data repository (UDR) to store/retrieve structured data, and translates exchange information of an AF with exchange information of an internal network function. For example, the NEF translates an AF service identifier AF-Service-Identifier with internal 5G core information.

The UPF supports all or some of the following functions: interconnecting a PDU session with a data network; packet routing and forwarding (for example, traffic can be first uplink classified and then forwarded to the data network, or a BP scenario is supported to support a multi-homed PDU session); and data packet detection (for example, application detection based on a service data flow template and an additional optional packet flow description (PFD) received from an SMF).

The following separately describes the technical solutions provided in the embodiments of this application by using six embodiments.

Embodiment 1 of this Application

Figure 7A:
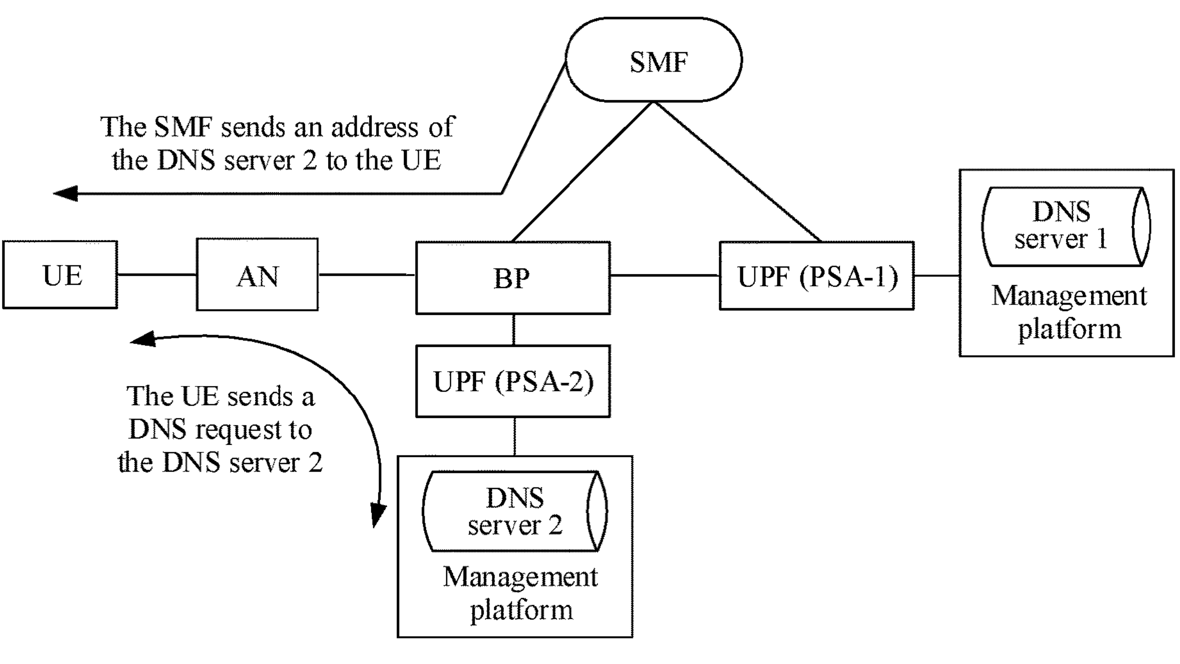
FIG. 7*a* is a schematic diagram of a system architecture for interaction between an SMF and UE according to an embodiment of this application.

FIG. 7*a* is a schematic diagram of a system architecture for interaction between an SMF and UE according to an embodiment of this application. In FIG. 7*a*, the SMF stores DNS server addresses corresponding to different locations on a network. A deployment location of a DNS server may be represented by a DNAI. The SMF determines an address of a DNS server (namely, a local DNS server close to a PSA-2) based on a DNAI corresponding to a current location of the UE, and sends the address to the UE. For an IPv6 multi-homed PDU session, the SMF allocates two IPv6 prefixes to the UE, and the SMF sends IPv6 @PSA-2 and a multi-homed routing rule to the UE by using a route advertisement (RA). The UE determines to use the IPv6 prefix @PSA-2 as a source IP prefix to initiate a DNS query according to the multi-homed routing rule.

Figures 1, 7B:
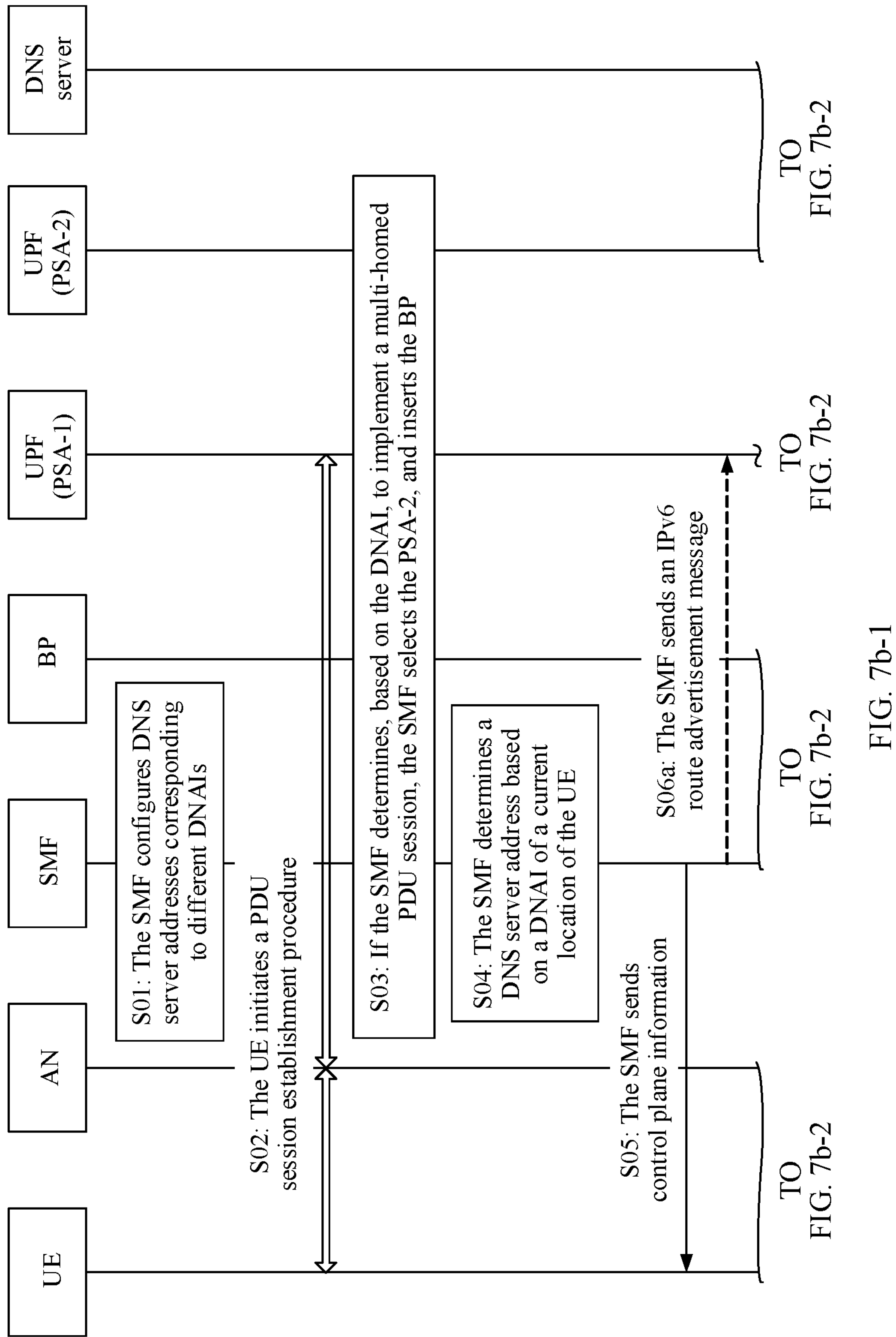
Figures 2, 7B:
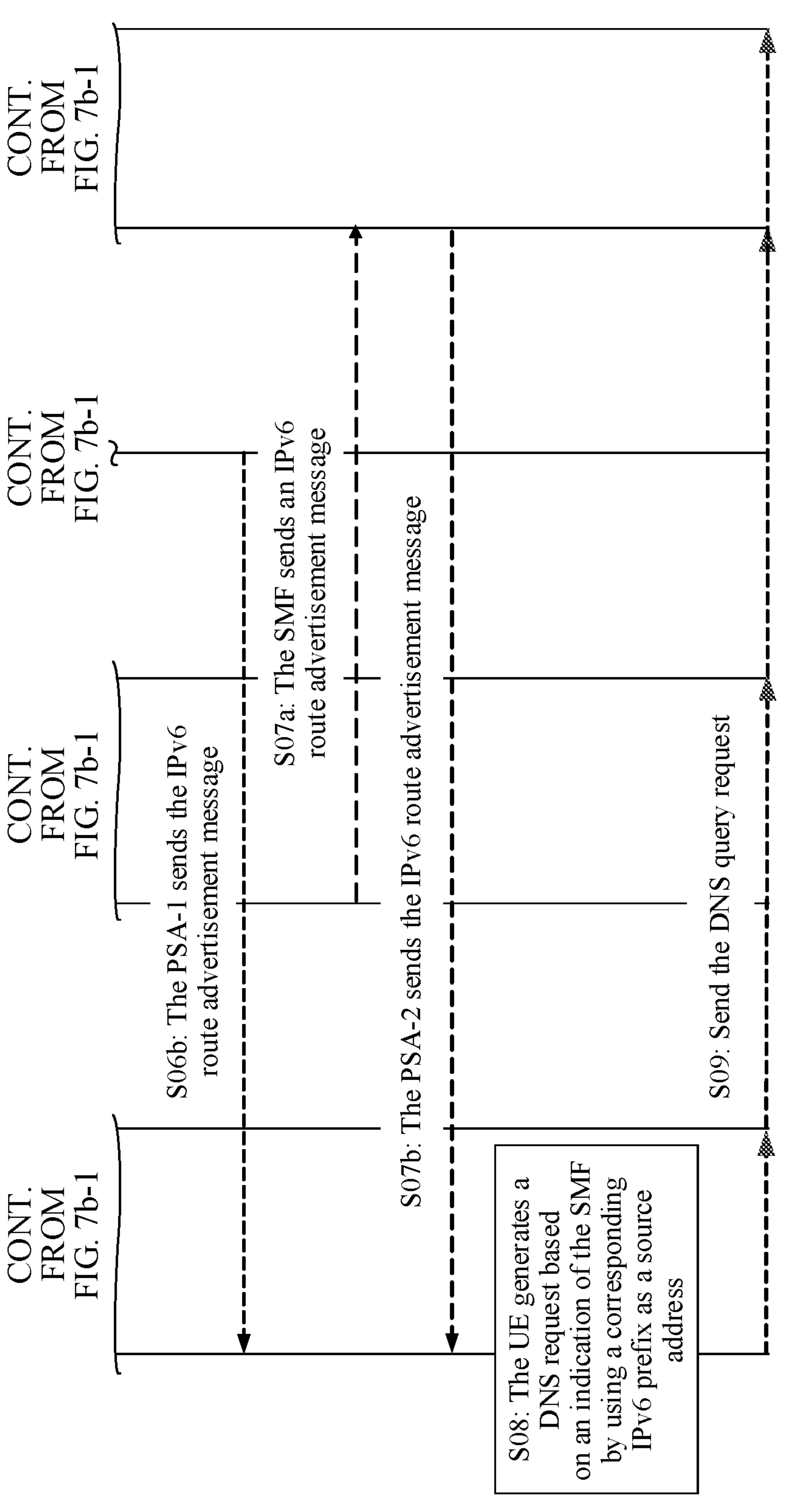

FIG. 7*b*-1 and FIG. 7*b*-2 are a schematic flowchart of interaction between an SMF, a BP, a UPF, and a DNS server according to an embodiment of this application, and the following procedures are mainly included:

S01: The SMF configures DNS server addresses corresponding to different DNAIs.

The SMF stores DNS server addresses corresponding to different locations through configuration. The deployment location of the DNS server may be represented by the DNAI.

S02: The UE initiates a PDU session establishment procedure.

The UE initiates the session establishment procedure. The SMF receives current location information of the UE from an AMF, and the current location information of the UE is represented by a TAI. The SMF selects an anchor PSA-1 of a PDU session. The PSA-1 is a UPF deployed relatively far from a RAN and the UE, and the PSA-1 may be referred to as a remote PSA.

In addition, the SMF allocates an IPv6 prefix @PSA-1 to the UE. The "IPv6 prefix @PSA-1" indicates that an IPv6 prefix-1 corresponds to the PSA-1. To be specific, the PSA-1 supports the IPv6 prefix-1. If a data packet from the UE carries a source IPv6 prefix-1, the data packet is sent to the network through the PSA-1.

S03: If the SMF determines, based on the DNAI, to implement a multi-homed PDU session, the SMF selects the PSA-2, and inserts a BP node.

The SMF determines that the DNAI corresponding to the TAI of the current location of the UE can implement an IPv6 multi-homed PDU session. Therefore, the SMF selects the PSA-2 and the BP node that supports traffic steering for the session. The PSA-2 is a UPF deployed relatively close to the RAN and the UE, and the PSA-2 may be referred to as a local PSA.

In addition, the SMF allocates an IPv6 prefix @PSA-2 to the UE. The "IPv6 prefix @PSA-2" indicates that an IPv6 prefix-2 corresponds to the PSA-2. To be specific, the PSA-2 supports the IPv6 prefix-2. If a data packet from the UE carries a source IPv6 prefix-2, the data packet is sent to the network through the PSA-2.

S04: The SMF determines the DNS server address based on the DNAI of the current location of the UE.

The SMF determines the DNS server address based on the DNAI corresponding to the TAI of the current location of the UE, namely, the address of the local DNS server 2 close to the PSA-2 shown in FIG. 7*a* or an address of a first domain name system server. For a specific description of the first domain name system server, refer to the description of 403 in FIG. 4. Details are not described herein again.

S05: The SMF sends control plane information (for example, a NAS message).

The SMF sends the control plane information (for example, the NAS message) to the UE. Optionally, the NAS message includes the DNS server address determined by the SMF in step S04.

S06*a*: The SMF sends an IPv6 route advertisement message to the PSA-1.

S06*b*: The PSA-1 sends the IPv6 route advertisement message to the UE.

The SMF sends first route advertisement information to the UE through the PSA-1. The first route advertisement information includes the IPv6 prefix @PSA-1 and an IPv6 multi-homed routing rule. The IPv6 multi-homed routing rule is associated with the PSA-1, and the multi-homed routing rule is used to indicate that when the UE sends an uplink packet, if a destination address of the uplink packet meets a preset condition described in the multi-homed routing rule, the UE carries the IPv6 prefix @PSA-1 as a source IP prefix. For example, the preset condition may be that when a destination address space accessed by the UE belongs to 111.111.0.0 to 111.111.255.255, the UE carries the IPv6 prefix @PSA-1 as the source IP prefix.

The "IPv6 prefix @PSA-1" indicates that the IPv6 prefix-1 corresponds to the PSA-1. To be specific, the PSA-1 supports the IPv6 prefix-1. If the data packet from the UE carries the source IPv6 prefix-1, the data packet is sent to the network through the PSA-1.

S07*a*: The SMF sends an IPv6 route advertisement message through the PSA-2.

S07*b*: The PSA-2 sends the IPv6 route advertisement message to the UE.

The SMF sends second route advertisement information to the UE through the PSA-2.

The second route advertisement information includes the IPv6 prefix @PSA-2 and an IPv6 multi-homed routing rule. The IPv6 multi-homed routing rule is associated with the PSA-2, and the multi-homed routing rule is used to indicate that when the UE sends an uplink packet, if a destination address of the uplink packet meets a preset condition described in the multi-homed routing rule, the UE carries the IPv6 prefix @PSA-2 as a source IP prefix. For example, the condition may be that when the destination address space accessed by the UE belongs to 128.128.0.0 to 128.128.255.255, the UE carries the IPv6 prefix @PSA-2 as the source IP prefix.

In addition, the multi-homed routing rule may further be used to indicate the UE to use the IPv6 prefix @PSA-2 as a source IP prefix in a DNS query request message when performing a DNS query. In other words, the UE may determine, according to the multi-homed routing rule, that the source IP prefix in the DNS query request message is the IPv6 prefix @PSA-2.

The "IPv6 prefix @PSA-2" indicates that the IPv6 prefix-2 corresponds to the PSA-2. To be specific, the PSA-2 supports the IPv6 prefix-2. If the data packet from the UE carries the source IPv6 prefix-2, the data packet is sent to the network through the PSA-2.

Optionally, the DNS server address determined by the SMF in step S04 may alternatively be sent to the UE by using route advertisement information. In other words, the SMF may deliver the DNS server address to the UE by using the route advertisement information, or deliver the DNS server address to the UE by using the control plane information (a NAS message).

To be specific, the SMF may send the address of the DNS server 2 and the IPv6 prefix @PSA-2 to the UE by using a same piece of routing advertisement information, and the SMF may alternatively send the address of the DNS server 2 and the IPv6 prefix @PSA-2 to the UE by using different messages. For example, the SMF sends the address of the DNS server 2 to the UE by using the control plane information (for example, the NAS message) in step S05, and sends the IPv6 prefix @PSA-2 to the UE by using the route advertisement information in step S07*b*.

S08: The UE generates a DNS query request based on an indication of the SMF by using a corresponding IPv6 prefix as a source IP prefix.

S09: The UE sends the DNS query request.

The UE obtains the IPv6 multi-homed routing rule based on the received second route advertisement information, and determines to use the IPv6 prefix @PSA-2 as the source IP prefix to initiate the DNS query request. The DNS query request carries a domain name of a first application. The domain name of the first application may be an FQDN. The domain name of the first application may alternatively be a domain name in another form. This is not limited in this embodiment of this application. A destination address carried in the DNS query request is the DNS server address received by the UE from the SMF, namely, the address of the DNS server 2.

It can be learned from the example description in Embodiment 1 of this application that, the SMF sends the local DNS server address to the UE, and indicates, by using the IPv6 multi-homed routing rule, the UE to carry the IPv6 prefix @PSA-2 as the source IP prefix of the DNS query, so that the UE can perform the DNS query by using the local DNS server, and DNS query efficiency can be improved.

Embodiment 2 of this Application

Embodiment 2 is a moving scenario of Embodiment 1. According to Embodiment 1, the UE obtains the local DNS server address and the source IP prefix of the DNS query from the SMF. Because the UE is movable, when the UE moves to a target location, a BP relocation process may occur. In other words, the SMF needs to reselect a local anchor PSA and a BP node. When the SMF obtains new location information of the UE after the UE moves, the SMF further needs to send a new local DNS server address and a new source IP prefix to the UE, to ensure that the UE obtains the local DNS server address corresponding to the current location, and performs the DNS query based on the new source IP prefix.

Figure 8A:
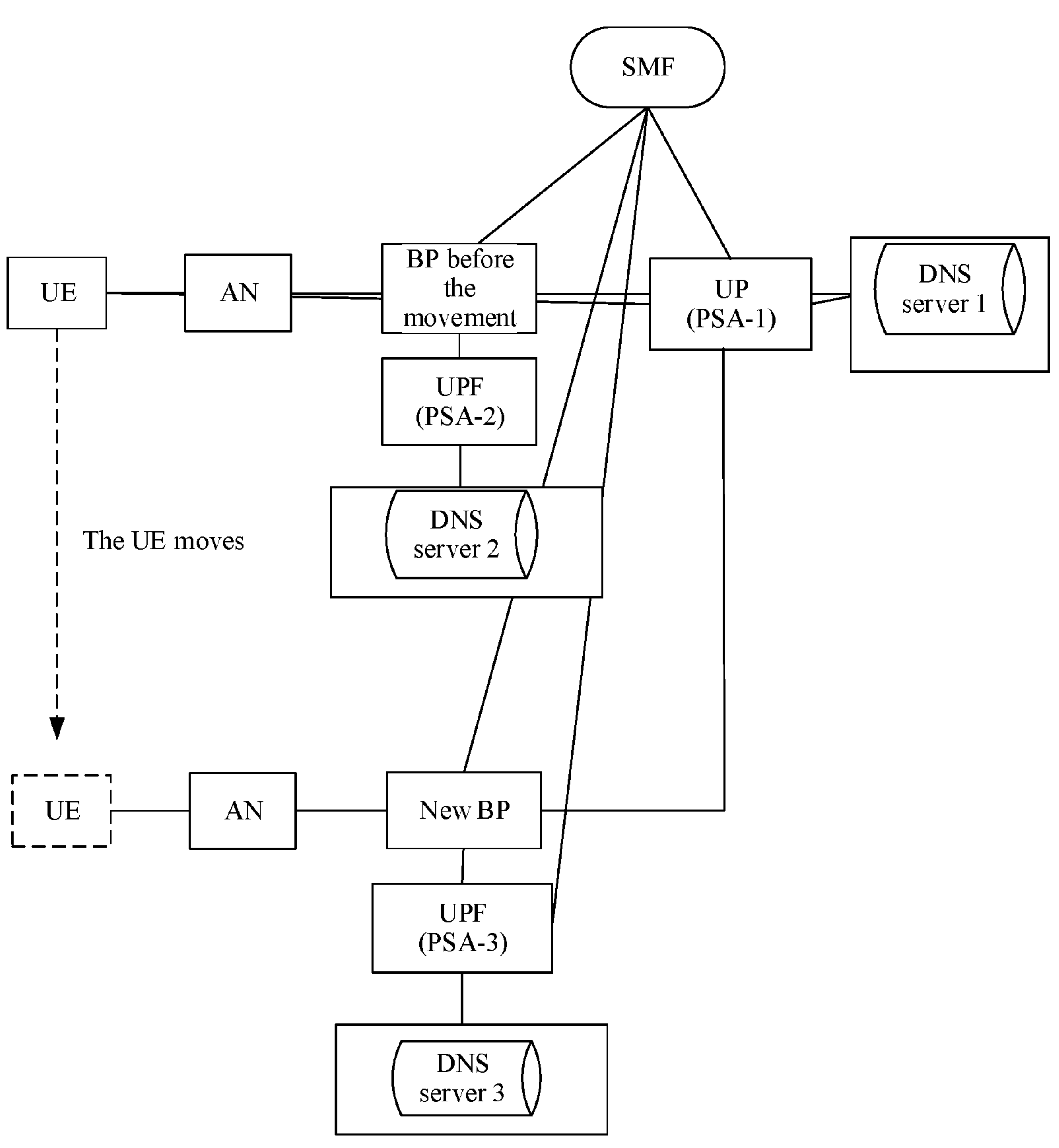
FIG. 8*a* is a schematic diagram of a system architecture for interaction between an SMF and UE according to an embodiment of this application.

FIG. 8*a* is a schematic diagram of a system architecture for interaction between an SMF and UE according to an embodiment of this application. In FIG. 8*a*, a UPF (PSA-1) refers to a PDU session anchor (PSA) 1 or an anchor UPF network element 1, a UPF (PSA-2) is a PDU session anchor 2 or an anchor UPF network element 2, and a DNS server 1 and a DNS server 2 belong to different data centers or different MEC management platforms. The UPF (PSA-1) may communicate with the DNS server 1, and the UPF (PSA-2) may communicate with the DNS server 2.

The DNS server 1, the DNS server 2, and a DNS server 3 are deployed at different locations on a network. For example, the DNS server 1 is located in a centralized data center or a remote management platform and is relatively far from a current location of the UE. The DNS server 1 may be referred to as a remote DNS server.

For a PDU session, if the SMF inserts a BP node or a ULCL node into the PDU session, and different DNS servers are deployed close to different PSAs. Before the UE moves, the DNS server 2 is located in a distributed data center or a local management platform and is relatively close to the current location of the UE. The DNS server 2 may be referred to as a local DNS server. The DNS server 1 is mainly responsible for resolving a domain name of an application deployed on the remote management platform, and the DNS server 2 is mainly responsible for resolving a domain name of an application deployed on the local management platform. After the UE moves, the DNS server 3 is located in a distributed data center or a local management platform and is relatively close to the current location of the UE. The DNS server 3 may be referred to as a local DNS server.

Figure 8B:
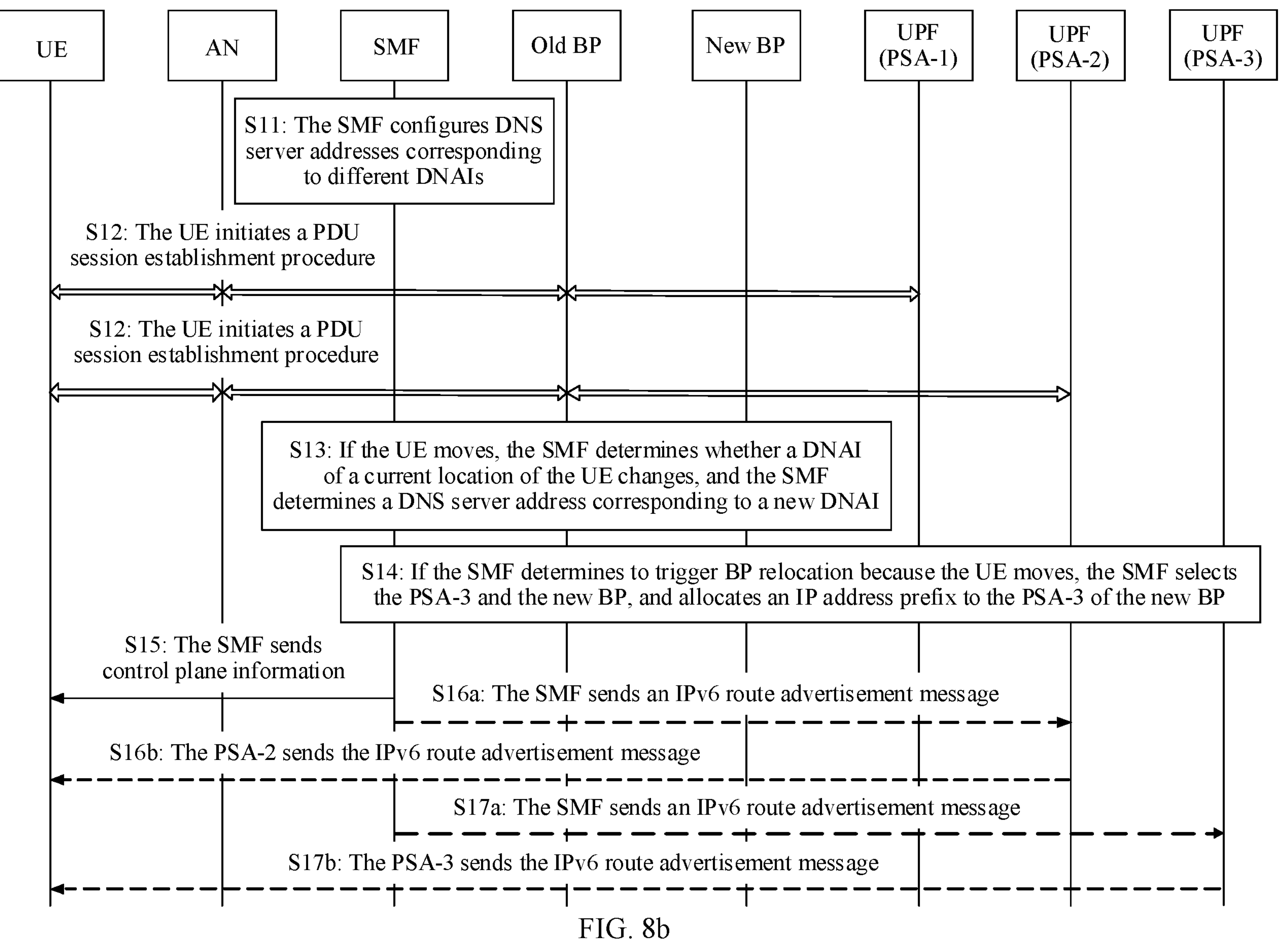
FIG. 8*b* is another schematic flowchart of interaction between an SMF, a BP, a UPF, and a DNS server according to an embodiment of this application.

FIG. 8*b* is another schematic flowchart of interaction between an SMF, a BP, a UPF, and a DNS server according to an embodiment of this application, and the following procedures are mainly included:

S11: The SMF configures DNS server addresses corresponding to different locations.

The SMF stores DNS server addresses corresponding to different locations through configuration. A deployment location of the DNS server may be represented by a DNAI.

S12: The UE separately initiates a PDU session establishment procedure to the PSA-1 and the PSA-2.

At a location TAI-1, the UE initiates the session establishment procedure. The SMF determines a DNS server address-1 based on a DNAI-1 corresponding to the current location TAI-1 of the UE. In addition, the SMF determines that the DNAI corresponding to the current location TAI-1 of the UE can implement an IPv6 multi-homed PDU session. Therefore, the SMF selects two different anchors PSA-1 and PSA-2 and a BP node that supports traffic steering for the session. The PSA-1 is a UPF deployed relatively far from a RAN and the UE, and the PSA-1 may be referred to as a remote PSA. The PSA-2 is a UPF deployed relatively close to the RAN and the UE, and the PSA-2 may be referred to as a local PSA.

The SMF determines a DNS server address based on a DNAI corresponding to a TAI of the current location of the UE, namely, an address of the local DNS server close to the PSA-2. In Embodiment 1, the SMF notifies the UE of the address of the DNS server 1, and the UE initiates the DNS query by using the IPv6 prefix @PSA-2 as the source IP prefix.

S13: If the UE moves, the SMF determines whether the DNAI of the current location of the UE changes, and the SMF determines a DNS server address corresponding to a new DNAI.

The UE moves from the TAI-1 to a TAI-2. The SMF determines a DNAI-2 based on the current location TAI-2 of the UE. Because the DNAI-1 is different from the DNAI-2, the SMF determines that the DNAI changes. Further, the SMF determines, based on the DNAI-2, an address of the DNS server 3 corresponding to the DNAI-2, namely, an address of the DNS server 3 shown in FIG. 8*a*.

For example, the address of the DNS server 3 may be the address of the second domain name system server described in the embodiment shown in FIG. 4.

S14: If the SMF determines to trigger BP relocation because the UE moves, the SMF selects a PSA-3 and a new BP, and allocates a new IP address prefix, namely, an IPv6 prefix @PSA-3.

Because the DNAI changes, the SMF determines to trigger the BP relocation, and the SMF selects the PSA-3 and the new BP node. Same as the PSA-2, the PSA-3 is a UPF deployed close to the RAN and the UE, and the PSA-3 may be referred to as a local PSA. In addition, the SMF allocates the IPv6 prefix @PSA-3 to the UE.

The "IPv6 prefix @PSA-3" indicates that a IPv6 prefix-3 corresponds to the PSA-3. To be specific, the PSA-3 supports the IPv6 prefix-3. If a data packet from the UE carries a source IPv6 prefix-3, the data packet is sent to the network through the PSA-3.

S15: The SMF sends control plane information (for example, a NAS message).

The SMF sends the control plane information (for example, the NAS message) to the UE. Optionally, the NAS message includes the DNS server address determined by the SMF in step S13.

S16*a*: The SMF sends an IPv6 route advertisement message to the PSA-2.

S16*b*: The PSA-2 sends the IPv6 route advertisement message.

The SMF sends route advertisement information to the UE through the PSA-2. The route advertisement information includes live time corresponding to the IPv6 prefix @PSA-2. The live time is set to 0, to indicate that when the IPv6 prefix @PSA-2 of the UE is set to be invalid, the UE does not continue to use the IPv6 prefix @PSA-2 subsequently.

S17*a*: The SMF sends an IPv6 route advertisement message to the PSA-3.

S17*b*: The PSA-3 sends the IPv6 route advertisement message.

The SMF sends route advertisement information to the UE through the PSA-3. The route advertisement information includes the IPv6 prefix @PSA-3 and an IPv6 multi-homed routing rule. The IPv6 multi-homed routing rule is associated with the PSA-3, and is used to indicate that when the UE sends an uplink packet, if a destination address of the uplink packet meets a preset condition described in the multi-homed routing rule, the UE carries the IPv6 prefix @PSA-3 as a source IP prefix. For example, the condition may be that when a destination address space accessed by the UE belongs to 130.130.0.0 to 130.130.255.255, the UE carries the IPv6 prefix @PSA-3 as the source IP prefix.

In addition, the multi-homed routing rule may further be used to indicate the UE to use the IPv6 prefix @PSA-3 as a source IP prefix in a DNS query request message when performing a DNS query. In other words, the UE may determine, according to the multi-homed routing rule, that the source IP prefix in the DNS query request message is the IPv6 prefix @PSA-3.

Optionally, the address of the DNS server 3 determined by the SMF in step S13 may alternatively be sent to the UE by using route advertisement information. In other words, the SMF may deliver the DNS server address to the UE by using the route advertisement information, or deliver the DNS server address to the UE by using the control plane information (for example, the NAS message).

To be specific, the SMF may send the address of the DNS server 3 and the IPv6 prefix @PSA-3 to the UE by using a same piece of routing advertisement information, and the SMF may alternatively send the address of the DNS server 3 and the IPv6 prefix @PSA-3 to the UE by using different messages. For example, the SMF sends the address of the DNS server 3 to the UE by using the control plane information (for example, the NAS message) in step S15, and sends the IPv6 prefix @PSA-3 to the UE by using the route advertisement information in step S17*b*.

The UE obtains the IPv6 multi-homed routing rule based on the route advertisement information received in step S17*b*, and determines to use the IPv6 prefix @PSA-3 as the source IP prefix to initiate the DNS query. A DNS query request carries a domain name of a first application. The domain name of the first application may be a fully qualified domain name (FQDN). The domain name of the first application may alternatively be a domain name in another form. This is not limited in this embodiment of this application. A destination address carried in the DNS query request is the DNS server address received by the UE from the SMF, namely, the address of the DNS server 3.

It can be learned from the example description in Embodiment 2 of this application that, if the DNAI changes because the UE moves, the SMF determines an address of a new DNS server (namely, the DNS server 3) based on the DNAI corresponding to the current location of the UE. If the SMF determines that the BP relocation is required, the SMF sends a new IPv6 multi-homed routing rule to the UE by using route advertisement information. According to the IPv6 multi-homed routing rule, the UE determines to use the IPv6 prefix @PSA-3 as the source IP prefix to initiate the DNS query. In this way, the UE can access the local DNS server nearby to perform the DNS query, to improve DNS query efficiency.

Embodiment 3 of this Application

Figure 9A:
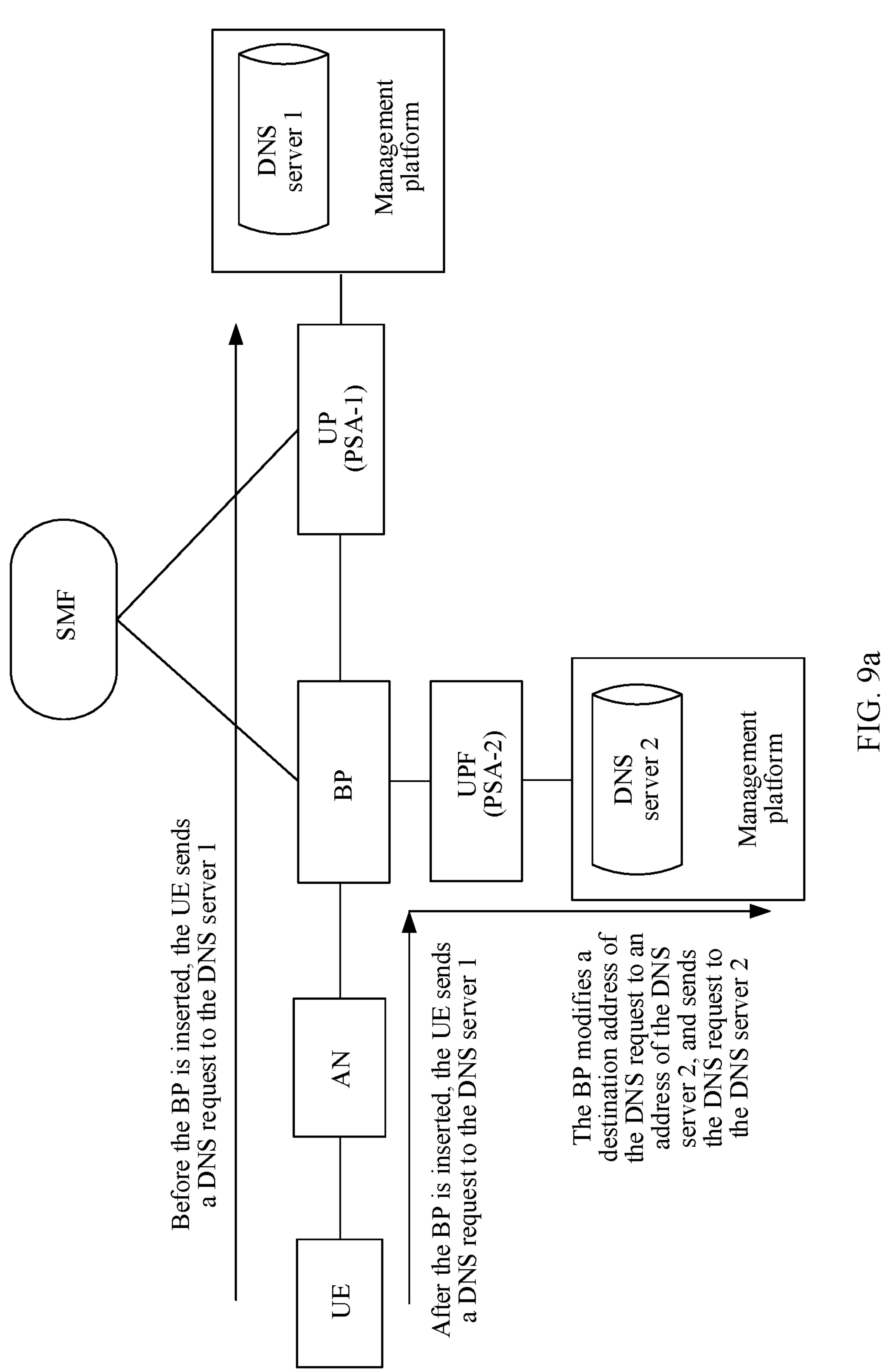
FIG. 9*a* is a schematic diagram of another system architecture for interaction between an SMF and UE according to an embodiment of this application.

FIG. 9*a* is a schematic diagram of another system architecture for interaction between an SMF and UE according to an embodiment of this application. In an initial session establishment process, the SMF sends a remote DNS server address to the UE for a DNS query. Subsequently, because the UE moves, the SMF inserts a BP node or a ULCL node into the session. In FIG. 9*a*, an example in which the BP node is inserted is used. In addition, the SMF determines, based on a current location of the UE, that a local DNS server is relatively close to the UE. In this case, the SMF does not need to update DNS server address information to the UE, but indicates the BP node or the ULCL node to modify a destination address in a DNS query request from the UE. In this way, the DNS query request of the UE can be sent to the local DNS server, to improve DNS query efficiency.

Figure 9B:
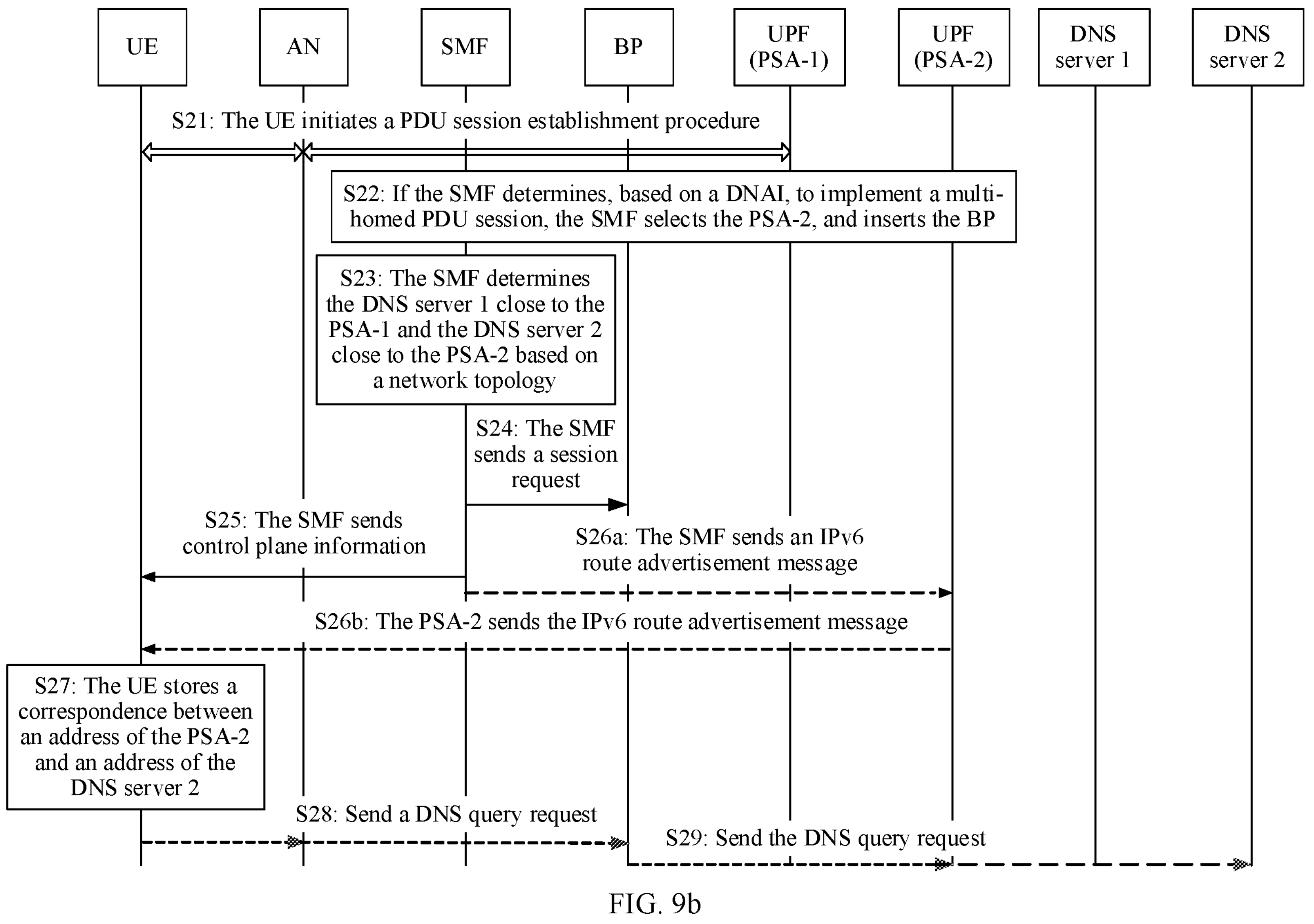
FIG. 9*b* is another schematic flowchart of interaction between an SMF, a BP, a UPF, and a DNS server according to an embodiment of this application.

FIG. 9*b* is another schematic flowchart of interaction between an SMF, a ULCL, a UPF, and a DNS server according to an embodiment of this application, and the following procedures are mainly included.

S21: The UE initiates a PDU session establishment procedure.

For example, the UE initiates the session establishment procedure. In the process, the SMF receives current location information of the UE from a mobility management network element AMF, where the current location information of the UE is represented by a TAI; and the SMF selects an anchor PSA-1. The PSA-1 is a UPF deployed relatively far from a RAN and the UE, and the PSA-1 may be referred to as a remote PSA.

In addition, the SMF allocates an IPv6 prefix @PSA-1 to the UE. The "IPv6 prefix @PSA-1" indicates that an IPv6 prefix-1 corresponds to the PSA-1. To be specific, the PSA-1 supports the IPv6 prefix-1. If a data packet from the UE carries a source IPv6 prefix-1, the data packet is sent to the network through the PSA-1.

S22: If the SMF determines to implement a multi-homed PDU session, the SMF selects a PSA-2, and inserts the BP node.

The SMF determines a DNAI based on the TAI of the UE obtained from the AMF in step S21, to further determine that the DNAI corresponding to the TAI of the current location of the UE can implement an IPv6 multi-homed PDU session. Therefore, the SMF selects a PSA-2 and a BP node that supports traffic steering. The PSA-2 is a UPF deployed relatively close to the RAN and the UE, and the PSA-2 may be referred to as a local PSA.

In addition, the SMF allocates an IPv6 prefix @PSA-2 to the UE. The "IPv6 prefix @PSA-2" indicates that an IPv6 prefix-2 corresponds to the PSA-2. To be specific, the PSA-2 supports the IPv6 prefix-2. If a data packet from the UE carries a source IPv6 prefix-2, the data packet is sent to the network through the PSA-2.

S23: The SMF determines a DNS server 1 close to the PSA-1 and a DNS server 2 close to the PSA-2 based on a network topology.

The SMF stores DNS server addresses corresponding to different network locations through configuration. The network location may be represented by a DNAI. In other words, the SMF stores DNS server addresses corresponding to different DNAIs. Further, the SMF determines, based on a DNAI supported by the PSA-1, the DNS server 1 close to the PSA-1, and determines, based on a DNAI supported by the PSA-2, the DNS server 2 close to the PSA-2. In other words, the UE may access the DNS server 1 through the PSA-1, and may access the DNS server 2 through the PSA-2. The DNS server 2 is a first domain name system server.

S24: The SMF sends a session request.

For example, the SMF sends the session request to the BP node, and the session request carries an address of the DNS server 2 close to the PSA-2 and traffic filtering (traffic filter) information. The traffic filtering information includes indication information. The indication information is used to indicate the BP node to set, to the address of the DNS server 2, a destination address of a DNS query request message from the IPv6 prefix-2.

S25: The SMF sends control plane information (for example, a NAS message).

The SMF notifies the UE of the address of the DNS server 2 in a manner of control plane information.

S26*a*: The SMF sends an IPv6 route advertisement message.

S26*b*: The PSA-2 sends the IPv6 route advertisement message.

The SMF sends route advertisement information to the UE through the PSA-2. The route advertisement information includes the IPv6 prefix @PSA-2 and an IPv6 multi-homed routing rule. The IPv6 multi-homed routing rule is associated with the PSA-2, and the multi-homed routing rule is used to indicate that when the UE sends an uplink packet, if a destination address of the uplink packet meets a preset condition described in the multi-homed routing rule, the UE carries the IPv6 prefix @PSA-2 as a source IP prefix. For example, the preset condition may be that when a destination address space accessed by the UE belongs to 128.128.0.0 to 128.128.255.255, the UE needs to carry the IPv6 prefix @PSA-2 as the source IP prefix.

In addition, the multi-homed routing rule may further be used to indicate the UE to use the IPv6 prefix @PSA-2 as a source IP prefix in a DNS query request message when performing the DNS query. In other words, the UE may determine, according to the multi-homed routing rule, that the source IP prefix in the DNS query request message is the IPv6 prefix @PSA-2.

Optionally, the DNS server address determined by the SMF in step S23 may alternatively be sent to the UE by using route advertisement information. In other words, the SMF may deliver the address of the DNS server 2 to the UE by using the route advertisement information, or deliver the address of the DNS server 2 to the UE by using the control plane information (for example, the NAS message).

To be specific, the SMF may send the address of the DNS server 2 and the IPv6 prefix @PSA-2 to the UE by using a same piece of routing advertisement information, and the SMF may alternatively send the address of the DNS server 2 and the IPv6 prefix @PSA-2 to the UE by using different messages. For example, the SMF sends the address of the DNS server 2 to the UE by using the control plane information (for example, the NAS message) in step S25, and sends the IPv6 prefix @PSA-2 to the UE by using the route advertisement information in step S26*b*.

S27: The UE stores a correspondence between the IPv6 prefix-2 and the address of the DNS server 2.

S28: The UE sends a DNS query request.

The source IP prefix carried in the DNS query sent by the UE is the IPv6 prefix 2 supported by the PSA-2, and a destination address is an address of the DNS server 1. The DNS query request further carries a domain name of a first application. The domain name of the first application may be an FQDN. The domain name of the first application may alternatively be a domain name in another form. This is not limited in this embodiment of this application.

S29: The BP node sends the DNS query request to the PSA-2.

After receiving the DNS query request, the BP node sets the destination address of the DNS query request to the address of the local DNS server (namely, the address of the DNS server 2) based on an indication of the SMF in step S24, and then sends the DNS query request to the PSA-2 according to a source IP prefix routing rule. The PSA-2 sends the DNS query request to the local DNS server (namely, the DNS server 2) based on the destination address in the DNS query request. In addition, the PSA-2 receives a DNS query response message from the DNS server 2, and returns a query result to the UE through the BP node.

Figure 11A:
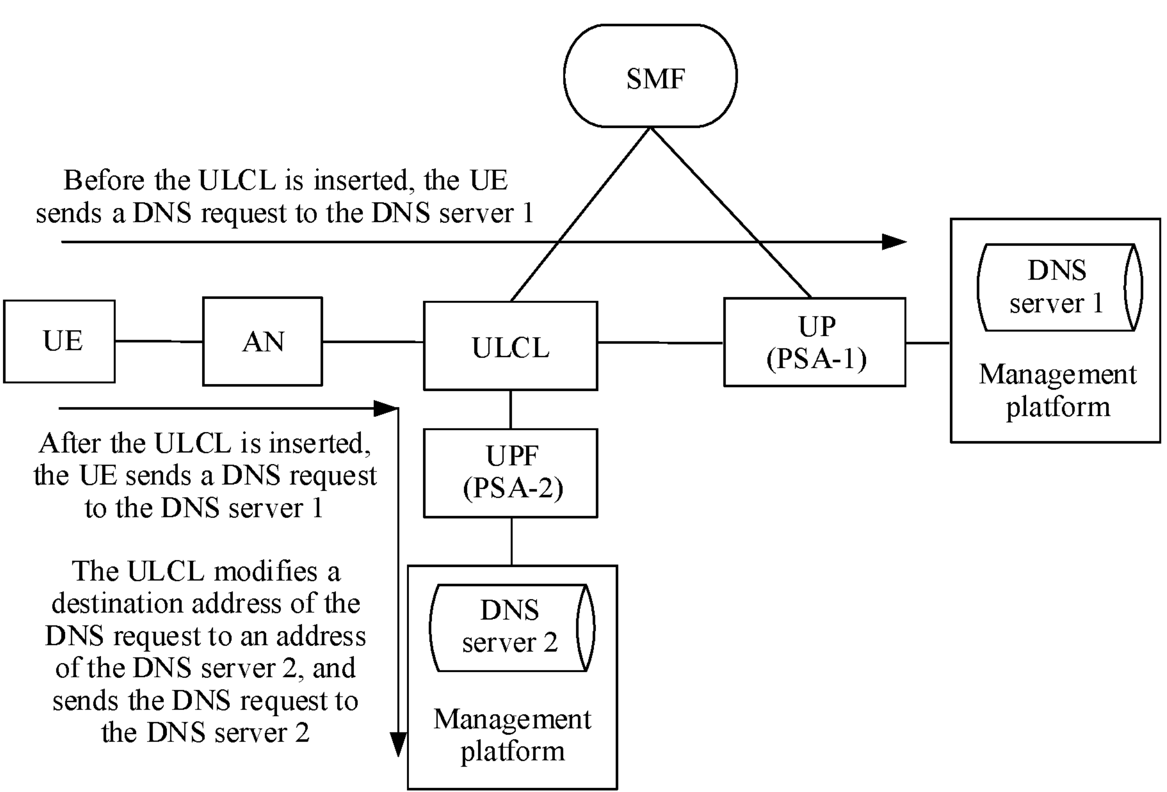
FIG. 11*a* is a schematic diagram of another system architecture for interaction between an SMF and UE according to an embodiment of this application.
Figure 11B:
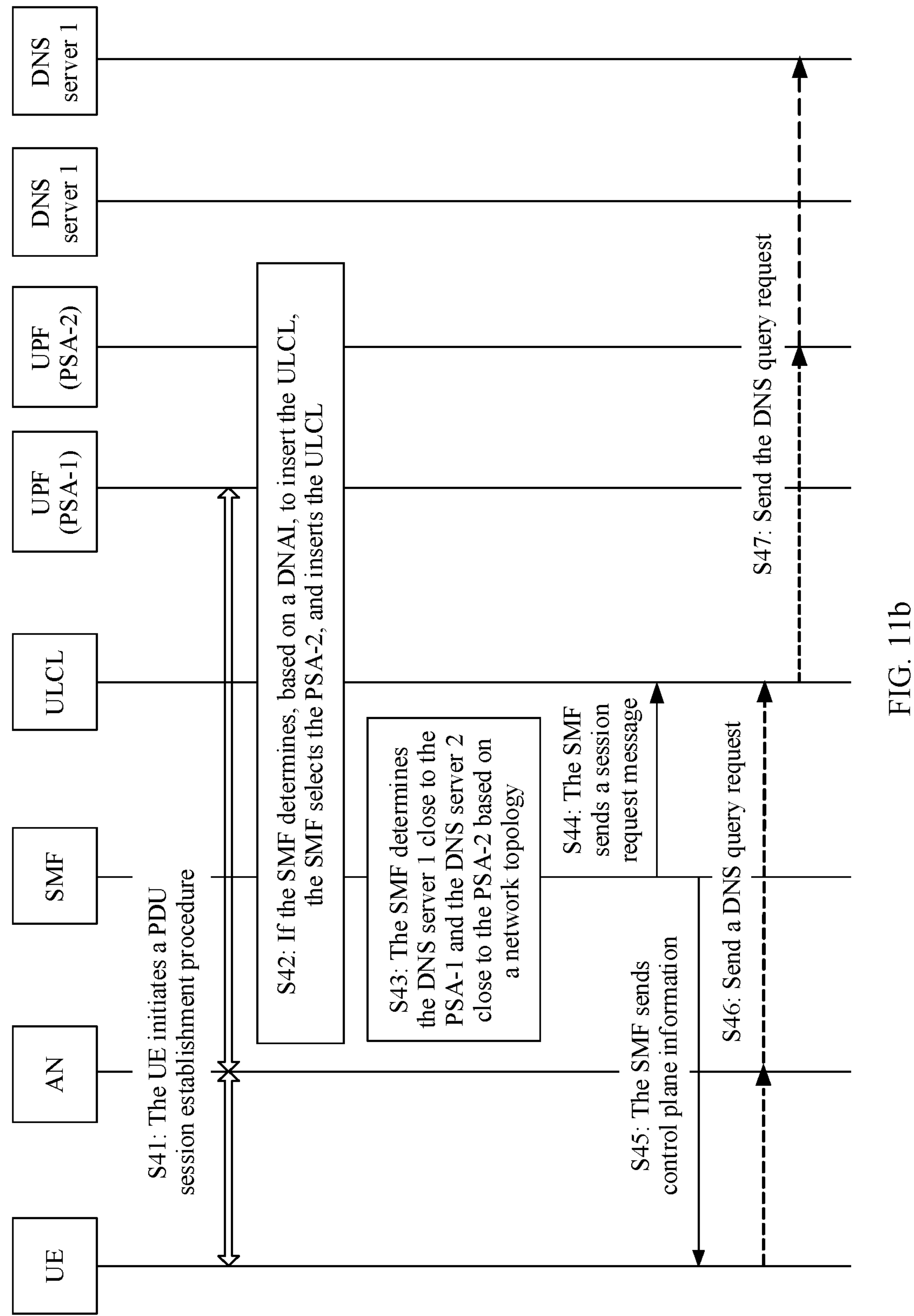
FIG. 11*b* is another schematic flowchart of interaction between an SMF, a ULCL, a UPF, and a DNS server according to an embodiment of this application.

It should be noted that, in the flowchart shown in FIG. 9*b*, the BP node may alternatively be replaced with a ULCL node having a traffic steering function. In a ULCL scenario, different from the foregoing step S21 to step S29, the SMF does not need to allocate an IP address prefix to the UE, and a description of IP address prefix allocation and a description of source IP address prefix selection are not required. For a specific procedure in the ULCL scenario, refer to FIG. 11*a* and FIG. 11*b* provided in subsequent embodiments.

It can be learned from the example description in Embodiment 3 that the SMF always provides the UE with the address of the DNS server close to the remote PSA-1. After the UE moves, even if a local DNS server exists at a current location, the SMF does not need to frequently update the DNS server address to the UE. In this way, the UE can access the local DNS server nearby to perform the DNS query, to improve DNS query efficiency.

Embodiment 4 of this Application

In Embodiment 3, it is assumed that IP addresses of two DNS servers are different. Next, refer to Embodiment 4. IP addresses of two DNS servers are the same.

In this embodiment of this application, if addresses of DNS servers deployed on a network are the same, for example, are an anycast address, based on Embodiment 3, it can be learned that an SMF does not need to update a DNS server address to UE. Based on the architectural diagram shown in FIG. 7*a*, for an IPv6 multi-homed PDU session, after a BP node is inserted, the SMF updates route advertisement information to the UE, to indicate the UE to use an IPv6 prefix-2 for a DNS query. The BP node sends a DNS query message from the UE to a PSA-2 according to a source IP prefix routing rule. In Embodiment 4 of this application, the PSA-2 resolves that a destination address is an anycast address, and routes the DNS query message to a DNS server closest to the PSA-2, namely, a local DNS server.

In some embodiments of this application, a session management function network element may further perform the following domain name system server determining method, including the following steps:

the session management function network element determines an address of a first domain name system server based on a first location of user equipment, where the first domain name system server is a local domain name system server that resolves a domain name of a first application into a corresponding first Internet protocol address, and the first Internet protocol address is associated with the first location;

the session management function network element allocates a first Internet protocol prefix to the user equipment, where the first Internet protocol prefix is included in a first domain name system query request message sent by the user equipment; and the session management function network element sends the first Internet protocol prefix to the user equipment.

In some embodiments of this application, that the session management function network element determines an address of a first domain name system server based on a first location of user equipment includes:

the session management function network element determines a deployment location of the first application based on the first location of the user equipment; and the session management function network element determines the address of the first domain name system server based on the deployment location of the first application.

In some embodiments of this application, the method further includes: the address of the first domain name system server is an anycast address.

In some embodiments of this application, a user plane function network element may further perform the following request processing method, including the following steps:

the user plane function network element receives a first domain name system query request message, where the first domain name system query request message carries a first Internet protocol prefix and an address of a first domain name system server; and the user plane function network element sends the first domain name system query request message to the first domain name system server based on the first Internet protocol prefix.

The address of the first domain name system server is an anycast address.

Figure 10A:
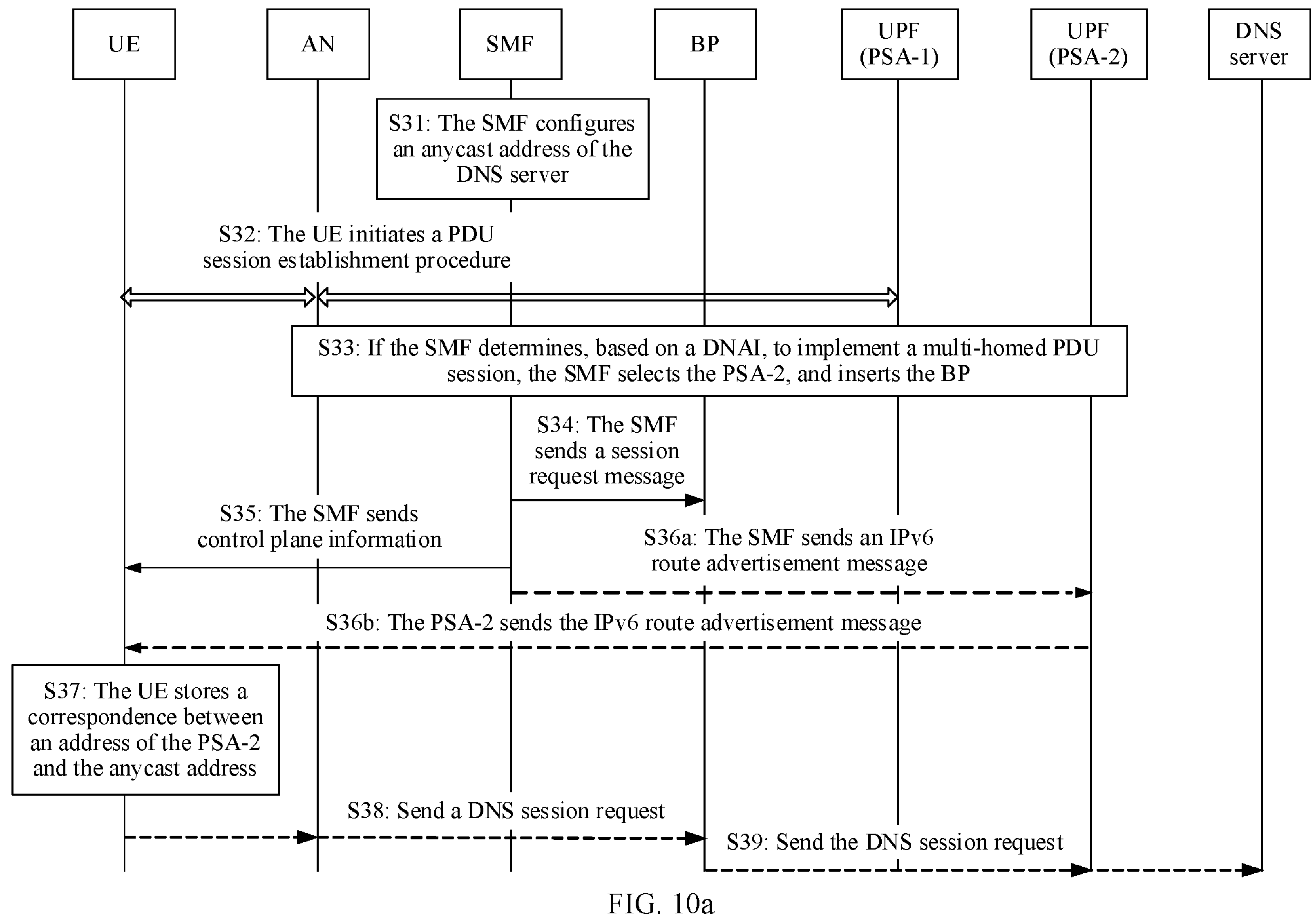
FIG. 10*a* is another schematic flowchart of interaction between an SMF, a BP, a UPF, and a DNS server according to an embodiment of this application.

The following uses an example in which a UPF network element supporting traffic steering is a BP node, and a case in which the UPF network element supporting traffic steering is a ULCL node is also applicable to Embodiment 4 of this application. This is not limited. FIG. 10*a* is another schematic flowchart of interaction between an SMF, a BP, a UPF, and a DNS server according to an embodiment of this application, and the following procedures are mainly included.

S31: The SMF configures an anycast address of the DNS server.

The anycast address of the DNS server is configured on the SMF. For example, the anycast address may be 8:8:8:8 or 8:8:4:4. All anycast addresses of the DNS server are the same regardless of a location of the DNS server.

S32: The UE initiates a PDU session establishment procedure.

In the session establishment procedure initiated by the UE, the SMF receives current location information of the UE from a mobility management network element AMF, where the current location information of the UE is represented by a TAI; and the SMF selects an anchor PSA-1. The PSA-1 is a UPF deployed relatively far from a RAN and the UE, and the PSA-1 may be referred to as a remote PSA.

In addition, the SMF allocates an IPv6 prefix @PSA-1 to the UE. The "IPv6 prefix @PSA-1" indicates that an IPv6 prefix-1 corresponds to the PSA-1. To be specific, the PSA-1 supports the IPv6 prefix-1. If a data packet from the UE carries a source IPv6 prefix-1, the data packet is sent to the network through the PSA-1.

S33: If the SMF determines, based on a DNAI, to implement a multi-homed PDU session, the SMF selects a PSA-2, and inserts the BP node.

The SMF determines that a DNAI corresponding to a TAI of a current location of the UE can implement an IPv6 multi-homed PDU session. Therefore, the SMF selects the PSA-2 and the BP node that supports traffic steering for the session. The PSA-2 is a UPF deployed relatively close to the RAN and the UE, and the PSA-2 may be referred to as a local PSA.

In addition, the SMF allocates an IPv6 prefix @PSA-2 to the UE. The "IPv6 prefix @PSA-2" indicates that an IPv6 prefix-2 corresponds to the PSA-2. To be specific, the PSA-2 supports the IPv6 prefix-2. If a data packet from the UE carries a source IPv6 prefix-2, the data packet is sent to the network through the PSA-2.

S34: The SMF sends a session request message.

For example, the SMF sends the session request message to the BP node through an N4 interface.

S35: The SMF sends control plane information.

The SMF notifies the UE of the anycast address of the DNS server by using the control plane information.

S36*a*: The SMF sends an IPv6 route advertisement message.

S36*b*: The PSA-2 sends the IPv6 route advertisement message.

The SMF sends route advertisement information to the UE through the PSA-2. The route advertisement information includes the IPv6 prefix @PSA-2 and an IPv6 multi-homed routing rule. The IPv6 multi-homed routing rule is associated with the PSA-2, and the multi-homed routing rule is used to indicate that when the UE sends an uplink packet, if a destination address of the uplink packet meets a preset condition described in the multi-homed routing rule, the UE carries the IPv6 prefix @PSA-2 as a source IP prefix. For example, the condition may be that when a destination address space accessed by the UE belongs to 128.128.0.0 to 128.128.255.255, the UE carries the IPv6 prefix @PSA-2 as the source IP prefix.

In addition, the multi-homed routing rule may further be used to indicate the UE to use the IPv6 prefix @PSA-2 as a source IP prefix in a DNS query request message when performing the DNS query. In other words, the UE may determine, according to the multi-homed routing rule, that the source IP prefix in the DNS query request message is the IPv6 prefix @PSA-2. Optionally, the address (namely, the anycast address) of the DNS server address determined by the SMF in step S31 may alternatively be sent to the UE by using route advertisement information. In other words, the SMF may deliver the DNS server address to the UE by using the route advertisement information, or deliver the DNS server address to the UE by using the control plane information (for example, a NAS message).

To be specific, the SMF may send the anycast address of the DNS server and the IPv6 prefix @PSA-2 to the UE by using a same piece of routing advertisement information, and the SMF may alternatively send the anycast address of the DNS server and the IPv6 prefix @PSA-2 to the UE by using different messages. For example, the SMF sends the anycast address of the DNS server to the UE by using the control plane information (for example, the NAS message) in step S35, and sends the IPv6 prefix @PSA-2 to the UE by using the route advertisement information in step S36*b*.

S37: The UE stores a correspondence between an address of the PSA-2 and the anycast address of the DNS server.

S38: The UE sends a DNS query request.

The UE initiates the DNS query request, and a source IP prefix which is the IPv6 prefix @PSA-2, a destination IP address which is the anycast address of the DNS server, and a requested domain name are carried. The requested domain name may be a fully qualified domain name (FQDN). The requested domain name may alternatively be a domain name in another form. This is not limited in this embodiment of this application.

S39: The BP node sends the DNS query request to the PSA-2.

After receiving the DNS query request, the BP node sends the DNS query request to the PSA-2 according to a source IP prefix routing rule.

Based on the destination address in the DNS query request being an anycast address and based on an anycast address routing feature, the PSA-2 sends the DNS query request to a DNS server closest to the PSA-2, namely, a local DNS server. For example, the local DNS server may be the DNS server 2 shown in FIG. 9*a*. The anycast address feature is that, on an IP network, one anycast address is used to identify a group of hosts that provide a specific service, and a service accessing party does not care about a specific host that provides the service. A packet accessing the address may be routed by the IP network to any host in the group, for example, to the nearest host.

Figure 10B:
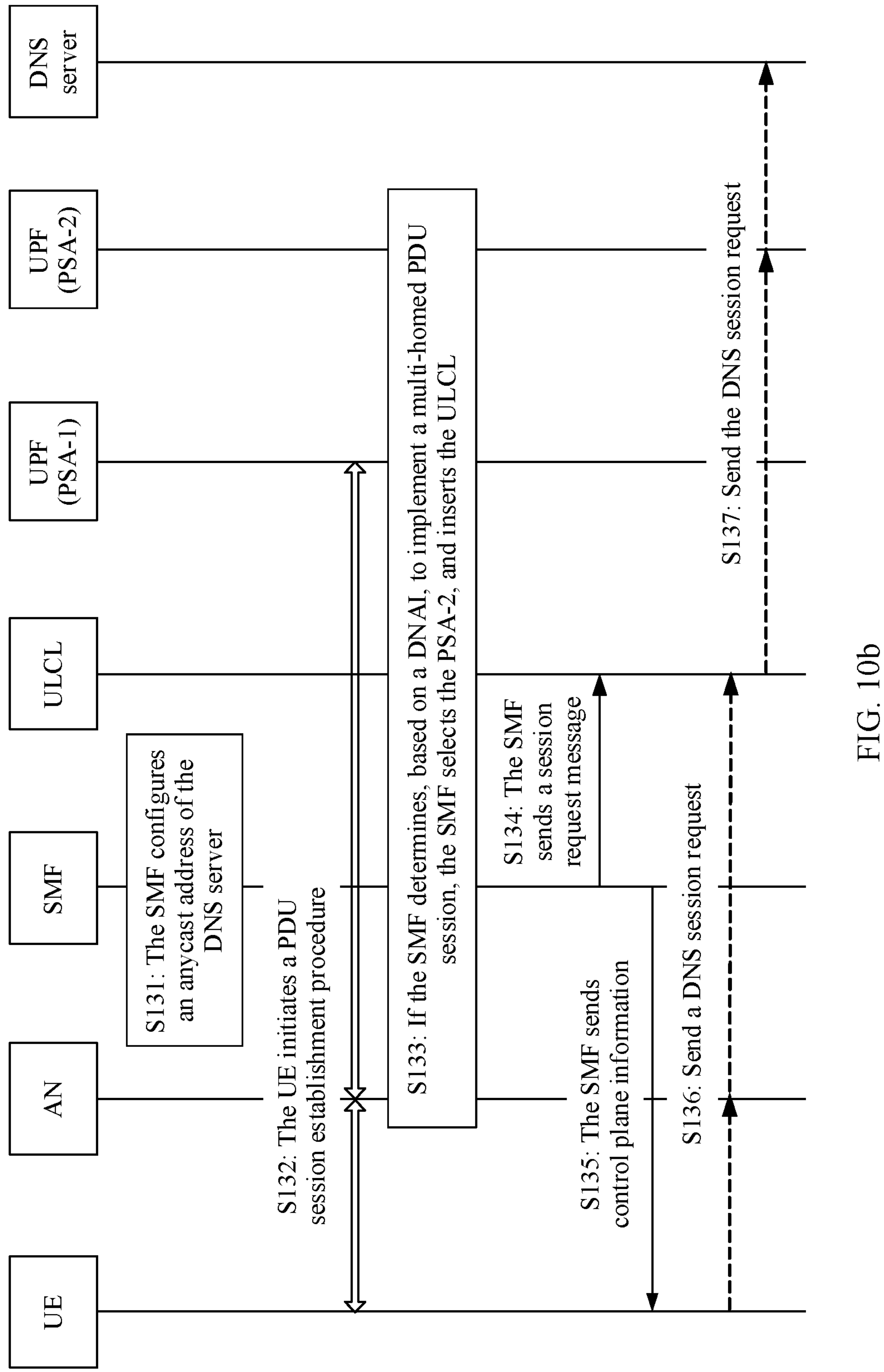
FIG. 10*b* is another schematic flowchart of interaction between an SMF, a ULCL, a UPF, and a DNS server according to an embodiment of this application.

It should be noted that, in the flowchart shown in FIG. 10*a*, the BP node may alternatively be replaced with a ULCL network element having a traffic steering function. A difference lies in that the SMF does not need to allocate an IP address prefix to the UE in a ULCL scenario. Therefore, an IP address prefix allocation procedure and a procedure of selecting a source IP address prefix in a DNS query request message are not involved in the ULCL scenario. FIG. 10*b* is another schematic flowchart of interaction between an SMF, a ULCL, a UPF, and a DNS server according to an embodiment of this application, and the following procedures are mainly included.

S131: The SMF configures an anycast address of the DNS server.

The anycast address of the DNS server is configured on the SMF. For example, the anycast address may be 8:8:8:8 or 8:8:4:4. All anycast addresses of the DNS server are the same regardless of a location of the DNS server.

S132: The UE initiates a PDU session establishment procedure.

In the session establishment procedure initiated by the UE, the SMF receives current location information of the UE from a mobility management network element AMF, where the current location information of the UE is represented by a TAI; and the SMF selects an anchor PSA-1. The PSA-1 is a UPF deployed relatively far from a RAN and the UE, and the PSA-1 may be referred to as a remote PSA.

S133: If the SMF determines, based on a DNAI, to implement a multi-homed PDU session, the SMF selects a PSA-2, and inserts a ULCL node.

The SMF determines that a DNAI corresponding to a TAI of a current location of the UE can be inserted into the ULCL node. Therefore, the SMF selects the PSA-2 and the ULCL node that supports traffic steering for the session. The PSA-2 is a UPF deployed relatively close to the RAN and the UE, and the PSA-2 may be referred to as a local PSA.

S134: The SMF sends a session request message.

For example, the SMF sends the session request message to the ULCL node through an N4 interface.

S135: The SMF sends control plane information to the UE.

The SMF notifies the UE of the anycast address of the DNS server by using the control plane information. Optionally, the control plane information may be a NAS message.

S136: The UE sends a DNS query request.

The UE initiates the DNS query request, and a destination IP address which is the anycast address of the DNS server obtained in step S135 and a domain name of a first application are carried in the DNS query request. The domain name of the first application may be an FQDN. The domain name of the first application may alternatively be a domain name in another form. This is not limited in this embodiment of this application.

S137: The ULCL sends the DNS query request to the PSA-2.

After receiving the DNS query request, the ULCL sends the DNS query request to the PSA-2 according to a destination address routing rule.

Based on the destination address in the DNS query request being an anycast address and based on an anycast address routing feature, the PSA-2 sends the DNS query request to a DNS server closest to the PSA-2, namely, a local DNS server. For example, the local DNS server may be the DNS server 2 shown in FIG. 11*a*. The anycast address feature is that, on an IP network, one anycast address is used to identify a group of hosts that provide a specific service, and a service accessing party does not care about a specific host that provides the service. A packet accessing the address may be routed by the IP network to any host in the group, usually to the nearest host.

It can be learned from the example description in Embodiment 4 that, when IP addresses of a plurality of DNS servers deployed on a network are the same, an anycast solution may be used. In this way, the UE can access the local DNS server nearby to perform the DNS query, to improve DNS query efficiency.

Embodiment 5 of this Application

FIG. 11*a* is a schematic diagram of another system architecture for interaction between an SMF and UE according to an embodiment of this application. Embodiment 5 is for a ULCL scenario, and an idea is similar to that in the BP scenario in Embodiment 3. However, a difference lies in that in the BP scenario, the UE has two different IP prefixes, and therefore, there is a problem of which IP prefix is used as the source IP prefix in the DNS query request before the UE sends the DNS query request; but in the ULCL scenario, UE has only one IP address, and therefore, a ULCL does not involve a problem of which IP prefix is used as a source IP prefix in a DNS query request.

In this embodiment of this application, for FIG. 11*a*, the UE obtains an address of a DNS server 1 from an SMF. After the ULCL is inserted, the SMF delivers traffic filtering information to the ULCL, and sets a destination address of a DNS query request message from the UE to an address of a DNS server 2. The ULCL node may set the destination address of the DNS query request message to the address of the DNS server 2 based on indication information of the SMF. In this way, the user equipment can access a local domain name system server nearby, and it can further be ensured that the DNS server 2 routes a response message corresponding to the DNS query request message to the user equipment through an optimal path.

FIG. 11*b* is another schematic flowchart of interaction between an SMF, a ULCL, a UPF, and a DNS server according to an embodiment of this application, and the following procedures are mainly included.

S41: The UE initiates a PDU session establishment procedure.

For example, the UE initiates the session establishment procedure. In this process, the SMF receives current location information of the UE from a mobility management network element AMF, where the current location information of the UE is represented by a TAI; and the SMF selects an anchor PSA-1. The PSA-1 is a UPF deployed relatively far from a RAN and the UE, and the PSA-1 may be referred to as a remote PSA.

S42: If the SMF determines, based on a DNAI, to insert the ULCL, the SMF selects a PSA-2, and inserts the ULCL.

The SMF determines that a DNAI corresponding to a TAI of a current location of the UE can implement local traffic steering. Therefore, the SMF selects the PSA-2 and the ULCL node that supports traffic steering for a session. The PSA-2 is a UPF deployed relatively close to the RAN and the UE, and the PSA-2 may be referred to as a local PSA.

S43: The SMF determines the DNS server 1 close to the PSA-1 and the DNS server 2 close to the PSA-2 based on a network topology.

The SMF stores DNS server addresses corresponding to different network locations through configuration. The network location may be represented by a DNAI. In other words, the SMF stores DNS server addresses corresponding to different DNAIs. Further, the SMF determines, based on a DNAI supported by the PSA-1, the DNS server 1 close to the PSA-1, and determines, based on a DNAI supported by the PSA-2, the DNS server 2 close to the PSA-2. In other words, the UE may access the DNS server 1 through the PSA-1, and may access the DNS server 2 through the PSA-2. The DNS server 2 is a first domain name system server.

S44: The SMF sends a session request message.

The SMF sends the session request message to the ULCL node through an N4 interface. The session request message carries an IP address of the UE, the address of the DNS server 2 close to the PSA-2, and the traffic filtering information. Optionally, the traffic filtering information includes indication information. The traffic filtering information is used to indicate the ULCL node to set the destination address of the DNS query request message from the UE to the address of the DNS server 2. The SMF may alternatively indicate, by using another method, the UPF to set the destination address of the DNS query request message from the UE to the address of the DNS server 2. This is not limited in this embodiment of this application.

S45: The SMF sends control plane information (for example, a NAS message).

The SMF notifies the UE of the address of the DNS server 2 by using the control plane information.

S46: The UE sends a DNS query request.

The UE initiates the DNS query request, and a destination IP address carried in the DNS query request is the address of the DNS server 1 (namely, a remote DNS server) and a requested domain name (the DNS server 2). The requested domain name may be an FQDN. The requested domain name may alternatively be a domain name in another form. This is not limited in this embodiment of this application.

S47: The ULCL sends the DNS query request to the PSA-2.

After receiving the DNS query request, the ULCL sets the destination address of the DNS query request to an address of a local DNS server (namely, the DNS server 2) based on an indication of the SMF in step S44, and then the ULCL sends the DNS query request to the PSA-2 according to a destination IP routing rule. The PSA-2 sends the DNS query request to the local DNS server (the DNS server 2) based on the destination address in the DNS query request. In addition, the PSA-2 receives a DNS query response message from the DNS server 2, and returns a query result to the UE through the ULCL.

It can be learned from the example description in Embodiment 5 that the SMF always provides the UE with the address of the DNS server close to the remote PSA-1, and does not need to frequently update the address of the DNS server to the UE. In this way, the UE can access the local DNS server nearby to perform the DNS query, to improve DNS query efficiency.

Embodiment 6 of this Application

Figure 12A:
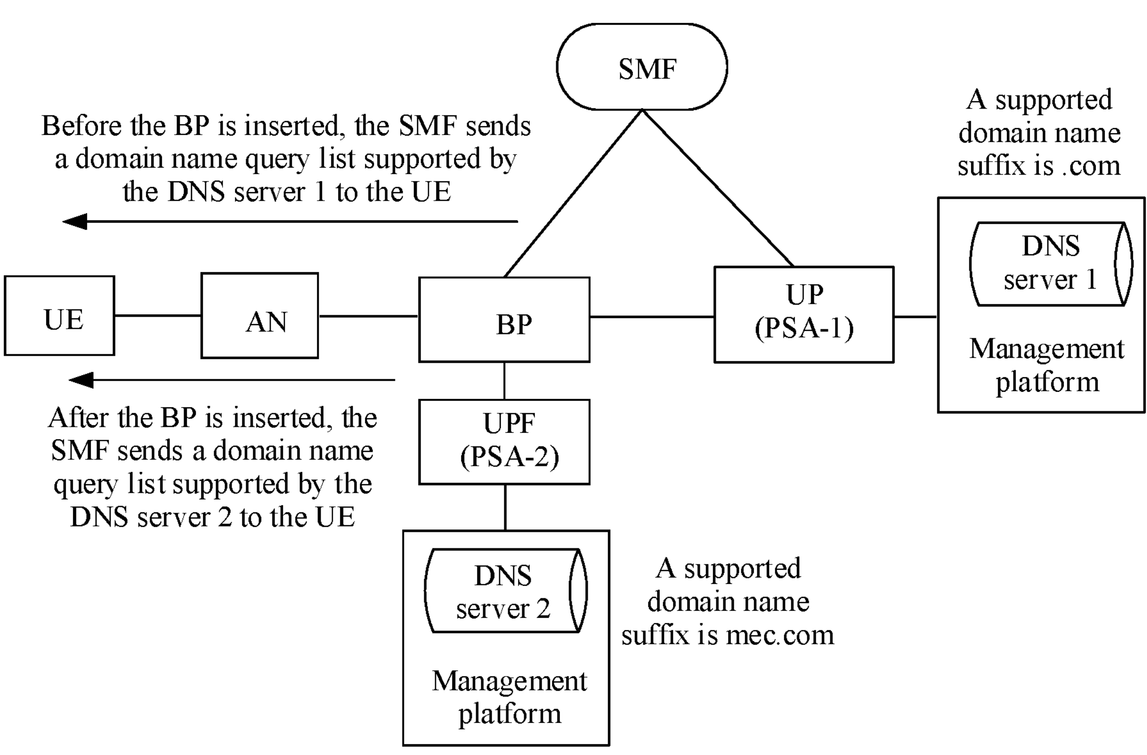
FIG. 12*a* is a schematic diagram of another system architecture for interaction between an SMF and UE according to an embodiment of this application.
Figures 1, 12B:
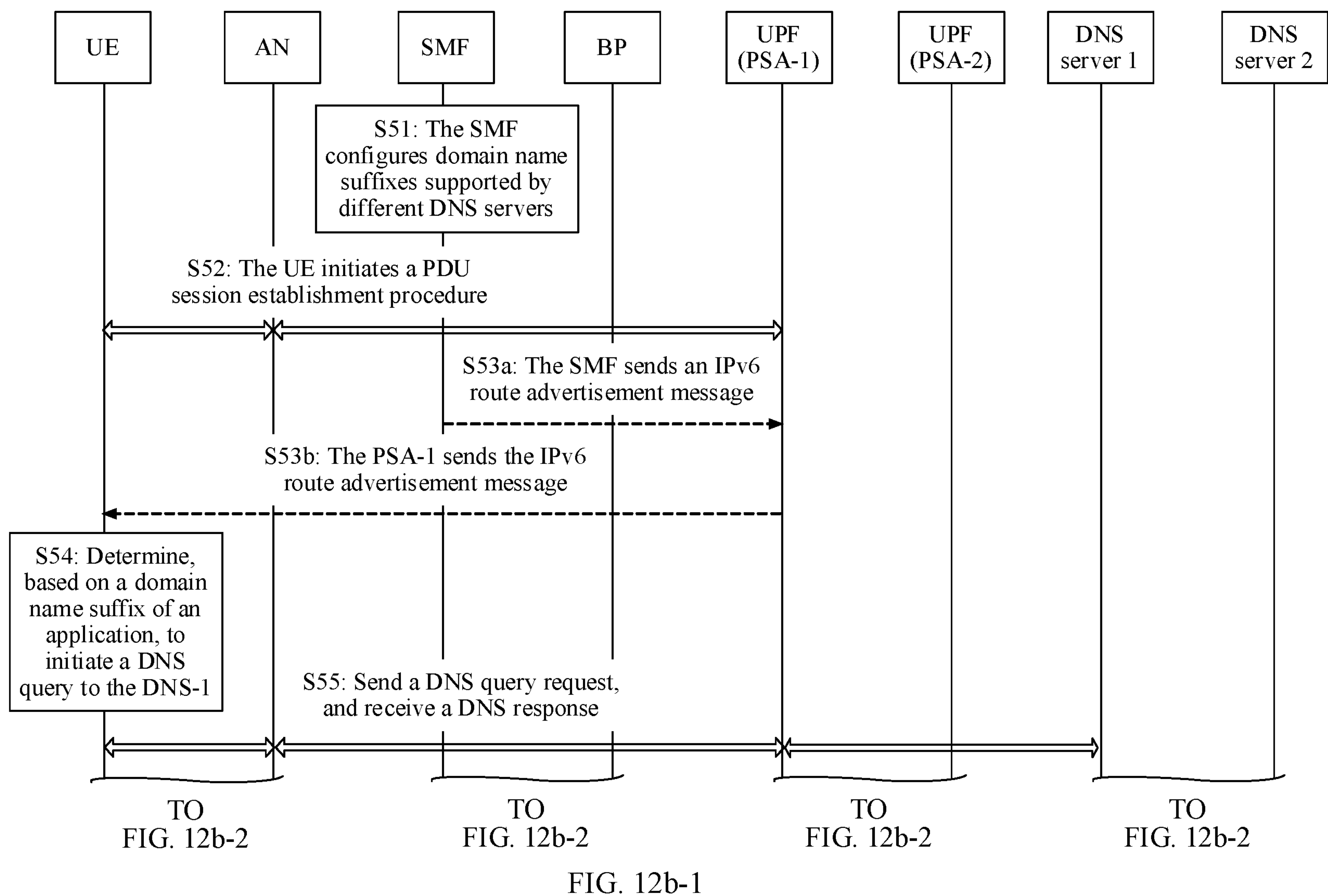
Figures 2, 12B:
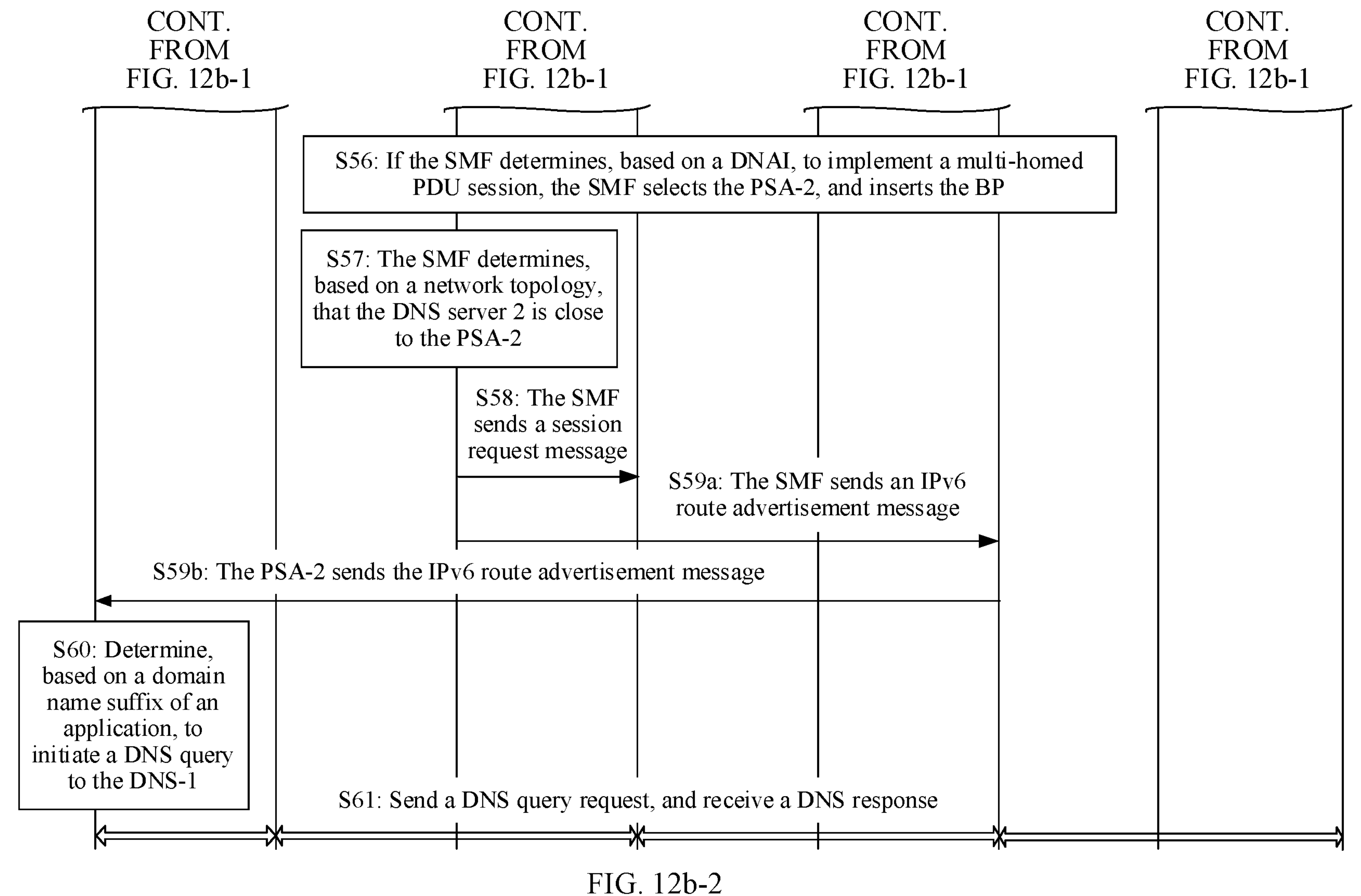

FIG. 12*a* is a schematic diagram of another system architecture for interaction between an SMF and UE according to an embodiment of this application. FIG. 12 is applicable to a BP scenario and a ULCL scenario. The following uses the BP scenario as an example. For the BP scenario, the SMF stores topology information of a DNS server and domain name suffix information supported by a DNS. Before a BP is inserted, the SMF delivers route advertisement information to the UE, and the route advertisement information carries an IP prefix @PSA-1, an address of a DNS server 1, and a DNS query list option (Search List option)-1. After the BP is inserted, the SMF delivers route advertisement information to the UE, and the route advertisement information carries an IP prefix @PSA-2, an address of a DNS server 2, and a DNS query list option-2. In this way, the UE learns that different domain name suffixes correspond to different DNS servers, and when performing a DNS query, the UE may query a domain name based on a corresponding IP prefix.

Different DNS functions are distinguished on the UE side to ensure that the UE uses a correct IP prefix and DNS server address for the query. In a scenario in which two DNSs are deployed, each DNS needs to support a different domain name suffix, and two different DNS addresses need to be maintained on the UE side.

As shown in FIG. 12*a*, for example, a DNS domain name suffix supported by a remote DNS server is .com, and a DNS domain name suffix supported by a local DNS server is .mec.com. If the UE wants to query an address of an application server corresponding to a domain name www.qq.com, the UE learns, by using a DNS query list option, that a remote DNS supports the domain name. In this case, the UE initiates a domain name query to the remote DNS. If the UE wants to query an address of an application server corresponding to a domain name www.qq.mec.com, the UE learns, by using a DNS query list option, that a local DNS supports the domain name. In this case, the UE initiates a domain name query to the local DNS.

The following uses an example in which a UPF network element supporting traffic steering is a BP node, and a case in which the UPF network element supporting traffic steering is a ULCL node is also applicable to Embodiment 6 of this application. This is not limited. FIG. 12*b*-1 and FIG. 12*b*-2 are another schematic flowchart of interaction between an SMF, a BP, a UPF, and a DNS server according to an embodiment of this application, and the following procedures are mainly included.

S51: The SMF configures domain name suffixes supported by different DNS servers.

The SMF stores topology information of the DNS servers and domain name suffix information supported by the DNSs. For example, the remote DNS server supports the DNS domain name suffix .com, and the local DNS server supports the DNS domain name suffix .mec.com.

S52: The UE initiates a PDU session establishment procedure.

The UE is currently at a location TAI-1, and the UE initiates the session establishment procedure.

In this process, the SMF selects an anchor PSA-1, and if a corresponding session type is an IPv6-type session, the SMF allocates the IP prefix @PSA-1 to the UE.

S53*a*: The SMF sends an IPv6 route advertisement message.

The SMF learns, based on the topology information, an address of a remote DNS server close to the PSA-1 and domain name suffix information supported by the DNS server, and the SMF delivers route advertisement information to the UE through the PSA-1. The route advertisement information carries the IP prefix @PSA-1, the address of the DNS server 1, and the DNS query list option-1. Herein, the address of the DNS server 1 is the address of the remote DNS server, and the DNS query list option-1 is the domain name suffix information supported by the remote DNS server.

In addition, the route advertisement information includes an IPv6 multi-homed routing rule. The IPv6 multi-homed routing rule is associated with the PSA-1, and the multi-homed routing rule is used to indicate that when the UE sends an uplink packet, if a destination address of the uplink packet meets a preset condition described in the multi-homed routing rule, the UE carries the IPv6 prefix @PSA-1 as a source IP prefix. For example, the preset condition may be that when a destination address space accessed by the UE belongs to 111.111.0.0 to 111.111.255.255, the UE carries the IPv6 prefix @PSA-1 as the source IP prefix.

In addition, when the UE performs the DNS query, if a destination address is the address of the DNS server 1, the multi-homed routing rule may further be used to indicate the UE to use the IPv6 prefix @PSA-1 as a source IP prefix in a DNS query request message. In other words, when sending a DNS query request to the DNS server 1, the UE may determine, according to the multi-homed routing rule, that the source IP prefix in the DNS query request message is the IPv6 prefix @PSA-1.

S53*b*: The PSA-1 sends the IPv6 route advertisement message.

S54: The UE determines, based on a domain name suffix of an application, to initiate a DNS query to the DNS-1.

After receiving the address of the remote DNS server and the domain name suffix information supported by the remote DNS server from the SMF, the UE learns that the IP prefix @PSA-1 is used to initiate a DNS query request to the remote DNS server. The DNS query request carries a domain name of a first application. The domain name of the first application may be a fully qualified domain name (FQDN). The domain name of the first application may alternatively be a domain name in another form. This is not limited in this embodiment of this application.

S55: The UE sends the DNS query request, and receives a DNS response.

S56: If the SMF determines, based on a DNAI, to implement a multi-homed PDU session, the SMF selects a PSA-2, and inserts the BP node.

The UE moves from a location 1 to a location 2, and the SMF determines to implement a multi-homing PDU session based on a DNAI corresponding to the location. In this case, the SMF selects another anchor PSA-2 and the BP node that supports traffic steering.

In addition, the SMF allocates the IP prefix @PSA-2 to the UE.

S57: The SMF determines, based on a network topology, that the DNS server 2 is close to the PSA-2.

In addition, the SMF obtains the address of the local DNS server close to the PSA-2 and the domain name suffix information supported by the local DNS server based on the topology information.

S58: The SMF sends a session request message.

The SMF sends the session request message to the BP node through an N4 interface.

S59*a*: The SMF sends an IPv6 route advertisement message.

The SMF delivers route advertisement information to the UE through the PSA-2. The route advertisement information carries the IP prefix @PSA-2, the address of the DNS server 2, and the DNS query list option-2. Herein, the address of the DNS server 2 is the address of the local DNS server, and the DNS query list option-2 is the domain name suffix information supported by the local DNS server.

In addition, the route advertisement information includes the IPv6 prefix @PSA-2 and an IPv6 multi-homed routing rule. The IPv6 multi-homed routing rule is associated with the PSA-2, and the multi-homed routing rule is used to indicate that when the UE sends an uplink packet, if a destination address of the uplink packet meets a preset condition described in the multi-homed routing rule, the UE carries the IPv6 prefix @PSA-2 as a source IP prefix. For example, the condition may be that when a destination address space accessed by the UE belongs to 128.128.0.0 to 128.128.255.255, the UE carries the IPv6 prefix @PSA-2 as the source IP prefix.

In addition, when the UE performs the DNS query, if a destination address is the address of the DNS server 2, the multi-homed routing rule may further be used to indicate the UE to use the IPv6 prefix @PSA-2 as a source IP prefix in a DNS query request message. In other words, when sending a DNS query request to the DNS server 2, the UE may determine, according to the multi-homed routing rule, that the source IP prefix in the DNS query request message is the IPv6 prefix @PSA-2.

S59*b*: The PSA-2 sends the IPv6 route advertisement message.

S60: The UE determines, based on a domain name suffix of an application, to initiate a DNS query to the DNS-2.

After receiving the address of the local DNS server and the domain name suffix information supported by the local DNS server from the SMF, the UE learns that the IP prefix @PSA-2 is used to initiate a DNS query request to the local DNS server. The DNS query request carries a domain name of a first application. The domain name of the first application may be a fully qualified domain name (FQDN). The domain name of the first application may alternatively be a domain name in another form. This is not limited in this embodiment of this application.

S61: The UE sends the DNS query request, and receives a DNS response.

The UE learns that different domain name suffixes correspond to different DNS servers, and domain name suffix information corresponding to the different DNS servers, so that when the UE performs the DNS query, the UE determines a DNS server address based on the domain name suffix information, further determines an IP prefix corresponding to the DNS server address, and then initiates a domain name query.

For example, if the UE wants to query the address of the application server corresponding to the domain name www.qq.com, the UE learns, by using the DNS query list option, that the remote DNS server supports the domain name. In addition, the IP prefix @PSA-1 is associated with the remote DNS server. In this case, when the UE initiates a domain name query to the remote DNS server, the source IP prefix which is the IP prefix @PSA-1, the destination address which is the address of the remote DNS server, and the domain name which is www.qq.com are carried.

If the UE wants to query the address of the application server corresponding to the domain name www.qq.mec-.com, the UE learns, by using the DNS query list option, that the local DNS server supports the domain name. In addition, the IP prefix @PSA-2 is associated with the local DNS server. In this case, when the UE initiates a domain name query to the local DNS server, the source IP prefix which is the IP prefix @PSA-2, the destination address which is the address of the local DNS server, and the domain name which is www.qq.mec.com are carried.

It should be noted that, in the flowchart shown in FIG. 12$b$-1 and FIG. 12$b$-2, the BP node may alternatively be replaced with a ULCL network element having a traffic steering function. A difference lies in that, in the ULCL scenario, the SMF does not need to allocate an IP address prefix to the UE. Therefore, the ULCL does not involve the problem of which IP prefix is used as the source IP prefix in the DNS query request. It can be learned from the example description in Embodiment 6 that different DNS functions are distinguished on the UE side, to ensure that the UE uses the correct IP prefix and DNS server address for the query. In this way, the UE can perform the DNS query on demand. This improves DNS query efficiency, but imposes a requirement on a function of the DNS server in the scenario in which two DNSs are deployed.

It should be noted that for ease of brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to example embodiments, and the involved actions and modules are not necessarily required by this application.

To better implement the foregoing solutions in the embodiments of this application, the following further provides a related apparatus for implementing the foregoing solutions.

Figure 13:
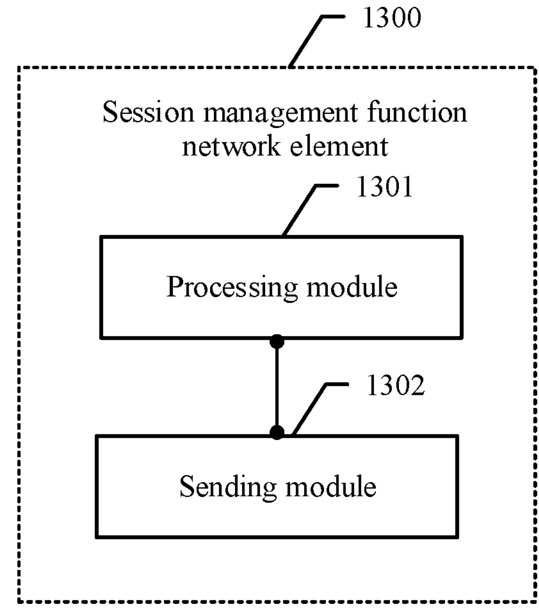
FIG. 13 is a schematic diagram of a composition structure of a session management function network element according to an embodiment of this application.

Refer to FIG. 13. A session management function network element 1300 provided in an embodiment of this application may include a processing module 1301 and a sending module 1302.

The processing module is configured to determine an address of a first domain name system server based on a first location of user equipment. The first domain name system server is a local domain name system server that resolves a domain name of a first application into a corresponding first Internet protocol address, and the first Internet protocol address is associated with the first location.

The sending module is configured to send the address of the first domain name system server to a first device.

In some embodiments of this application, the processing module is specifically configured to: determine a deployment location of the first application based on the first location of the user equipment, and determine the address of the first domain name system server based on the deployment location of the first application.

In some embodiments of this application, the processing module is further configured to allocate a first Internet protocol prefix to the user equipment. The first Internet protocol prefix is included in a first domain name system query request message sent by the user equipment.

The sending module is further configured to send the first Internet protocol prefix to the user equipment.

In some embodiments of this application, the first device is a user plane function network element.

The sending module is further configured to send a session request to the user plane function network element. The session request includes the address of the first domain name system server and indication information. The indication information is used to indicate the user plane function network element to set, to the address of the first domain name system server, a destination address of the received first domain name system query request message sent by the user equipment.

In some embodiments of this application, the first device is user equipment.

The sending module is further configured to send first route advertisement information to the user equipment. The first route advertisement information includes the address of the first domain name system server.

In some embodiments of this application, the first device is user equipment.

The processing module is further configured to: when the session management function network element learns that the user equipment moves from the first location to a second location, determine an address of a second domain name system server based on the second location. The second domain name system server is a local domain name system server that resolves the domain name of the first application into a corresponding second Internet protocol address, and the second Internet protocol address is associated with the second location.

The processing module is further configured to allocate a second Internet protocol prefix to the user equipment.

The sending module is further configured to send second route advertisement information to the user equipment. The second route advertisement information carries the second Internet protocol prefix and the address of the second domain name system server, and the second Internet protocol prefix is included in a second domain name system query request message sent by the user equipment to the second domain name system server.

In some embodiments of this application, the first device is user equipment.

The sending module is further configured to send a first domain name query list supported by the first domain name system server to the user equipment. The first domain name query list is used by the user equipment to send the first domain name system query request message to the first domain name system server when the domain name of the first application is in the first domain name query list.

Figure 14:
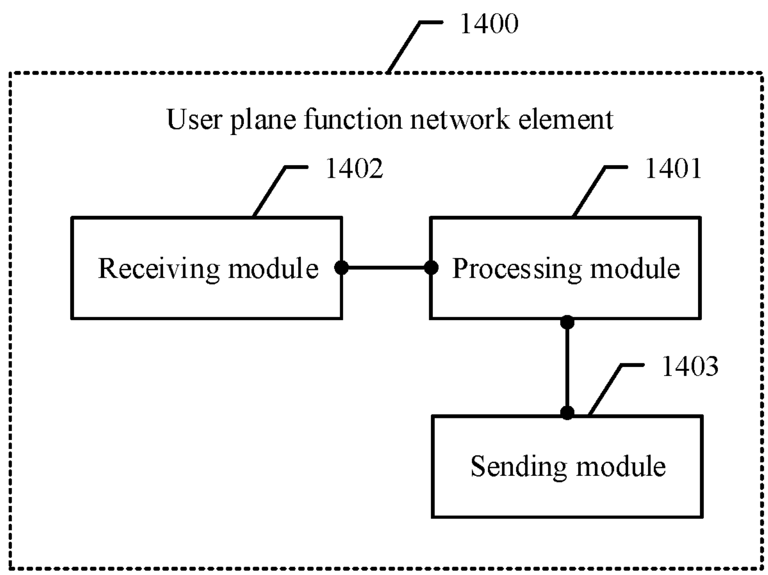
FIG. 14 is a schematic diagram of a composition structure of a user plane function network element according to an embodiment of this application.

Refer to FIG. 14. A user plane function network element 1400 provided in an embodiment of this application may include a processing module 1401, a receiving module 1402, and a sending module 1403.

The processing module is configured to receive, by using the receiving module, an address of a first domain name system server sent by a session management function network element. The address of the first domain name system server is determined by the session management function network element based on a first location of user equipment. The first domain name system server is a local domain name system server that resolves a domain name of a first application into a corresponding first Internet protocol address, and the first Internet protocol address is associated with the first location.

The processing module is further configured to receive, by using the receiving module, a domain name system query request message sent by the user equipment.

The processing module is further configured to send the domain name system query request message to the first domain name system server by using the sending module.

In some embodiments of this application, the processing module is further configured to receive, by using the receiving module, indication information sent by the session management function network element. The indication information is used to indicate the user plane function network element to set, to the address of the first domain name system server, a destination address of the received domain name system query request message sent by the user equipment.

Figure 15:
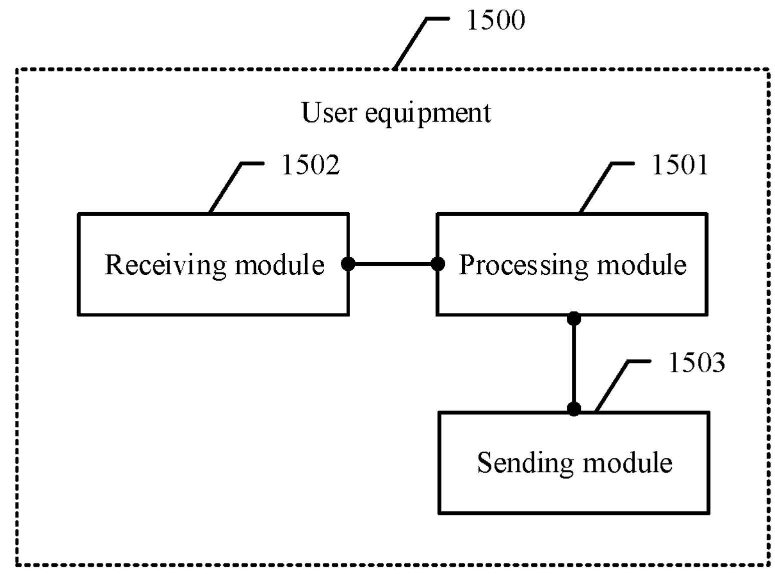
FIG. 15 is a schematic diagram of a composition structure of user equipment according to an embodiment of this application.

According to an apparatus provided in this embodiment of this application, the session management function network element determines the address of the first domain name system server based on a first location of the apparatus. For example, the apparatus may be a communications apparatus. For example, the communications apparatus may be user equipment, a chip, or another entity. The session management function network element determines the address of the first domain name system server based on a first location of the communications apparatus. Specifically, the communications apparatus is user equipment. Refer to FIG. 15. User equipment 1500 provided in an embodiment of this application may include a processing module 1501, a receiving module 1502, and a sending module 1503.

The processing module is configured to receive, by using the receiving module, an address of a first domain name system server sent by a session management function network element. The address of the first domain name system server is determined by the session management function network element based on a first location of the user equipment. The first domain name system server is a local domain name system server that resolves a domain name of a first application into a corresponding first Internet protocol address, and the first Internet protocol address is associated with the first location.

The processing module is further configured to send a first domain name system query request message to the first domain name system server by using the sending module.

In some embodiments of this application, the processing module is further configured to receive, by using the receiving module, first route advertisement information sent by the session management function network element. The first route advertisement information includes the address of the first domain name system server.

In some embodiments of this application, the first route advertisement information further includes a first Internet protocol prefix, and the first Internet protocol prefix is included in the first domain name system query request message sent by the user equipment to the first domain name system server.

In some embodiments of this application, the processing module is further configured to receive, by using the receiving module, second route advertisement information sent by the session management function network element. The second route advertisement information includes an address of a second domain name system server. The second domain name system server is a local domain name system server determined by the session management function network element for the user equipment based on a second location when the user equipment moves from the first location to the second location. A second Internet protocol address is associated with the second location.

The processing module is further configured to send a second domain name system query request message to the second domain name system server by using the sending module.

In some embodiments of this application, the second route advertisement information further includes a second Internet protocol prefix, and the second Internet protocol prefix is included in the second domain name system query request message sent by the user equipment to the second domain name system server.

In some embodiments of this application, the processing module is further configured to: obtain, by using the receiving module, a second domain name query list supported by the second domain name system server from the session management function network element; and send the second domain name system query request message to the second domain name system server when the domain name of the first application is in the second domain name query list.

In some embodiments of this application, the processing module is further configured to: obtain, by using the receiving module, a first domain name query list supported by the first domain name system server from the session management function network element; and send the first domain name system query request message to the first domain name system server when the domain name of the first application is in the first domain name query list.

It should be noted that content such as information exchange between the modules/units of the apparatus and the execution processes thereof is based on a same concept as the method embodiments of this application, and achieves same technical effects as the method embodiments of this application. For specific content, refer to the foregoing descriptions in the method embodiments of this application. Details are not described herein again.

An embodiment of this application further provides a computer storage medium. The computer storage medium stores a program. The program is executed to perform some or all of the steps recorded in the method embodiments.

Figure 16:
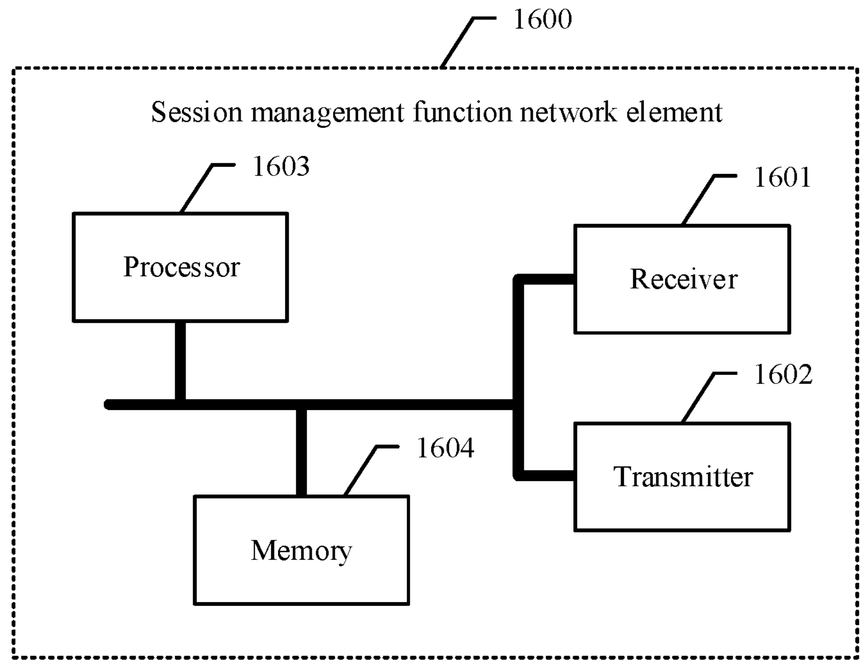
FIG. 16 is a schematic diagram of a composition structure of another session management function network element according to an embodiment of this application.

The following describes another session management function network element provided in an embodiment of this application. As shown in FIG. 16, a session management function network element 1600 includes:

a receiver 1601, a transmitter 1602, a processor 1603, and a memory 1604 (there may be one or more processors 1603 in the session management function network element 1600, and an example in which there is one processor is used in FIG. 16). In some embodiments of this application, the receiver 1601, the transmitter 1602, the processor 1603, and the memory 1604 may be connected through a bus or in another manner, and a connection through the bus is used as example in FIG. 16.

The memory 1604 may include a read-only memory and a random access memory, and provide instructions and data for the processor 1603. A part of the memory 1604 may further include a non-volatile random access memory (NVRAM). The memory 1604 stores an operating system and operation instructions, an executable module or a data structure, a subset thereof, or an extended set thereof. The operation instructions may include various operation instructions to implement various operations. The operating system may include various system programs, to implement various basic services and process hardware-based tasks.

The processor 1603 controls an operation of the session management function network element, and the processor 1603 may also be referred to as a central processing unit (CPU). In specific application, components of the session management function network element are coupled together through a bus system. In addition to a data bus, the bus system may further include a power bus, a control bus, a status signal bus, and the like. However, for clear description, various types of buses in the figure are marked as the bus system.

The methods disclosed in the foregoing embodiments of this application may be applied to the processor 1603 or may be implemented by the processor 1603. The processor 1603 may be an integrated circuit chip and has a signal processing capability. In an implementation process, the steps in the foregoing methods can be implemented by using a hardware integrated logic circuit in the processor 1603, or by using instructions in a form of software. The processor 1603 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1603 may implement or perform the methods, the steps, and logical block diagrams that are disclosed in the embodiments of this application. The general-purpose processor may be a microprocessor, or the processor may be any conventional processor, or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1604, and the processor 1603 reads information in the memory 1604 and completes the steps in the foregoing methods in combination with hardware of the processor.

The receiver 1601 may be configured to receive input digit or character information, and generate signal input related to a related setting and function control of the session management function network element. The transmitter 1602 may include a display device, for example, a display. The transmitter 1602 may be configured to output the digit or character information through an external interface.

In this embodiment of this application, the processor 1603 is configured to perform the domain name system server determining method performed by the session management function network element.

Figure 17:
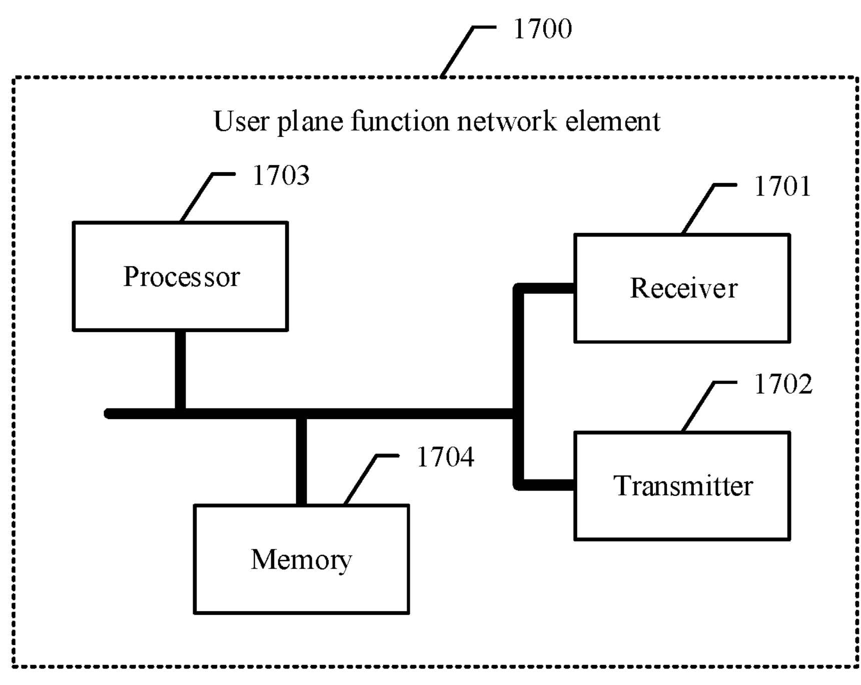
FIG. 17 is a schematic diagram of a composition structure of another user plane function network element according to an embodiment of this application.

The following describes another user plane function network element provided in an embodiment of this application. As shown in FIG. 17, a user plane function network element 1700 includes:

a receiver 1701, a transmitter 1702, a processor 1703, and a memory 1704 (there may be one or more processors 1703 in the user plane function network element 1700, and an example in which there is one processor is used in FIG. 17), where in some embodiments of this application, the receiver 1701, the transmitter 1702, the processor 1703, and the memory 1704 may be connected through a bus or in another manner, and a connection by using the bus is used as example in FIG. 17.

The memory 1704 may include a read-only memory and a random access memory, and provide instructions and data for the processor 1703. A part of the memory 1704 may further include an NVRAM. The memory 1704 stores an operating system and operation instructions, an executable module or a data structure, a subset thereof, or an extended set thereof. The operation instructions may include various operation instructions to implement various operations. The operating system may include various system programs, to implement various basic services and process hardware-based tasks.

The processor 1703 controls an operation of the user plane function network element, and the processor 1703 may also be referred to as a CPU. In specific application, components of the user plane function network element are coupled together through a bus system. In addition to a data bus, the bus system may further include a power bus, a control bus, a status signal bus, and the like. However, for clear description, various types of buses in the figure are marked as the bus system.

The methods disclosed in the foregoing embodiments of this application may be applied to the processor 1703 or may be implemented by the processor 1703. The processor 1703 may be an integrated circuit chip and has a signal processing capability. In an implementation process, steps in the foregoing method can be implemented by using a hardware integrated logic circuit in the processor 1703, or by using instructions in a form of software. The processor 1703 may be a general-purpose processor, a DSP, an ASIC, an FPGA or another programmable logic device, a discrete gate or transistor logic device, or a discrete hardware component. The processor 1703 may implement or perform the methods, the steps, and logical block diagrams that are disclosed in the embodiments of this application. The general-purpose processor may be a microprocessor, or the processor may be any conventional processor, or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1704, and the processor 1703 reads information in the memory 1704 and completes the steps in the foregoing methods in combination with hardware of the processor.

In this embodiment of this application, the processor 1703 is configured to perform the request processing method performed by the user plane function network element.

Figure 18:
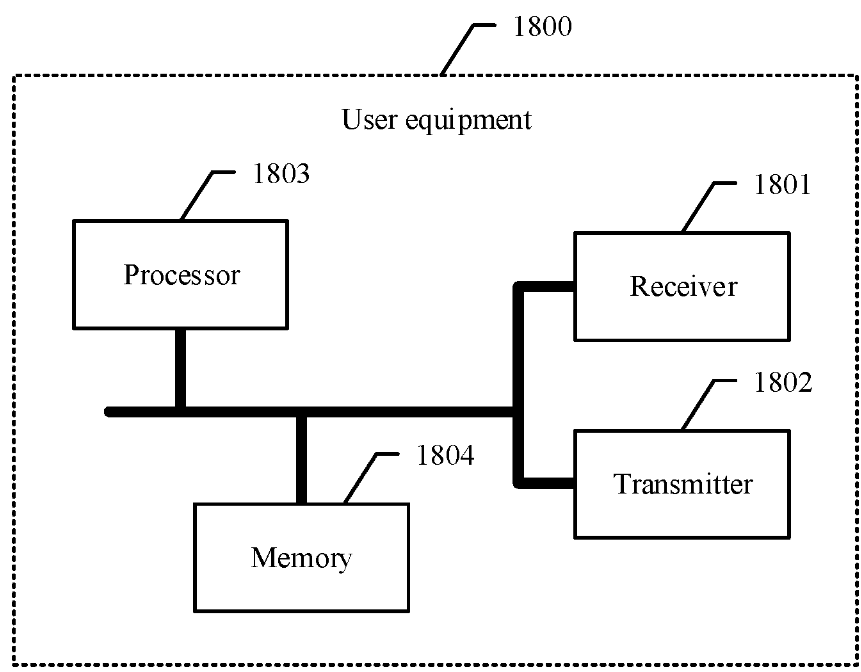
FIG. 18 is a schematic diagram of a composition structure of other user equipment according to an embodiment of this application.

The following describes other user equipment provided in an embodiment of this application. As shown in FIG. 18, user equipment 1800 includes:

a receiver 1801, a transmitter 1802, a processor 1803, and a memory 1804 (there may be one or more processors 1803 in the user equipment 1800, and an example in which there is one processor is used in FIG. 18), where in some embodiments of this application, the receiver 1801, the transmitter 1802, the processor 1803, and the memory 1804 may be connected through a bus or in another manner, and a connection by using the bus is used as example in FIG. 18.

The memory 1804 may include a read-only memory and a random access memory, and provide instructions and data for the processor 1803. A part of the memory 1804 may further include an NVRAM. The memory 1804 stores an operating system and operation instructions, an executable module or a data structure, a subset thereof, or an extended set thereof. The operation instructions may include various operation instructions to implement various operations. The operating system may include various system programs, to implement various basic services and process hardware-based tasks.

The processor 1803 controls an operation of the user equipment, and the processor 1803 may also be referred to as a CPU. In specific application, components of the user equipment are coupled together through a bus system. In addition to a data bus, the bus system may further include a power bus, a control bus, and a status signal bus. However, for clear description, various types of buses in the figure are marked as the bus system.

The methods disclosed in the foregoing embodiments of this application may be applied to the processor 1803 or may be implemented by the processor 1803. The processor 1803 may be an integrated circuit chip and has a signal processing capability. In an implementation process, steps in the foregoing method can be implemented by using a hardware integrated logic circuit in the processor 1803, or by using instructions in a form of software. The processor 1803 may be a general-purpose processor, a DSP, an ASIC, an FPGA or another programmable logic device, a discrete gate or transistor logic device, or a discrete hardware component. The processor 1803 may implement or perform the methods, the steps, and logical block diagrams that are disclosed in the embodiments of this application. The general-purpose processor may be a microprocessor, or the processor may be any conventional processor, or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1804, and the processor 1803 reads information in the memory 1804 and completes the steps in the foregoing methods in combination with hardware of the processor.

In this embodiment of this application, the processor 1803 is configured to perform the request processing method performed by the user equipment.

In another possible design, when the session management function network element, the user plane function network element, or the user equipment is a chip, the chip includes a processing unit and a communications unit. The processing unit may be, for example, a processor, and the communications unit may be, for example, an input/output interface, a pin, or a circuit. The processing unit may execute computer-executable instructions stored in a storage unit, so that the chip that is in a terminal performs the wireless communications method according to any one implementation of the first aspect. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that may store static information and instructions, for example, a random access memory (RAM).

The processor mentioned anywhere above may be a general-purpose central processing unit, a microprocessor, an ASIC, or one or more integrated circuits configured to control program execution of the method.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected according to an actual need to achieve the objectives of the solutions of the embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any functions that can be performed by a computer program can be easily implemented by using corresponding hardware, and a specific hardware structure used to achieve a same function may be of various forms, for example, in a form of an analog circuit, a digital circuit, a dedicated circuit, or the like. However, in this application, a software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented through software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk or a magnetic tape), an optical medium (for example, a DVD), a semiconductor medium (for example, a solid state disk (SSD)), or the like.

What is claimed is:

1. A communication method, comprising:

determining, by a session management function network element and based on a first location of user equipment, a data network access identifier (DNAI) indicating a deployment location of a first application;

determining, by the session management function network element and based on the DNAI, a first local domain name system server's address that corresponds to the DNAI, wherein the first local domain name system server is a local domain name system server that resolves the domain name of the first application into a corresponding first Internet protocol address, and the first Internet protocol address is associated with the first location;

sending, by the session management function network element, the first local domain name system server's address to a first device; and receiving, by the first device, the first local domain name system server's address.

2. The method according to claim 1, wherein domain name system server addresses corresponding to different DNAIs are stored in the session management function network element, and the determining the first local domain name system server's address comprises determining the first local domain name system server's address from the domain name system server addresses corresponding to the different DNAIs.

3. The method according to claim 1, wherein the first device is a user plane function network element.

4. The method according to claim 1, wherein the first device is user equipment.

5. The method according to claim 3, further comprising:

sending, by the session management function network element, indication information to the user plane function network element, wherein the indication information indicates to set, to the first local domain name system server's address, a destination address of a received first domain name system query request message from the user equipment; and receiving, by the user plane function network element, the indication information.

6. The method according to claim 5, further comprising:

receiving, by the user plane function network element, a domain name system query request message from the user equipment, wherein the domain name system query request message comprises a domain name of the first application;

setting, by the user plane function network element, a destination address of the domain name system query request message to the first local domain name system server's address based on the indication information; and sending, by the user plane function network element, the set domain name system query request message.

7. The method according to claim 3, further comprising:

receiving, by the user plane function network element, a domain name system query request message from the user equipment, wherein the domain name system query request message comprises a domain name of the first application; and sending, by the user plane function network element, the domain name system query request message to the first local domain name system server according to the first local domain name system server's address.

8. The method according to claim 7, further comprising:

receiving, by the first local domain name system server, the domain name system query request message; and resolving, by the first local domain name system server, the domain name of the first application into a corresponding first Internet protocol address, wherein the first Internet protocol address is associated with the first location.

9. The method according to claim 4, further comprising:

sending, by the user equipment, a domain name system query request message to the first local domain name system server according to the first local domain name system server's address, wherein the domain name system query request message comprises a domain name of the first application.

10. The method according to claim 9, further comprising:

receiving, by the first local domain name system server, the domain name system query request message; and resolving, by the first local domain name system server, the domain name of the first application into a corresponding first Internet protocol address, wherein the first Internet protocol address is associated with the first location.

11. A communication system, comprising:

a session management function network element configured to:

determine, based on a first location of user equipment, a data network access identifier (DNAI) indicating a deployment location of a first application;

determine, based on the DNAI, a first local domain name system server's address that corresponds to the DNAI, wherein the first local domain name system server is a local domain name system server that resolves the domain name of the first application into a corresponding first Internet protocol address, and the first Internet protocol address is associated with the first location; and send the first local domain name system server's address to a first device; and the first device configured to:

receive the first local domain name system server's address.

12. The system according to claim 11, wherein domain name system server addresses corresponding to different DNAIs are stored in the session management function network element, and the determining the first local domain name system server's address comprises determining the first local domain name system server's address from the domain name system server addresses corresponding to the different DNAIs.

13. The system according to claim 11, wherein the first device is a user plane function network element.

14. The system according to claim 11, wherein the first device is user equipment.

15. The system according to claim 13, wherein the session management function network element is further configured to: send indication information to the user plane function network element, wherein the indication information indicates to set, to the first local domain name system server's address, a destination address of a received first domain name system query request message from the user equipment; and the user plane function network element is further configured to: receive the indication information.

16. The system according to claim 15, wherein the user plane function network element is further configured to:

receive, by the user plane function network element, a domain name system query request message from the user equipment, wherein the domain name system query request message comprises a domain name of the first application;

set a destination address of the domain name system query request message to the first local domain name system server's address based on the indication information; and send the set domain name system query request message.

17. The system according to claim 13, wherein the user plane function network element is further configured to:

receive a domain name system query request message from the user equipment, wherein the domain name system query request message comprises a domain name of the first application; and send the domain name system query request message to the first local domain name system server according to the first local domain name system server's address.

18. The system according to claim 17, further comprising: the first local domain name system server configured to:

receive the domain name system query request message; and resolve the domain name of the first application into a corresponding first Internet protocol address, wherein the first Internet protocol address is associated with the first location.

19. The system according to claim 14, wherein the user equipment is further configured to:

send a domain name system query request message to the first local domain name system server according to the first local domain name system server's address, wherein the domain name system query request message comprises a domain name of the first application.

20. The system according to claim 19, further comprising: the first local domain name system server configured to:

receive the domain name system query request message; and resolve the domain name of the first application into a corresponding first Internet protocol address, wherein the first Internet protocol address is associated with the first location.

* * * * *